(12) United States Patent
Fernandez

(10) Patent No.: US 9,495,226 B2
(45) Date of Patent: Nov. 15, 2016

(54) INTEGRATION OF CLIENT SIDE APPLICATIONS INTO A FANTASY OPEN PLATFORM ENVIRONMENT

(71) Applicant: CBS INTERACTIVE INC., San Francisco, CA (US)

(72) Inventor: Antonio L. Fernandez, Pompano Beach, FL (US)

(73) Assignee: CBS Interactive Inc., New York, NY (US)

( * ) Notice: Subject to any disclaimer, the term of this patent is extended or adjusted under 35 U.S.C. 154(b) by 540 days.

(21) Appl. No.: 13/691,042

(22) Filed: Nov. 30, 2012

(65) Prior Publication Data
US 2013/0167162 A1  Jun. 27, 2013

Related U.S. Application Data

(63) Continuation-in-part of application No. 13/332,633, filed on Dec. 21, 2011, now Pat. No. 8,732,278.

(51) Int. Cl.
| | |
|---|---|
| G06F 15/16 | (2006.01) |
| G06F 9/54 | (2006.01) |
| G06F 17/30 | (2006.01) |
| A63F 13/335 | (2014.01) |
| A63F 13/828 | (2014.01) |
| A63F 13/77 | (2014.01) |

(52) U.S. Cl.
CPC ............ *G06F 9/54* (2013.01); *A63F 13/335* (2014.09); *A63F 13/77* (2014.09); *A63F 13/828* (2014.09); *G06F 17/3089* (2013.01)

(58) Field of Classification Search
CPC ..... A63F 13/828; G06F 17/3089; G06F 9/54
See application file for complete search history.

(56) References Cited

U.S. PATENT DOCUMENTS

| | | | | |
|---|---|---|---|---|
| 8,099,182 | B1 * | 1/2012 | Kasten | A63F 13/12 463/42 |
| 8,315,722 | B1 * | 11/2012 | Russo | A63F 13/12 463/4 |
| 8,460,078 | B2 * | 6/2013 | Moore | G07F 17/3237 463/40 |
| 8,647,201 | B1 * | 2/2014 | Jehamy | A63F 13/65 3/65 |
| 8,840,468 | B1 * | 9/2014 | Jehamy | A63F 13/00 463/31 |
| 2005/0164793 | A1 * | 7/2005 | Merimovich | G07F 17/3293 463/42 |
| 2006/0046807 | A1 * | 3/2006 | Sanchez | A63F 13/12 463/9 |
| 2007/0060109 | A1 * | 3/2007 | Ramer | G06Q 30/02 455/414.1 |
| 2008/0096664 | A1 | 4/2008 | Baray et al. | |
| 2009/0156311 | A1 * | 6/2009 | Ng | A63F 13/12 463/42 |
| 2009/0203412 | A1 * | 8/2009 | Gedling | A63F 13/12 463/4 |
| 2010/0190539 | A1 * | 7/2010 | Olszewski, III | A63F 13/12 463/4 |
| 2010/0318618 | A1 * | 12/2010 | Parker | G06F 17/30893 709/206 |

(Continued)

*Primary Examiner* — Mohamed Wasel

(57) ABSTRACT

Techniques to integrate client side applications into a fantasy open platform environment include a server processor component operating within the fantasy open platform environment and operative to provide application programming interface (API) data of the client side application code to the fantasy open platform environment. The client side application may be independent from the fantasy open platform environment. Hooks may be created to allow embedding of the client side application code on the fantasy open platform environment web pages wherein the client side application code identifies on which of the fantasy open platform environment web pages the client side application code runs. A client side application executing on a client browser may be allowed to access resources of the fantasy open platform environment over a network connection.

30 Claims, 28 Drawing Sheets

(56) References Cited

U.S. PATENT DOCUMENTS

| | | |
|---|---|---|
| 2011/0230243 A1 | 9/2011 | Hereford |
| 2011/0258049 A1* | 10/2011 | Ramer .............. G06F 17/30867 705/14.66 |
| 2011/0289317 A1* | 11/2011 | Darapu ........... H04N 21/25816 713/168 |
| 2012/0034961 A1 | 2/2012 | Berman et al. |
| 2012/0095577 A1 | 4/2012 | Golding |
| 2012/0129610 A1* | 5/2012 | Mazursky ............... A63F 13/12 463/42 |
| 2012/0149472 A1 | 6/2012 | Miller |
| 2012/0270614 A1 | 10/2012 | Robinson |
| 2012/0276964 A1 | 11/2012 | Jones et al. |
| 2013/0045806 A1 | 2/2013 | Bloodworth |
| 2013/0109348 A1* | 5/2013 | Sharma ................. H04W 12/08 455/411 |
| 2013/0123002 A1 | 5/2013 | Fernandez |
| 2013/0260898 A1* | 10/2013 | Pepe ....................... A63F 13/00 463/42 |
| 2014/0331265 A1* | 11/2014 | Mozell ............. H04N 21/2668 725/93 |
| 2014/0370966 A1* | 12/2014 | Bahou ................. G07F 17/3225 463/25 |
| 2015/0005076 A1* | 1/2015 | Stephenson, Jr. ....... A63F 13/87 463/42 |

\* cited by examiner

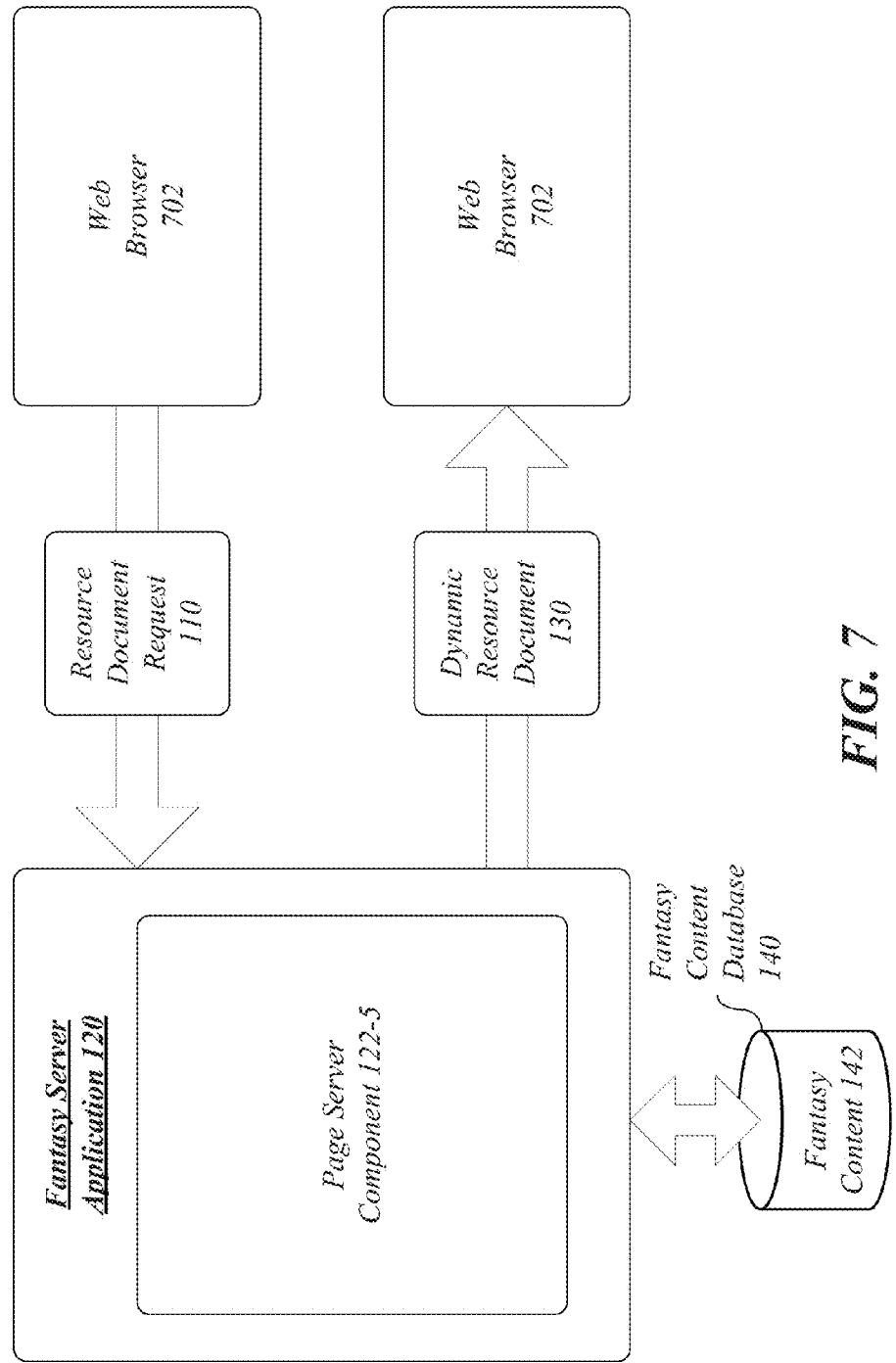

1800

- RECEIVE A RESOURCE DOCUMENT REQUEST FROM A CLIENT DEVICE
  1802

- GENERATE A PLATFORM RESOURCE DOCUMENT WITH A HOST SEGMENT ARRANGED TO PRESENT A HOST RESOURCE DOCUMENT FROM A HOST SERVER PROGRAM AND A GUEST SEGMENT ARRANGED TO PRESENT A GUEST RESOURCE DOCUMENT FROM A GUEST SERVER PROGRAM
  1804

- RETRIEVE THE HOST RESOURCE DOCUMENT FROM THE HOST SERVER PROGRAM, THE HOST RESOURCE DOCUMENT HAVING FANTASY CONTENT FROM A FANTASY CONTENT DATABASE
  1806

- GENERATE A GUEST REFERENCE TO THE GUEST SERVER PROGRAM ARRANGED TO GENERATE THE GUEST RESOURCE DOCUMENT WITH FANTASY CONTENT FROM THE FANTASY CONTENT DATABASE
  1808

- ADD THE HOST RESOURCE DOCUMENT TO THE HOST SEGMENT AND THE GUEST REFERENCE TO THE GUEST SEGMENT TO FORM A DYNAMIC RESOURCE DOCUMENT
  1810

- SEND A RESOURCE DOCUMENT RESPONSE TO THE CLIENT DEVICE, THE RESOURCE DOCUMENT RESPONSE INCLUDING THE DYNAMIC RESOURCE DOCUMENT
  1812

*FIG. 18*

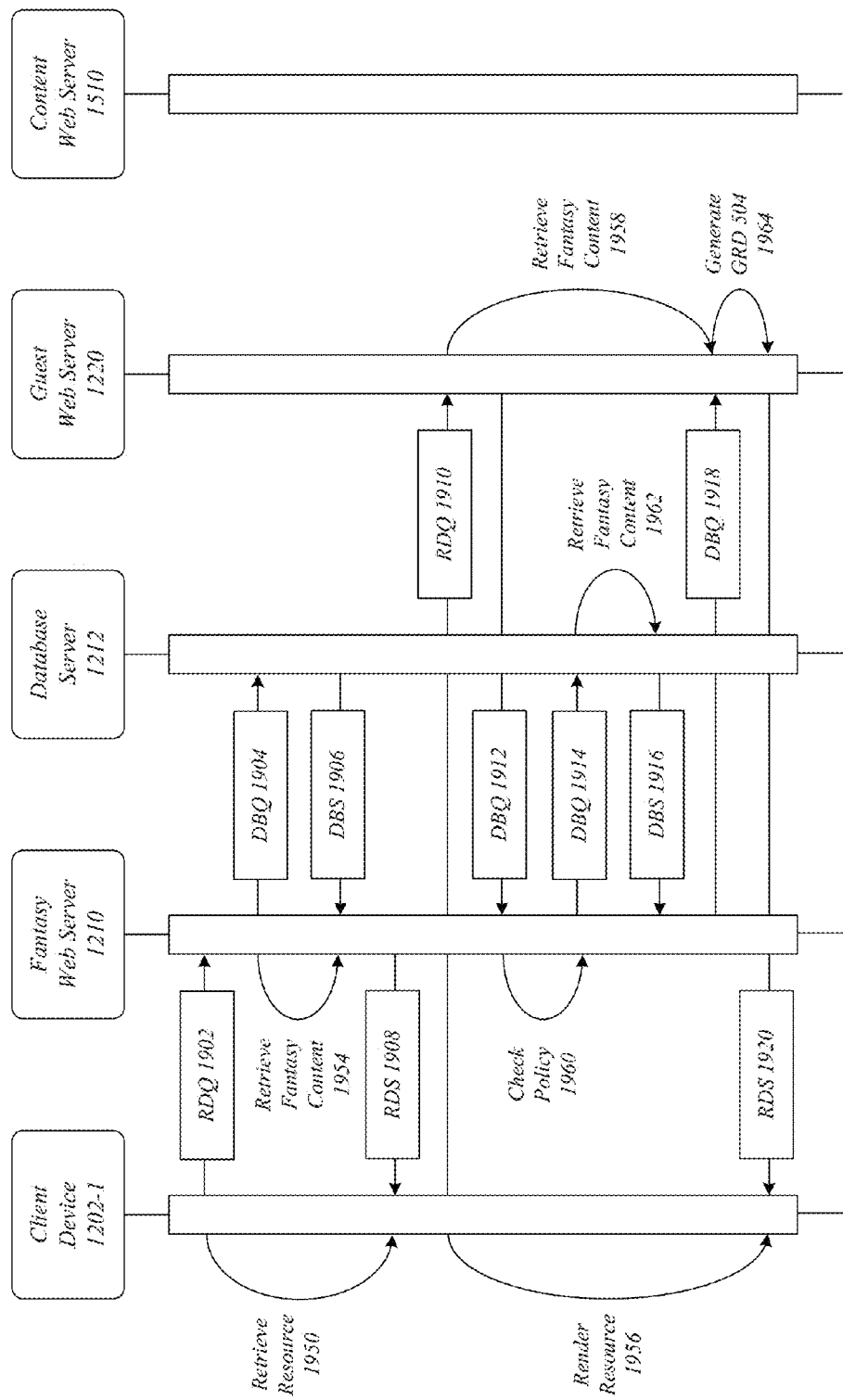

Fantasy Game Computer Platform Architecture Layers

| 0 | Sports 2210 |
|---|---|
| 1 | Fantasy Core 2220 |
| 2 | Product 2230 |
| 3 | Configuration 2240 |
| 4 | Component 2250 |
| 5 | Interface 2260 |
| 6 | Application 2270 |

2300

Fantasy Core Objects

The "*" indicates a pointer to another data structure

2700

INTEGRATION OF CLIENT SIDE APPLICATIONS INTO A FANTASY OPEN PLATFORM ENVIRONMENT

CROSS-REFERENCE TO RELATED APPLICATIONS

This application is a continuation-in-part of pending application Ser. No. 13/332,633 entitled "Fantasy Open Platform Environment" filed on Dec. 21, 2011, and issued on May 20, 2014 as U.S. Pat. No. 8,732,278.

BACKGROUND

A fantasy game is one where participants act as an owner to build a team that competes against other fantasy owners based on statistics generated by real individual players of a game. Fantasy sport is a class of fantasy games. For instance, a fantasy owner might draft a fantasy football team to compete with other fantasy football teams based on statistics generated by real football players from the National Football League (NFL). A common variant uses a computer model to convert statistical performance into points that are compiled and totaled according to a roster selected by a manager of a fantasy team. As with a real team, a fantasy owner is given various online tools to sign, trade and cut fantasy players just like a real team owner.

As popularity of fantasy games increase, a plethora of specialized fantasy applications are developing to support various aspects of a fantasy game. Fantasy games are difficult to learn and win, and therefore fantasy gamers are always looking for an edge over the competition. For instance, before a game season begins, fantasy owners may gather to draft real players for their fantasy teams. The draft typically involves a complex weighing of multiple factors to make a draft decision within a limited period of time. A number of specialized fantasy applications are available that are specifically designed to assist a fantasy owner in drafting players. A fantasy owner may utilize other specialized fantasy applications as well, such as applications designed to customize starting lineups for a game, project player performance, automatically negotiate trades, and so forth.

One problem associated with the proliferation of specialized fantasy software applications, however, is that it creates a disjointed program environment for a fantasy owner. Specialized fantasy applications are not designed to interoperate with each other, and often use completely different sets of fantasy data. As such, each specialized fantasy application is designed with a unique user interface that is presented in a separate portion of a display, such as a user interface frame. It is not uncommon for a fantasy gamer to have multiple applications running simultaneously on a computer, with each application having its own user interface frame, and constantly switching focus between each frame to gather information needed to play one or more fantasy games. Furthermore, some specialized fantasy applications may be native applications installed and executing on a client device, while others are web applications executing on a server device. To engage in a game session, a fantasy gamer may need to search and select the native programs through a program manager to execute the native applications, and launch a web browser and select a uniform resource locator (URL) to execute the web applications, each of which may have separate accounts, payment methods, security credentials, subscription managers, authentication procedures, resource requirements, and so forth. Layer on the fact that many fantasy gamers are frequently playing multiple teams on multiple sites, and this segmented program environment becomes even more disjointed. It is with respect to these and other considerations that the present improvements have been needed.

BRIEF DESCRIPTION OF THE DRAWINGS

FIG. 7 illustrates an embodiment of a fifth operational environment.

FIG. 18 illustrates an embodiment of a logic flow for the apparatus of FIG. 1.

FIG. 19 illustrates an embodiment of a first message flow for the apparatus of FIG. 1.

FIG. 22 illustrates a layered fantasy open platform environment architecture.

DETAILED DESCRIPTION

Figure 1:
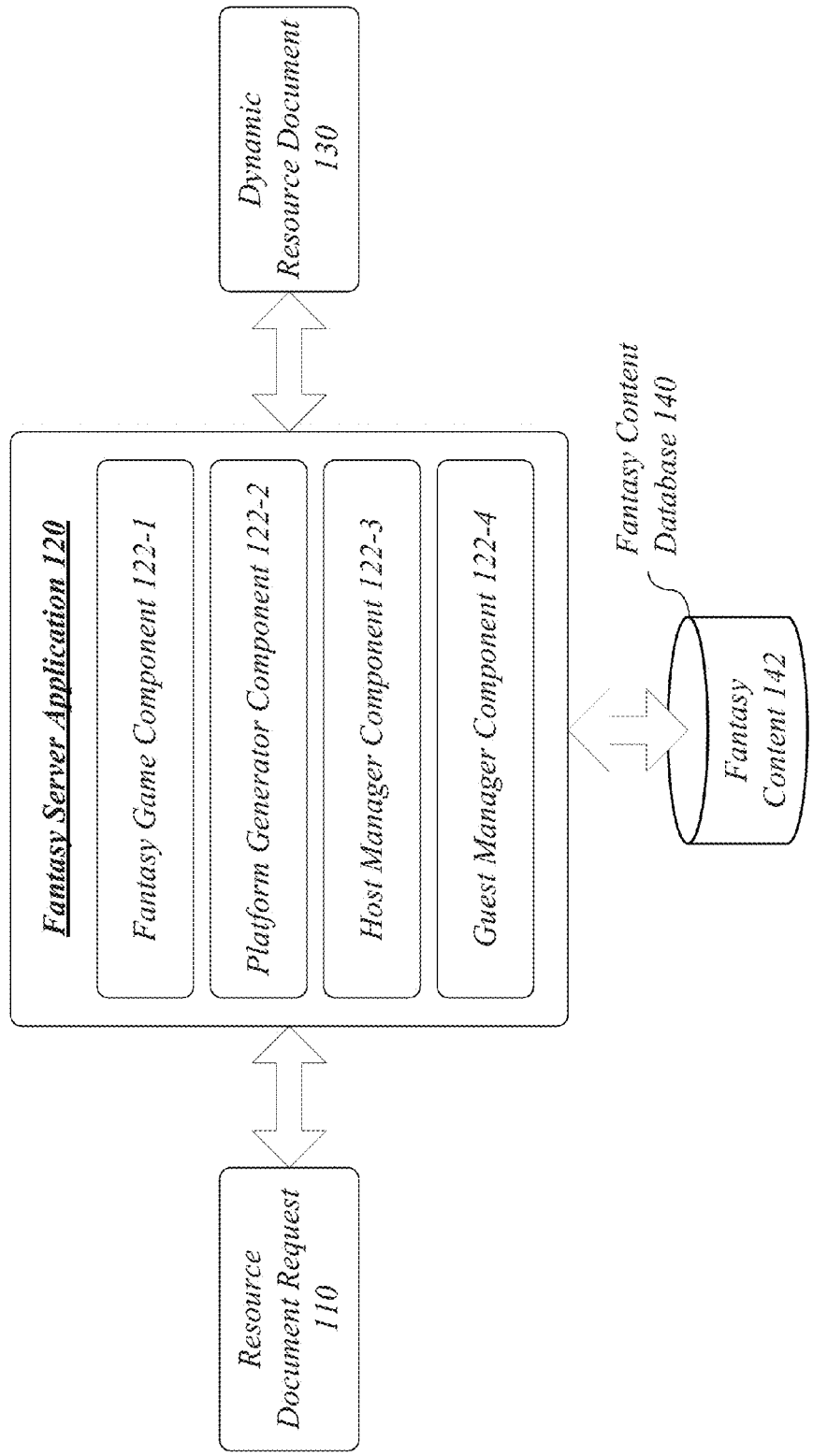
FIG. 1 illustrates an embodiment of a fantasy open platform apparatus.

Various embodiments are generally directed to fantasy games. Some embodiments are particularly directed to a fantasy open platform environment arranged to aggregate heterogeneous fantasy applications, fantasy content, and fantasy data for fantasy games into a unified fantasy framework with a homogeneous user interface.

In general, a game is a system in which players engage in an artificial conflict, defined by rules and a scoring system, resulting in a quantifiable outcome. A fantasy game is a game based on a quantifiable outcome of another game. More particularly, a fantasy game uses a scoring system that is based, at least in part, on a quantifiable outcome of another game in order to obtain a quantifiable outcome for the fantasy game. For instance, a fantasy sport game may comprise a fantasy team selected from human players of a real sport. The fantasy sport game may convert statistical information of human player performance in real sporting competitions (e.g., a football game, a baseball game, etc.) into points that are compiled and totaled according to a roster of a fantasy team. Fantasy players of the fantasy sport game then compete based on the totaled points.

Fantasy games may be based on any type or genre of games. Some examples of games may include without limitation sports, board games, video games, games of chance, lawn games, tabletop games, party games, dexterity games, coordination games, card games, dice games, domino and tile games, guessing games, video games, electronic games, electronic video games, online games, role-playing games, business games, simulation games, television games, reality television games, artificial reality games, and so forth. A fantasy game may be based on any of these or other types of games. A particularly large segment of fantasy games focus on sports, such as football, basketball, baseball, soccer, hockey, racing, and so forth. Recently, emerging fantasy game genres have branched out to include non-sports related games focused on politics, celebrity gossip, movies, and reality television. For instance, fantasy congress is a fantasy game where players, called citizens, could draft members of the United States House and Senate, and keep track of their participation within the U.S. Congress. Actions, especially within the process of making and amending pieces of legislation, of a player's drafted congresspersons were recorded and rated as a cumulative total amount of points against other players. The embodiments are not limited in this context.

Fantasy games may have many fantasy game genres. For example, fantasy sport is a class of fantasy games. A fantasy owner might draft a fantasy football team to compete with other fantasy football teams based on statistics generated by real football players from the National Football League (NFL). Fantasy reality TV is another class of fantasy games. For instance, a fantasy owner might draft a fantasy reality team to compete with other fantasy reality teams based on statistics generated by reality show contestants, such as contestants for such reality shows as Big Brother, Survivor, American Idol, Dancing With The Stars, The Apprentice, Fear Factor, The Amazing Race, and so forth. Fantasy board is another class of fantasy games. For instance, a fantasy owner might draft a fantasy board game team to compete with other fantasy board game teams based on statistics generated by board game contestants, such as chess players, poker players, checker players, monopoly players, or other board games. Fantasy electronic is another class of fantasy games. For instance, a fantasy owner might draft a fantasy electronic game team to compete with other fantasy electronic game teams based on statistics generated by electronic game contestants, such as electronic video game players, electronic gambling game players, and other electronic games. The embodiments are not limited in this context.

As previously described, one problem associated with proliferation of specialized fantasy software applications to support fantasy games is that it creates a disjointed gaming environment for a fantasy player. Embodiments provide a fantasy open platform environment arranged to aggregate heterogeneous fantasy applications, fantasy content, and fantasy data into a unified fantasy framework with a homogeneous user interface. The unified fantasy framework provides several advantages to fantasy gamers, fantasy application developers, and fantasy advertisers.

A fantasy gamer may use the unified fantasy framework to access and use multiple types of fantasy applications, developed or provided by different software vendors, within a single user interface view. As such, a fantasy gamer does not have to leave a fantasy gaming context in order to access services and features offered by different software vendors, or engage in the separate access requirements typically associate with different software products. Further, the different types of fantasy applications may operate on a shared set of fantasy data, or different sets of fantasy data, stored by a single fantasy database managed by the unified fantasy framework. In this manner, a fantasy gamer may view, and in some cases change, a same set of fantasy data surfaced by different fantasy applications even when some fantasy applications are hosted by third-party servers. In addition, a fantasy user may access fantasy content, such as fantasy news and commentary, from various content providers through the single user interface view. In this manner, a fantasy gamer may access heterogeneous fantasy applications and content from different sources through a single user interface view without having to switch between different viewing contexts. As a result a fantasy gamer will be more competitive, entertained, and have a richer gaming experience.

A fantasy application developer may use the unified fantasy framework to develop and market fantasy applications to a wider range of fantasy gamers. Rather than attempting to market and monetize a specialized fantasy application through its own e-commerce web servers to a smaller market, fantasy application developers may advertise and target fantasy gamers attracted by the robustness and convenience of the unified fantasy framework. Furthermore, rather than offering stand-alone applications that need to be purchased, installed and executed by a user as native applications, fantasy application developers may focus on developing web applications sold and access through the unified fantasy framework, thereby enhancing subscription services, advertising revenue, software updates, and distribution mechanisms. In addition, a fantasy application developer may potentially participate in advertisement revenue sharing splits negotiated between a provider of the unified fantasy framework and various advertisers.

A fantasy advertiser may use the unified fantasy framework for targeted advertising campaigns to a wide range of fantasy gamers attracted by the robustness and convenience of the unified fantasy framework and also the multiplicity of specialized fantasy applications. Further, the fantasy advertiser may have more information as to browsing and purchasing patterns of fantasy gamers across a wide array of fantasy applications and fantasy content. This information may be used to provide more finely targeted advertisements to select segments of fantasy gamers.

These and other advantages may be realized through a fantasy server application arranged to manage the unified fantasy framework. The fantasy server application may generate a dynamic resource document, such as an information resource or web page, having various discrete portions allocated to different fantasy applications. Each discrete portion may present a different resource document from a different fantasy application. The different fantasy applications may be native to the unified fantasy framework, or external to the unified fantasy framework, such as third-party software vendors. The different resource documents may include fantasy content from a single fantasy content database. This may occur even when the different fantasy applications are developed and owned by different entities. As a result, the embodiments can improve affordability, scalability, modularity, extendibility, or interoperability for an operator, device or network.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for a fantasy open platform apparatus 100. The fantasy open platform apparatus 100 may be generally designed as a platform for a fantasy player to play fantasy games, sometimes referred to as fantasy gamers. More particularly, the fantasy open platform apparatus 100 may comprise an open platform to support and implement a diverse set of heterogeneous fantasy software applications or programs arranged to provide computer-implemented services and features to fantasy gamers. In addition, the fantasy open platform apparatus 100 may comprise an open platform to provide computer-implemented services and features to various fantasy partners, such as fantasy game providers, developers, advertisers, and other commercial entities supporting fantasy games. As a result, the fantasy open platform apparatus 100 may provide a complete, open and unified eco-system for fantasy games, fantasy gamers, and fantasy partners.

In one embodiment, the fantasy open platform apparatus 100 may comprise a computer-implemented apparatus having a fantasy server application 120 comprising one or more components 122-*a*. Although the fantasy open platform apparatus 100 shown in FIG. 1 has a limited number of elements in a certain topology, it may be appreciated that the fantasy open platform apparatus 100 may include more or less elements in alternate topologies as desired for a given implementation.

It is worthy to note that "a" and "b" and "c" and similar designators as used herein are intended to be variables representing any positive integer. Thus, for example, if an implementation sets a value for a=7, then a complete set of components 122-*a* for the fantasy server application 120 may include components 122-1, 122-2, 122-3, 122-4, 122-5, 122-6 and 122-7. The embodiments are not limited in this context.

The fantasy open platform apparatus 100 may comprise the fantasy server application 120. In the illustrated embodiment shown in FIG. 1, the fantasy server application 120 may comprise a fantasy game component 122-1, a platform generator component 122-2, a host manager component 122-3, and a guest manager component 122-4, among other components 122-*a*.

The fantasy server application 120 may be generally arranged to receive as input a resource document request 110, and generate as output a dynamic resource document 130 with fantasy content 142 from a fantasy content database 140 for a fantasy game. The resource document request 110 may be received from a client device, such as from a web browser implemented by the client device.

Fantasy content 142 may generally refer to any content associate with, or suitable for, one or more fantasy games. Examples of fantasy content 142 may include without limitation fantasy game data, fantasy play data, user data for a fantasy game, multimedia content for fantasy games (e.g., video files, audio files, images, pictures, news articles, etc.), game management data, subscription information, user profiles, player data, team rosters, league rosters, fantasy game results, historical data, statistical data, price data, win rates, loss rates, and any other data associated with a fantasy game. The embodiments are not limited in this context.

A dynamic resource document 130 is a document or information resource that is suitable for presentation on a display. In one embodiment, for example, a dynamic resource document 130 is an information resource that is suitable for the world wide web (WWW) and can be accessed through a web browser, such as a web page. A web page is a document coded in a markup language, and may provide navigation to other web pages via hypertext links. A web page may comprise a static web page having files of static text and other content stored within a file system for a web server. A web page may comprise a dynamic web page constructed by server-side software when they are requested. A web page may subsume other resources such as style sheets, scripts and images into their final presentation. For instance, a web page may utilize client side scripting to make the web page more responsive to user input once on a client browser. In one embodiment, a dynamic resource document 130 may be implemented as a dynamic web page.

A markup language is a modern system for annotating a text in a way that is syntactically distinguishable from that text. Some markup languages, like hypertext markup language (HTML) have presentation semantics, meaning their specification prescribes how the structured data is to be presented, but other markup languages, like extensible markup language (XML), have no predefined semantics. In either case, markup tags used by the markup language are typically omitted from the version of the text which is displayed for end-user consumption. Examples of markup languages suitable for a dynamic resource document 130 may include without limitation a generalized markup language (GML), standard generalized markup language (SGML), HTML, XML, extensible HTML (XHTML), or variants of each. For instance, there are numerous variants of XML that have been customized for different applications or protocols. The embodiments are not limited in this context.

The fantasy server application 120 may comprise a fantasy game component 122-1. The fantasy game component 122-1 may be generally arranged to provide, manage, or coordinate one or more fantasy games for the fantasy server application 120. A fantasy game may comprise or be implemented as any type of fantasy game from any type of fantasy game genre, as previously described. The embodiments are not limited in this context.

The fantasy server application 120 may comprise a platform generator component 122-2. The platform generator component 122-2 may be generally arranged to generate a dynamic resource document 130. The platform generator component 122-2 may retrieve information from various applications, databases, and servers of the unified fantasy framework, and organize the retrieved information into a dynamic resource document 130 in a way that is easily consumed by a user of a client device.

The fantasy server application 120 may comprise a host manager component 122-3. The host manager component 122-3 may be generally arranged to manage information suitable for a dynamic resource document 130 that is sourced from fantasy applications that are native to the unified fantasy framework. The host manager component 122-3 may automatically retrieve and format this information for inclusion in a dynamic resource document 130.

The fantasy server application 120 may comprise a guest manager component 122-4. The guest manager component 122-4 may be generally arranged to manage information suitable for a dynamic resource document 130 that is sourced from fantasy applications that are not native to the unified fantasy framework. In one embodiment, the guest manager component 122-4 may automatically retrieve and format this information for inclusion in a dynamic resource document 130. In one embodiment, the guest manager component 122-4 may automatically generate a reference to this information, and not the actual information, for inclusion in a dynamic resource document 130.

Once the fantasy server application 120 generates a dynamic resource document 130, the fantasy server application 120 may send the dynamic resource document 130 to a requesting entity that originally sent a resource document request 110, such as a web browser of a client device. The web browser may then render the dynamic resource document 130 for presentation to a user.

Figure 2:
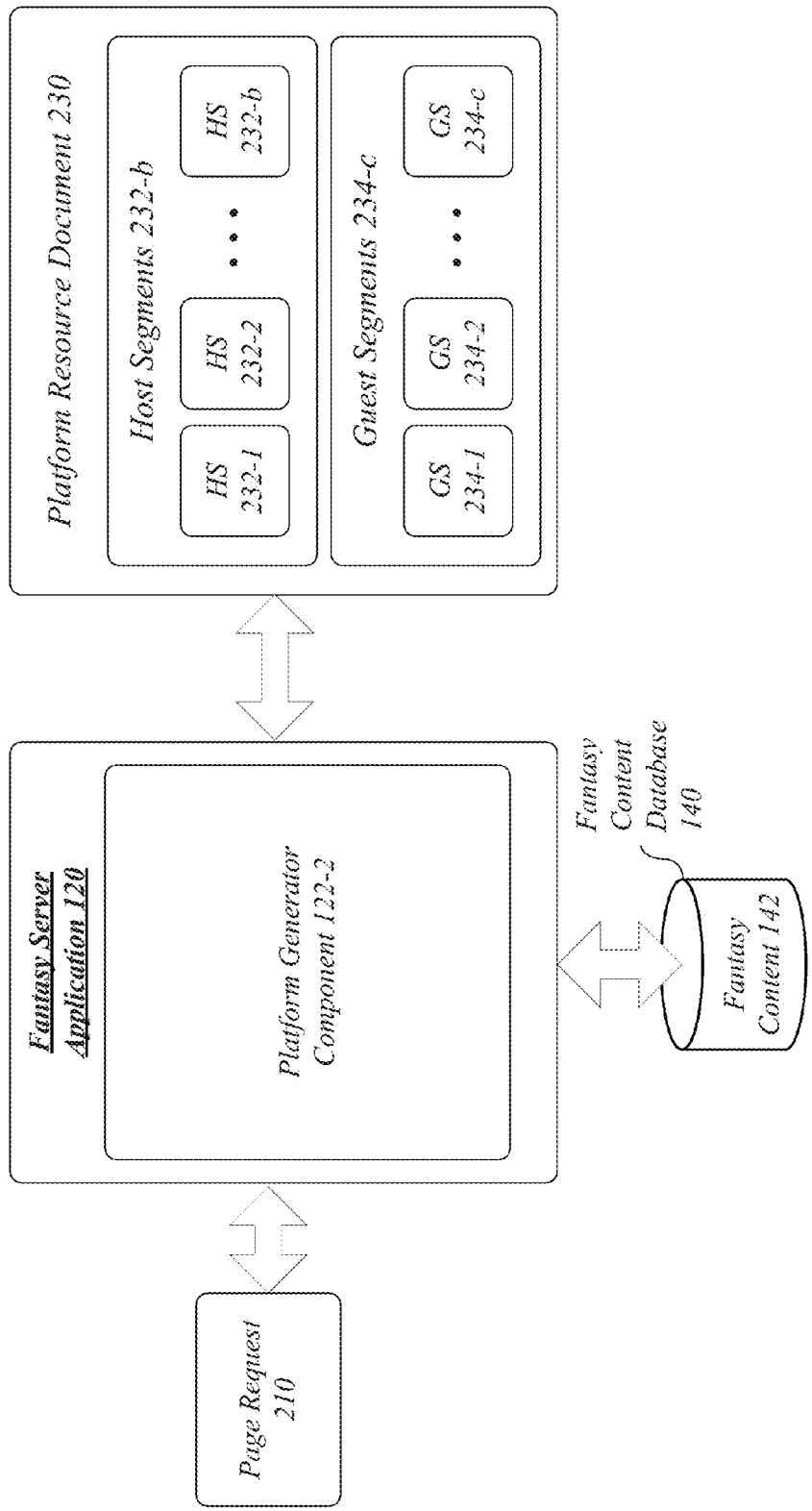
FIG. 2 illustrates an embodiment of a first operational environment.

FIG. 2 illustrates an embodiment of an operational environment 200 for the fantasy open platform apparatus 100. The operational environment 200 illustrates a more detailed block diagram for the platform generator component 122-2.

As shown in FIG. 2, the platform generator component 122-2 may be arranged to receive a page request 210. The fantasy server application 120 may generate a page request 210 in response to a resource document request 110 from a client device. The platform generator component 122-2 may generate a platform resource document 230. The platform resource document 230 may be a general surface or template that can be populated with different types of information from various sources.

A platform resource document 230 may have multiple segments of different segment types to accommodate the different types of information. A segment may generally comprise a discrete portion of a platform resource document 230, such as a frame or group box. In the context of graphical user interface (GUI), a frame surrounds a collection of GUI elements. In the context of a web page, a frame may also surround a collection of GUI elements. In addition, a web page frame allows a user interface of a visual browser window to be split into discrete portions, each of which can show a different document (or portion of a document). This can lower bandwidth use, as repeating parts of a layout can be used in one frame, while variable content is display in another frame.

When using web browsers, the terms "frame" or "frameset" or "framing" generally refer to the display of two or more web pages or media elements displayed within a same visual browser window. The two or more web pages may be positioned adjacent to each other, or one web page may be embedded within another web page. The web pages or media elements may come from the same web site or from multiple different web sites. In one sense, a frame allows a web page to be presented within a larger web page. A framed web page may have dedicated user interface controls to allow manipulation of the framed web page, such as a scroll bar to individually scroll the framed web page without moving a framing web page presenting the framed web page. Implementation of a frame may vary according to a given markup language used to construct a platform resource document 230 and/or a dynamic resource document 130.

In one embodiment, a segment may comprise a frame for a HTML document. A HTML document may have a general frame for a HTML document, and an inline frame for another HTML document within the general frame. In HTML, the inline frame may be defined by an iframe element, which controls attributes of an inline frame, such as attributes used to define an inline frame layout (e.g., rows and cols attributes). An inline frame can be a target frame for links or references defined by other elements, and can be selected by a user as a focus for viewing a HTML document in the inline frame, printing, copying, and so forth. Although some embodiments may refer to an inline frame as an example of a segment for a platform resource document 230, it may be appreciated that other framing elements defined by other markup languages may be used as well. For instance, a platform resource document 230 generated in an XML format may utilize XFrames for combining and organizing web based documents together in a single webpage through the use of frames. In other examples, segments may be constructed using cascading style sheets (CSS), server-side scripting languages (e.g., server-side includes (SSI), hypertext preprocessor (PHP), and other scripting languages), and other techniques. The embodiments are not limited in this context.

A platform resource document 230 may include a first segment type referred to as a host segment 232-*b*. A host segment 232-*b* is generally arranged to present a host resource document from a host server program. Examples for a host resource document and a host server program may be described with reference to FIG. 3.

A platform resource document 230 may include a second segment type referred to as a guest segment 234-*c*. A guest segment 234-*c* is generally arranged to present a guest resource document from a guest server program. Examples for a guest resource document and a guest server program may be described with reference to FIG. 5.

Figure 3:
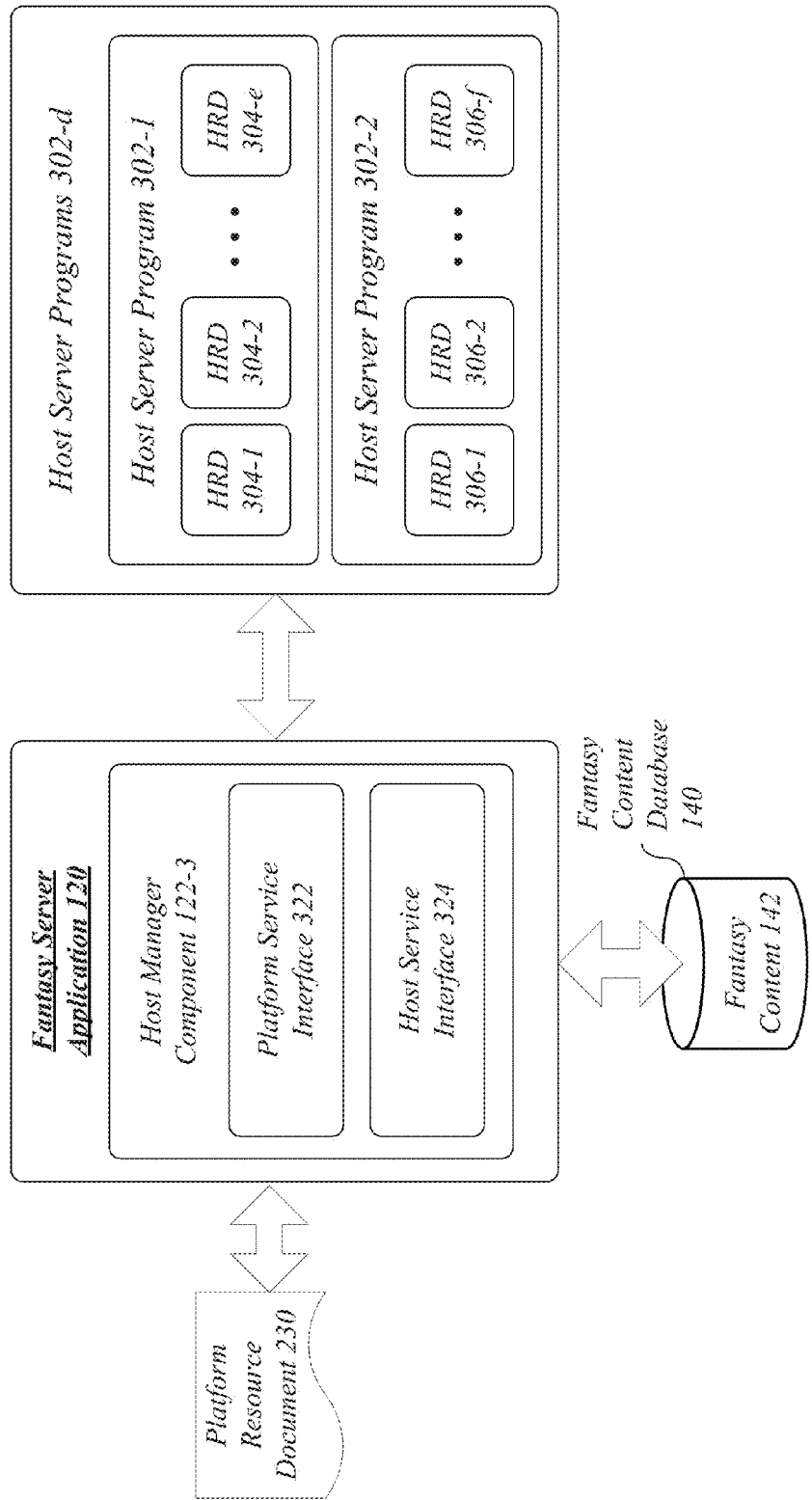
FIG. 3 illustrates an embodiment of a first operational environment.

FIG. 3 illustrates an embodiment of an operational environment 300 for the fantasy open platform apparatus 100. The operational environment 300 illustrates a more detailed block diagram for the host manager component 122-3.

The host manager component 122-2 may be arranged to send a request to a host server program 302-*d* to generate a host resource document 304-*e* with fantasy content 142 from the fantasy content database 140. The host manager component 122-3 may receive a response with the host resource document 304-*e* from the host server program 302-*d*, and add the host resource document 304-*e* to a corresponding host segment 232-*b* of the platform resource document 230.

As shown in FIG. 3, the host server programs 302-*d* may include host server programs 302-1, 302-2. The host server program 302-1 may generate one or more host resource documents 304-*e*. The host server program 302-2 may generate one or more host resource documents 306-*f*. One example for host resource documents 304-*e*, 306-*f* may comprise a web page for a web browser. The host server programs 302-1, 302-2 may generate one or more host resource documents 304-*e*, 3061, respectively, using fantasy content 142 from the fantasy content database 140 managed by the fantasy server application 120.

A host server program 302-*d*, such as the host server programs 302-1, 302-2, may comprise a set of one or more software components designed to add or extend specific capabilities to a larger software application, similar to a plug-in, add-in, add-on, snap-in, or extension. In this case, the larger software application is the fantasy server application 120. A host server program 302-*d* customizes functionally provided by the fantasy server application 120. The term "host" is used to identify a server program that is developed by a same application developer as the fantasy server application 120. For instance, assume the fantasy server application 120 is designed, developed or maintained by an entity such as CBSSports.com® owned by CBS® Interactive. A host server program 302-*d* may comprise a server program designed, developed or maintained by CBSSports.com. In other words, a host server program 302-*d* is a native application of CBSSports.com, thereby insuring a high-level of integration and compatibility with the fantasy server application 120.

Examples of some entities that develop both a fantasy server application 120 and host server programs 302-*d* may include without limitation CBSSports.com, Citizen Sports (Yahoo!), FanDuel.com, FaGames.net, FantasyPlanet.com, Fantasy911.com, FantasySP.com, Fantazzle.com, Kabam (formerly Watercooler), MaximumFantasySports.com, MyFantasyLeague.com, MyFFPC.com (Fantasy Football Players Championship), OnRoto.com, RapidDraft.com, RTSports.com, RotoHog.com, RotoPicks.com, Sports Technologies, U-Sports.com, WCOFS.com (World Championships of Fantasy Football), WhatIfSports.com, among others. The embodiments are not limited in this context.

As shown in FIG. 3, the host manager component 122-3 may comprise a platform server interface 322 and a host service interface 324. The platform server interface 322 may generally comprise a standardized set of application program interfaces (APIs) to allow a host server program 302-*d* to access services provided by the fantasy server application 120, such as registering with the fantasy server application 120, providing a protocol for exchanging data with the fantasy server application 120, a data schema for data exchanged with the fantasy server application 120, and so forth. The host server interface 324 may generally comprise a standardized set of APIs to allow the fantasy server application 120 to access services provided by a host server program 302-*d*.

The fantasy server application 120 and the host server program 302-*d* may utilize the platform server interface 322 or the host service interface 324 to integrate services, features and functionality provided by both. This extension architecture allows the fantasy server application 120 to provide a compact baseline application that can be extended to customize or personalize the fantasy server application 120 to a particular fantasy user.

Figure 4:
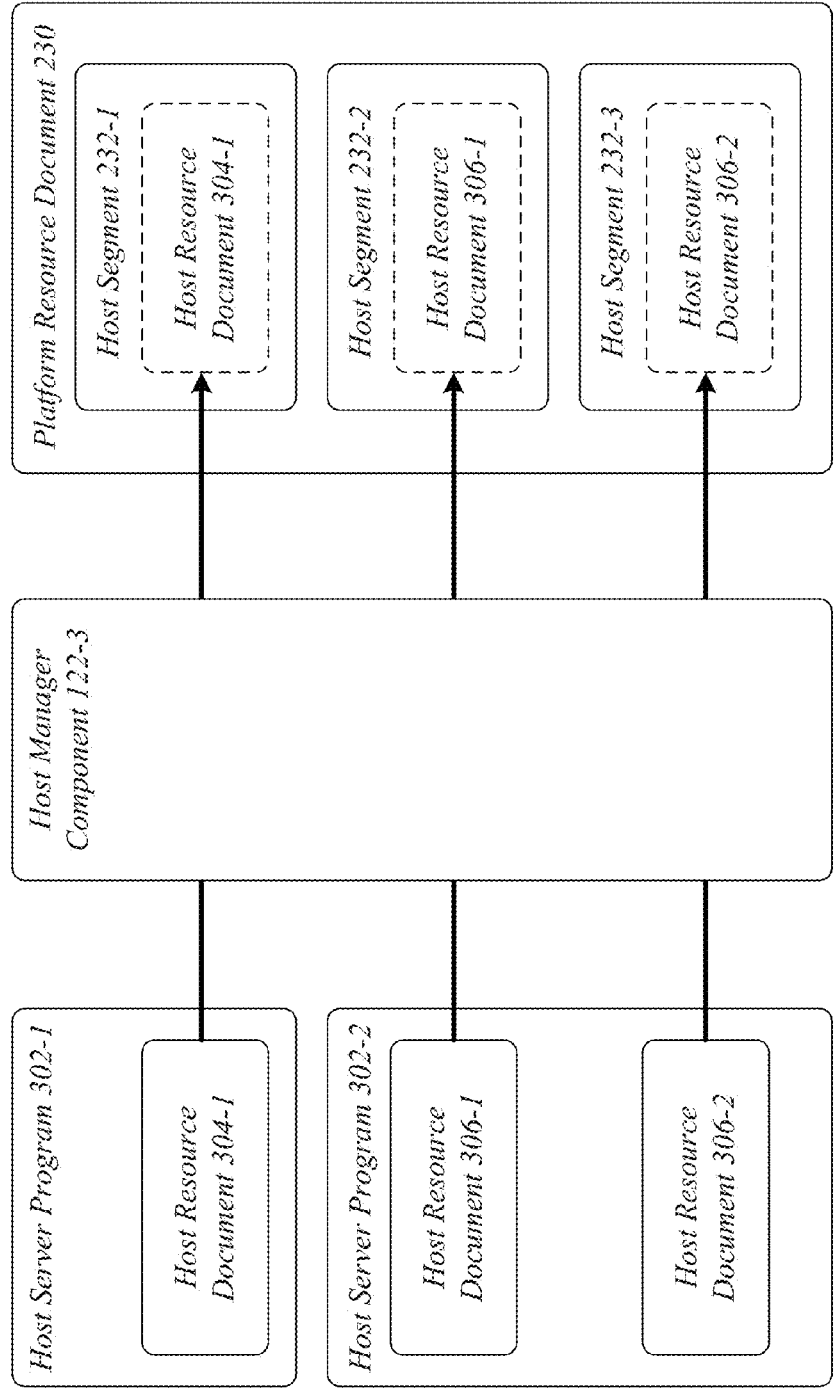
FIG. 4 illustrates an embodiment of a second operational environment.

FIG. 4 illustrates an embodiment of an operational environment 400 for the fantasy open platform apparatus 100. The operational environment 400 illustrates a more detailed diagram of adding various host resource documents 304-*e*, 306-*f* to host segments 232-*b* of a platform resource document 230.

As shown in FIG. 4, the platform resource document 230 may include host segments 232-1, 232-2 and 232-3. The host server programs 302-*d* may include host programs 302-1, 302-1. The host program 302-1 may generate a host resource document 304-1. The host program 302-2 may generate host resource documents 306-1, 306-2. The host manager component 122-3 may receive the host resource document 304-1 from the host server program 302-1, and add the host resource document 304-1 to the host segment 232-1 of the platform resource document 230. The host manager component 122-3 may also receive the host resource documents 306-1, 306-2 from the host server program 302-2, and add the host resource documents 306-1, 306-2 to the host segments 232-2, 232-3, respectively, of the platform resource document 230.

Figure 5:
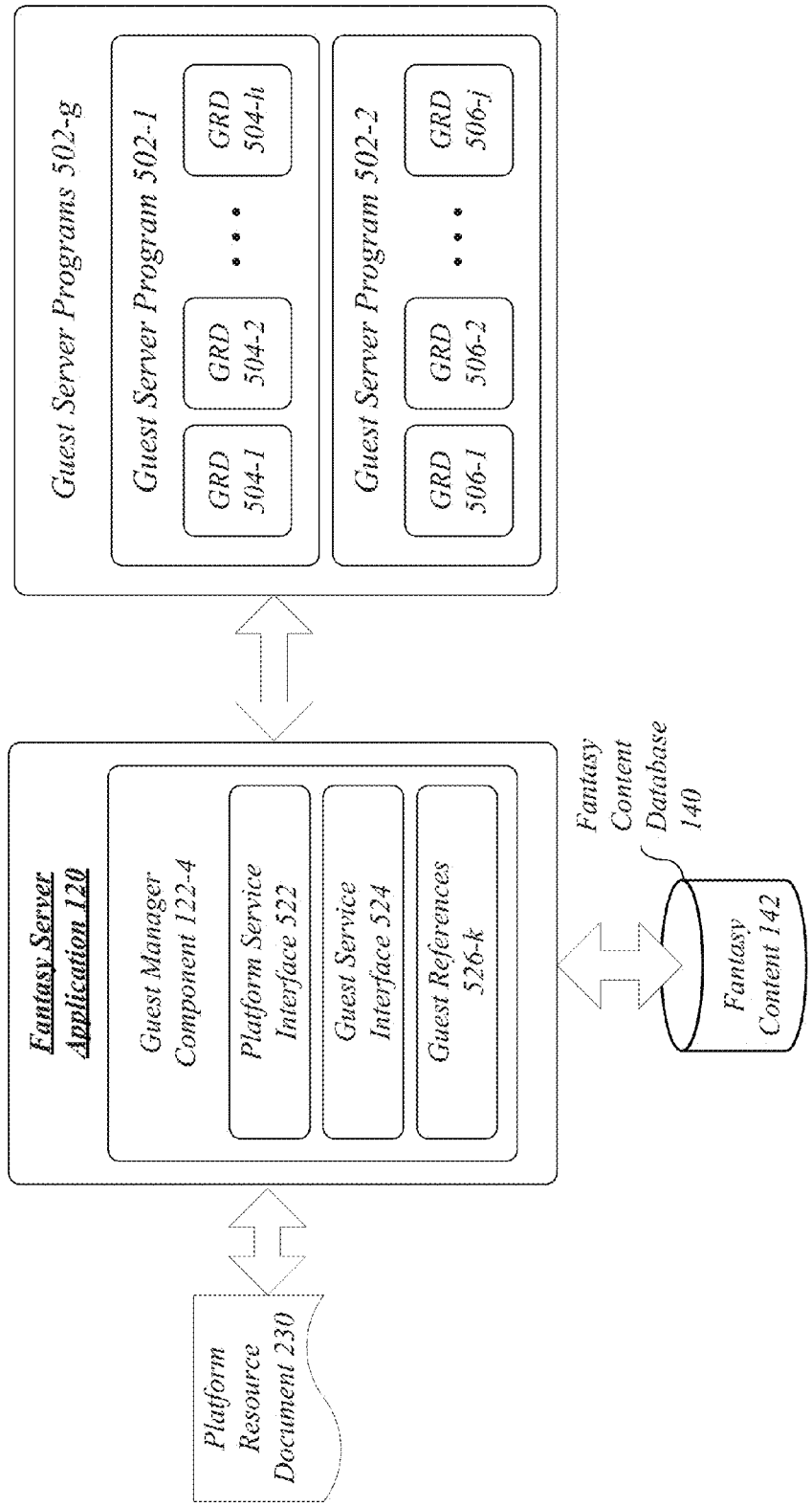
FIG. 5 illustrates an embodiment of a third operational environment.

FIG. 5 illustrates an embodiment of an operational environment 500 for the fantasy open platform apparatus 100. The operational environment 500 illustrates a more detailed block diagram for the guest manager component 122-4.

As shown in FIG. 5, the guest server programs 502-*g* may include guest server programs 502-1, 502-2. The guest server program 502-1 may generate one or more guest resource documents 504-*h*. The guest server program 502-2 may generate one or more guest resource documents 506-*j*. One example for guest resource documents 504-*h*, 506-*j* may comprise a web page for a web browser. The guest server programs 502-1, 502-2 may generate one or more guest resource documents 504-*h*, 506-*j*, respectively, using fantasy content 142 from the fantasy content database 140 managed by the fantasy server application 120.

A guest server program 502-*g*, such as the guest server programs 502-1, 502-2, may be similar to the host server programs 302-*d* in that each may comprise a set of one or more software components designed to add or extend specific capabilities to a larger software application, similar to a plug-in, add-in, add-on, snap-in, or extension. In this case, the larger software application is the fantasy server application 120. A guest server program 502-g customizes functionally provided by the fantasy server application 120. The term "guest" is used to identify a server program that is developed by a different application developer from the one that developed the fantasy server application 120, sometimes referred to as a "third party developer." For instance, assume the fantasy server application 120 is designed, developed or maintained by an entity such as CBSSports.com® owned by CBS® Interactive. A guest server program 502-g may comprise a server program designed, developed or maintained by a different entity, such as developers of fantasy tools useful for managing and playing fantasy games. In other words, a guest server program 502-g is not a native application of CBSSports.com, thereby providing a lower level of integration and compatibility with the fantasy server application 120 relative to a host server program 302-d.

Examples of entities of guest server programs 502-g may include without limitation developers such as Accuscore, Advanced Sports Logic, Bignoggins Productions LLC (FantasyMonsterApp.com), BloombergSports.com, DraftDynamix.com, DraftDude.com, FantasyDraftboard.com (Fansoft Media), FantasyFanatics.com, FantasyFootballCalculator.com, FantasyJudgement.com, FantasyNation.com, FantasySportsInsurance.com, Fantistics.com, LeagueSafe.com, MockDraftCentral.com, PickemFirst.com, RotoChamp.com, Rotolab.com, ScoutProFF.com (Competitive Sports Analysis LLC), Tableau, Ziguana.com, among others.

As shown in FIG. 5, the guest manager component 122-4 may comprise a platform server interface 522 and a guest service interface 524. The platform server interface 522 and the guest service interface 524 may generally comprise a standardized set of application program interfaces (APIs) to allow a guest server program 502-g to interact with the fantasy server application 120 in a manner similar to the platform server interface 322 and the host service interface 524, respectively, as described with reference to FIG. 3.

The fantasy server application 120 and the guest server program 502-g may utilize the platform server interface 522 or the guest service interface 524 to integrate services, features and functionality provided by both. This extension architecture allows the fantasy server application 120 to provide a compact baseline application that can be extended to customize or personalize the fantasy server application 120 to a particular fantasy user.

In operation, the guest manager component 122-4 may be arranged to generate a guest reference 526-k for use by a client device. The guest reference 526-k may be arranged to refer the client device to a guest server program 502-1, 502-2 arranged to generate a guest resource document 504-h, 506-j, respectively, with fantasy content 142 from the fantasy content database 140. The guest manager component 122-4 may add the guest reference 526-k to the guest server program 502-g to a guest segment 234-c of the platform resource document 230.

A guest reference 526-k may generally comprise a reference, link or pointer used to navigate a web browser to a guest server program 502-g and/or a guest resource document 504-h, 506-j of a guest server program 502-g. A guest reference 526-k may comprise a reference or pointer to a guest server program 502-g and/or a guest resource document 504-h, 506-j of a guest server program 502-g that a user can directly follow, or that is followed automatically by a program, such as a web browser. References are data types that refer to a referent elsewhere in memory of a device (e.g., a server) and are used to access the referent. Generally, a reference is a value that enables a program to directly access the referent. The referent may be stored on a same device as the reference or a different device as the reference. Most programming languages support some form of reference. Examples for the guest reference 526-k may include without limitation hypertext and hyperlinks, such as those used by the World Wide Web (WWW). Hypertext is text with hyperlinks. A hyperlink typically comprises an anchor, which is a location within a message from which the hyperlink can be followed. The target of a hyperlink is a guest server program 502-g and/or a guest resource document 504-h, 506-j of a guest server program 502-g to which the hyperlink leads. The user can follow the link when its anchor is shown by activating it in some way, such as by touching it (e.g., with a touch screen display) or clicking on it with a pointing device (e.g., a mouse). When a guest reference 526-k is activated its target is displayed, via the web browser or an application program.

In one embodiment, for example, a guest reference 526-k may be implemented as a hyperlink. The hyperlink may point to a guest server program 502-g and/or a guest resource document 504-h, 506-j of a guest server program 502-g. For instance, the hyperlink may point to a uniform resource locator or universal resource locator (URL), a uniform resource identifier (URI), an internationalized resource identifier (IRI), identifiers based on resource description framework (RDF), and other unique network identifiers for a guest server program 502-g and/or a guest resource document 504-h, 506-j of a guest server program 502-g. A guest reference 526-k may be implemented using other types of references as well. The embodiments are not limited in this context.

Figure 6A:
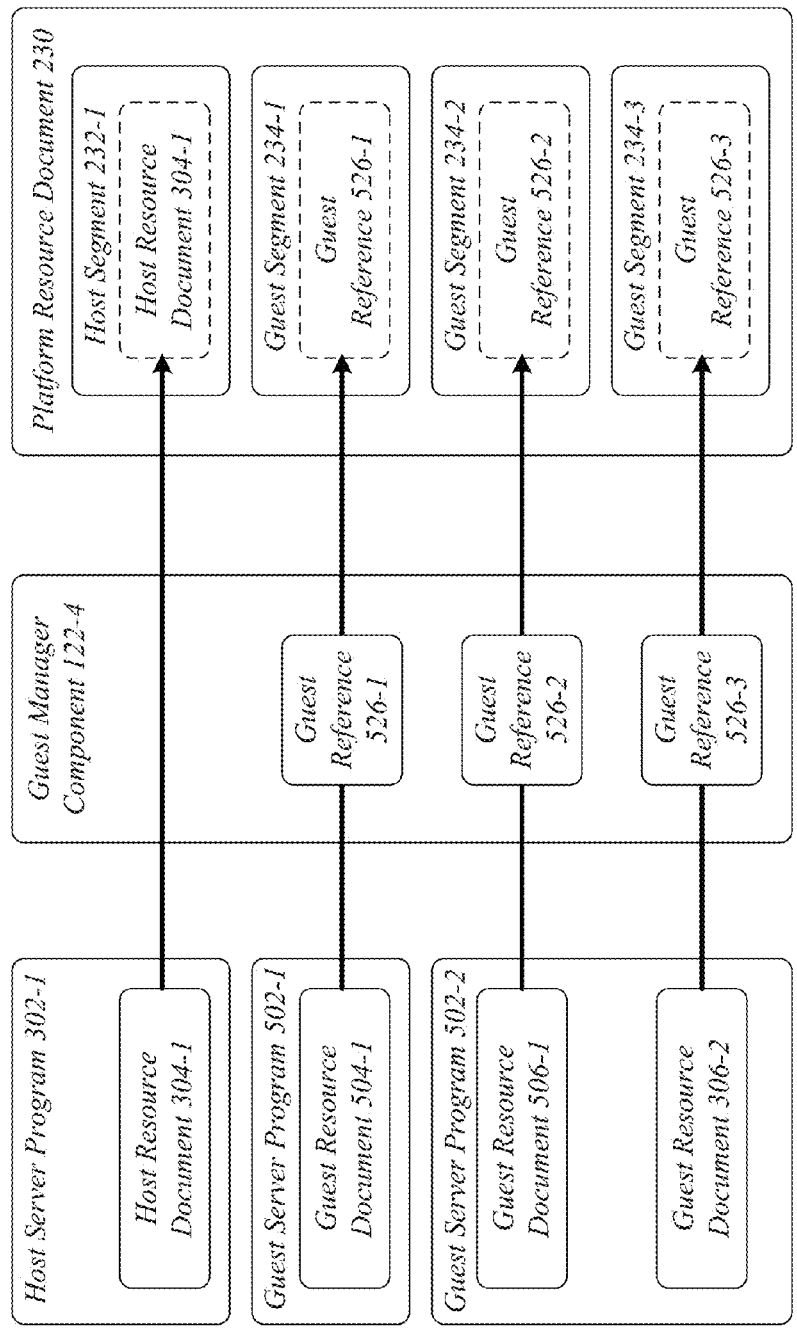
FIG. 6A illustrates an embodiment of a fourth operational environment.
Figure 6B:
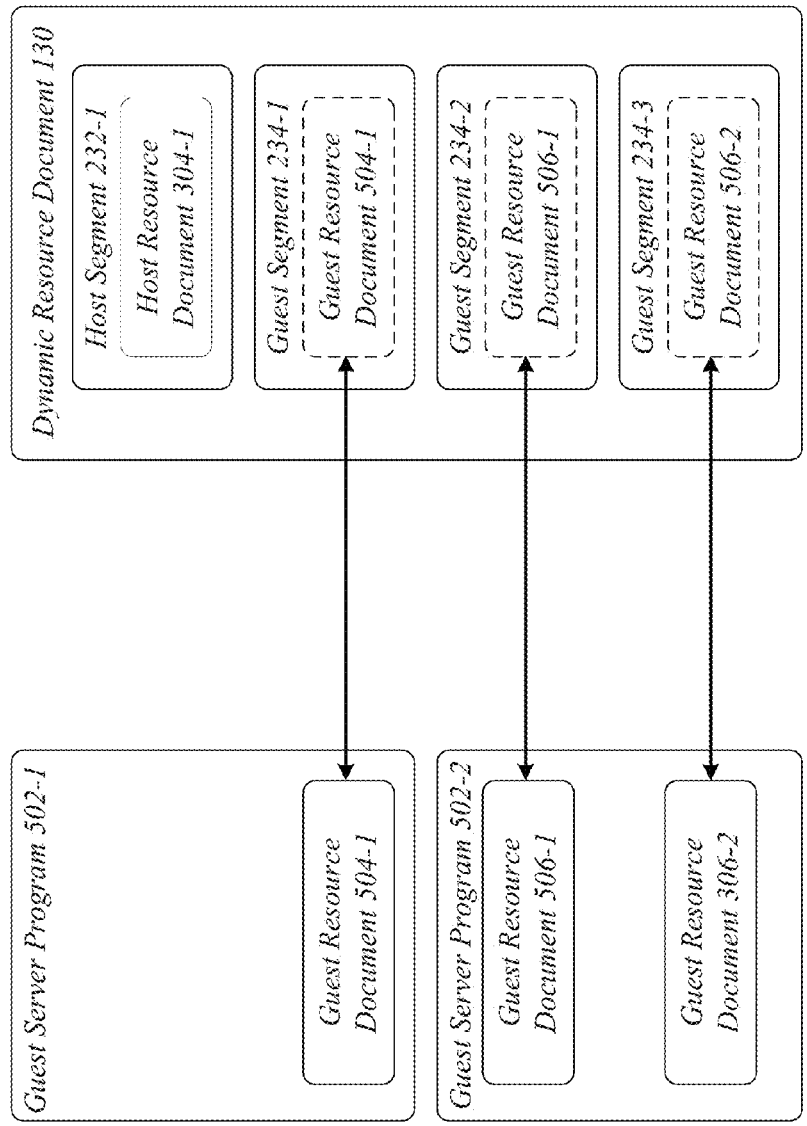
FIG. 6B illustrates an embodiment of a fourth operational environment.

FIGS. 6A, 6B illustrates an embodiment of an operational environment 600 for the fantasy open platform apparatus 100. The operational environment 600 illustrates a more detailed block diagram for adding various guest resource documents to guest segments 234-c.

In the example shown in FIG. 6A, the platform resource document 230 may include a host segment 232-1 and guest segments 234-1, 234-2 and 234-3. As previously described, the host manager component 222-2 may add the host resource document 304-1 generated by the host server program 302-1 to the host segment 232-1 of the platform resource document 230. In addition, the guest server programs 502-g may include guest programs 502-1, 502-1. The guest program 502-1 may generate a guest resource document 504-1. The guest program 502-2 may generate guest resource documents 506-1, 506-2.

The guest manager component 122-4 may identify the guest resource document 504-1 of the guest server program 502-1, generate a guest reference 526-1 to the guest resource document 504-1 and/or the guest server program 502-1, and add the guest reference 526-1 of the resource document 504-1 to the guest segment 234-1. Similarly, the guest manager component 122-4 may identify the guest resource documents 506-1, 506-2 from the guest server program 502-2, generate guest references 526-2, 526-3 for the respective guest resource documents 506-1, 506-2 and/or the guest server program 502-2, and add the guest references 526-2, 526-3 of the resource documents 506-1, 506-2 to the guest segments 234-2, 234-3, respectively.

As shown in FIG. 6B, when the platform resource document 230 is sent as a dynamic resource document 130 to a web browser of a client device, the web browser may render the dynamic resource document 130. During rendering operations, the web browser may automatically follow the guest references 526-1, 526-2 and 526-3 to populate the guest segments 234-1, 234-2 and 234-3 with the guest resource documents 504-1, 506-1 and 506-2, respectively, as generated by the guest resource programs 502-1, 502-2 for viewing by a user.

FIG. 7 illustrates an embodiment of an operational environment 700 for the fantasy open platform apparatus 100. The operational environment 700 illustrates a more detailed block diagram for the fantasy server application 120 including a page server component 122-5.

As shown in FIG. 7, the fantasy server application 120 may receive as input a resource document request 110 from a web browser 702 of a client device. Once the fantasy server application 120 generates a dynamic resource document 130 as previously described, the page server component 122-5 may send the dynamic resource document 130 with fantasy content 142 from the fantasy content database 140 to the web browser 702 of the client device. The dynamic resource document 130 may comprise, for example, a platform resource document 230 with a host resource document 304-*e* in a host segment 232-*b* and a guest reference 526-*k* to a guest server program 502-*g* in a guest segment 234-*c*. The web browser 702 may then render the dynamic resource document 130 for presentation to a user as described with reference to FIG. 6B.

Once a dynamic resource document 130 is rendered by the web browser 702, a user may view fantasy content 142 presented by the host resource document 304-1 and the guest resource documents 504-1, 506-1 and 506-2 in a single web browser window. In this manner, a user does not have to switch between web browser windows, or web browsers 702, to access and view native applications generated by the host server program 302-1 and third-party applications generated by the guest server programs 502-1, 502-2. Furthermore, a user may manipulate fantasy content 142 presented by the host resource document 304-1 and the guest resource documents 504-1, 506-1 and 506-2 in a similar manner since they all present fantasy content 142 from a single fantasy content database 140.

Figure 8:
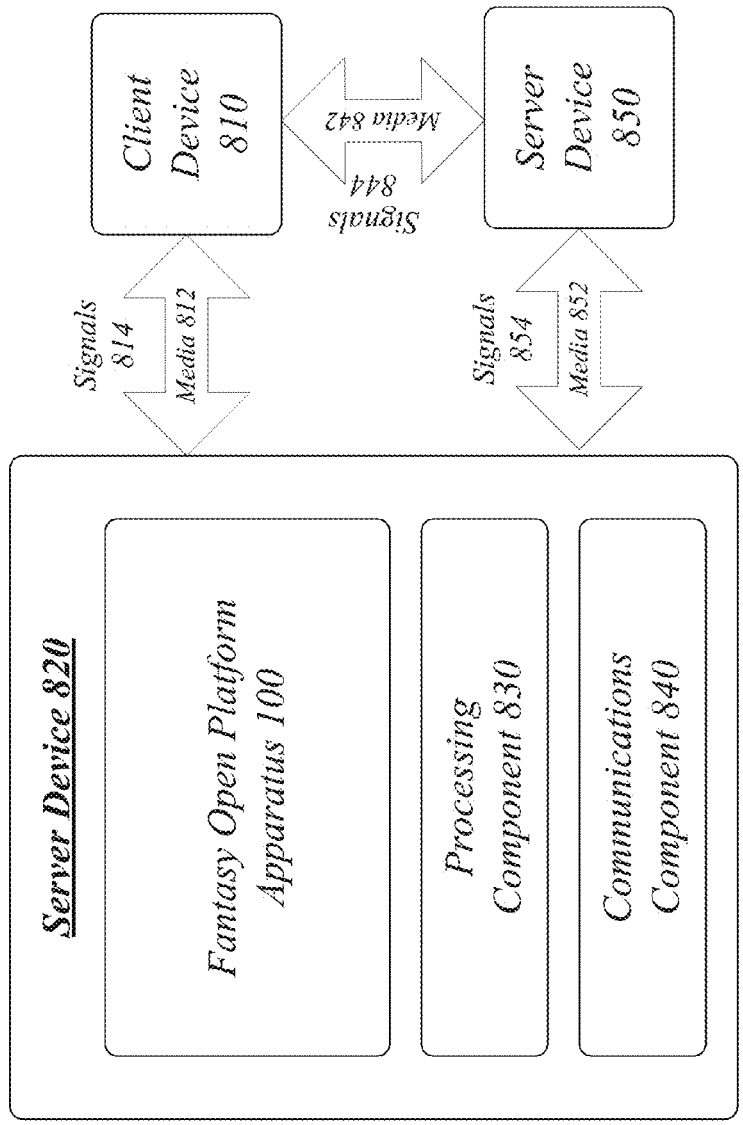
FIG. 8 illustrates an embodiment of a first fantasy system.

FIG. 8 illustrates a block diagram of a fantasy system 800. The fantasy system 800 may implement some or all of the structure and/or operations for the fantasy open platform apparatus 100 in a single computing entity, such as entirely within a server device 820.

The server device 820 may comprise any electronic device configured with server-side applications capable of receiving, processing, and sending information for the fantasy open platform apparatus 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The server device 820 may execute processing operations or logic for the fantasy open platform apparatus 100 using a processing component 830. The processing component 830 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The server device 820 may execute communications operations or logic for the fantasy open platform apparatus 100 using communications component 840. The communications component 840 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 840 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 812, 842 and 852 may be implemented as wired communications media, wireless communications media, or a combination of both. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. Other examples for communications component 840 are given with reference to FIGS. 21, 22.

The server device 820 may communicate with a client device 810 and a server device 850 over a communications media 812, 842, respectively, using communications signals 814, 844, respectively, via the communications component 840. Similarly, the client device 810 and the server device 850 may communicate with each other over a communications media 852 using communications signals 854 via communications components similar to the communications component 840. The client device 810 and/or the server device 850 may be internal or external to the server device 820 as desired for a given implementation.

With respect to wired communications, for example, communications components 840 may comprise a network interface designed to communicate information over a packet-switched network such as the Internet. The communications components 840 may be arranged to provide data communications functionally in accordance with different types of wired network systems or protocols. Examples of suitable wired network systems offering data communication services may include the Internet Engineering Task Force (IETF) Internet protocol suite and the International Organization for Standardization (ISO) or International Telecommunication Union (ITU) Telecommunication Standardization Sector (ITU-T) Open Systems Interconnection (OSI) protocol suite. Examples of the IETF Internet protocol suite may include networking protocols organized into four hierarchical abstraction layers, including a link layer, an internet layer, a transport layer and an application layer. Examples of the ISO/ITU-T OSI protocol suite may include networking protocols organized into seven hierarchical abstraction layers, including a physical layer, a data link layer, a network layer, a transport layer, a session layer, a presentation layer, and an application layer.

In one embodiment, the communications component 840 may utilize networking protocols from the Internet protocol suite. For instance, the communications component 840 may implement a link layer protocol such as defined by the Institute of Electrical and Electronics Engineering (IEEE) 802 specifications. The communications component 840 may implement an internet layer protocol such as the IETF Internet Protocol (IP). The communications component 840 may implement a transport layer protocol such as the IETF Transmission Control Protocol (TCP), the User Datagram Protocol (UDP), the UDP Lite protocol, the Datagram Congestion Control Protocol (DCCP), the Stream Control Transmission Protocol (SCTP), and so forth. The communications component 840 may implement an application layer protocol such as the IETF Hypertext Transfer Protocol (HTTP), Real-Time Transport Protocol (RTP), RTP Control Protocol (RTCP), and so forth. It may be appreciated that these are merely a few representative examples, and other wired communications techniques may be implemented as well. The embodiments are not limited in this context.

Figure 9:
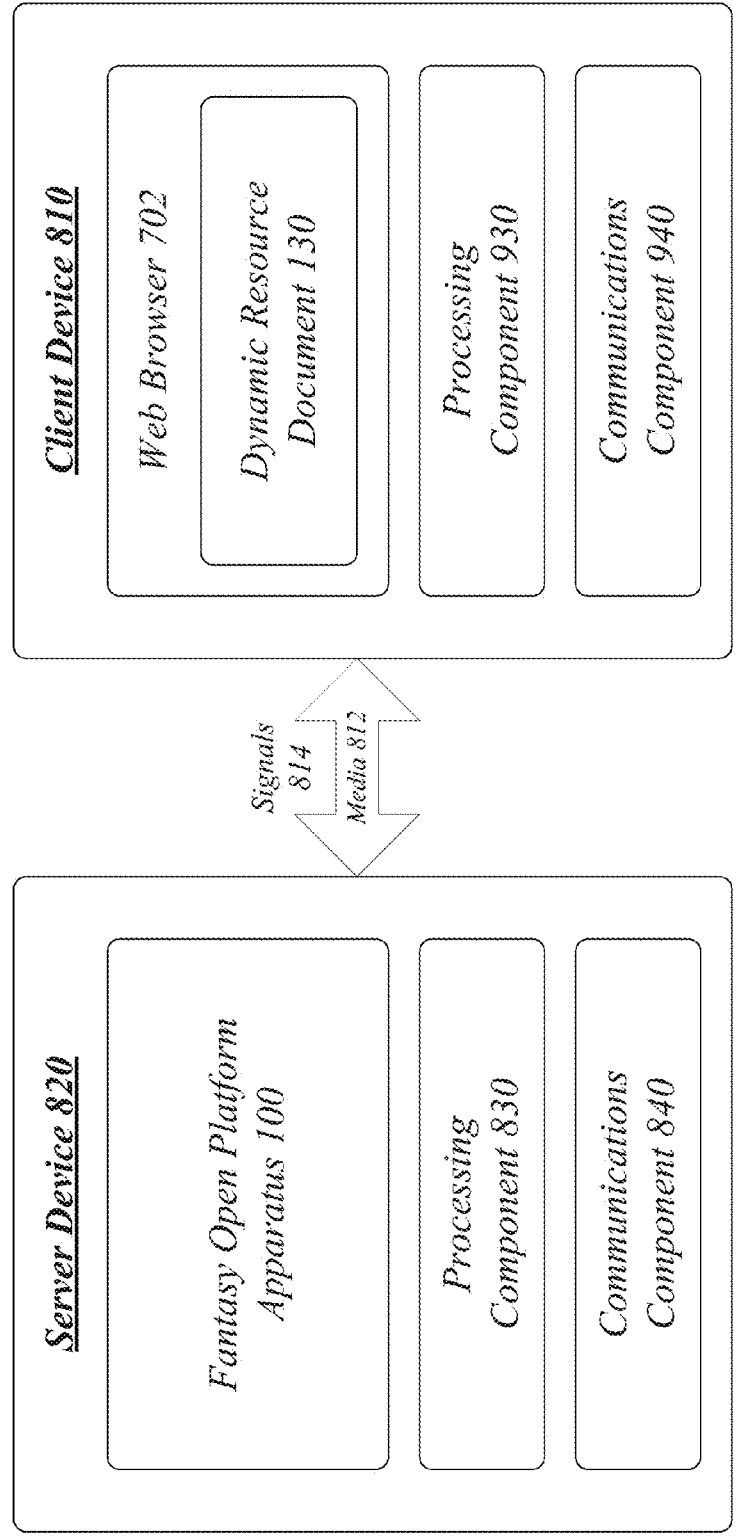
FIG. 9 illustrates an embodiment of a second fantasy system.

FIG. 9 illustrates a more detailed block diagram of the fantasy system 800. More particularly, the client device 810 and the server device 820 may interoperate to allow the client device 810 to access the fantasy open platform apparatus 100 implemented by the server device 820. In some ways, the client device 810 and the server device 820 may be implemented as a distributed system. Examples of a distributed system may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

As shown in FIG. 9, the fantasy system 800 may comprise the client device 810 and the server device 820. In general, the client device 810 may be the same or similar to the server device 820 as described with reference to FIG. 8. For instance, the client system 810 may comprise a processing component 930 and a communications component 940 which are the same or similar to the processing component 830 and the communications component 840, respectively, as described with reference to FIG. 8. The client device 810 and the server device 820 may communicate over the communications media 812 using communications signals 814 via the communications components 940, 840, respectively.

FIG. 9 illustrates the web browser 702 implemented by the client device 810. The web browser 702 may comprise any commercial web browser. The web browser 702 may be a conventional hypertext viewing application such as MICROSOFT INTERNET EXPLORER®, APPLE® SAFARI®, FIREFOX® MOZILLA®, GOOGLE® CHROME®, OPERA®, and other commercially available web browsers. Secure web browsing may be supplied with 128-bit (or greater) encryption by way of hypertext transfer protocol secure (HTTPS), secure sockets layer (SSL), transport security layer (TSL), and other security techniques. Web browser 702 may allow for the execution of program components through facilities such as ActiveX, AJAX, (D)HTML, FLASH, Java, JavaScript, web browser plug-in APIs (e.g., FireFox, Safari Plug-in, and the like APIs), and the like. The web browser 702 may communicate to and with other components in a component collection, including itself, and facilities of the like. Most frequently, the web browser 702 communicates with information servers (e.g., server devices 820, 850), operating systems, integrated program components (e.g., plug-ins), and the like. For example, the web browser 702 may contain, communicate, generate, obtain, and provide program component, system, user, and data communications, requests, and responses. Of course, in place of the web browser 702 and information server, a combined application may be developed to perform similar functions of both.

A user may utilize the web browser 702 to access applications and services provided by the server devices 820, 850, as described in more detail with reference to FIG. 11. For instance, the web browser 702 may be used to access a dynamic resource document 130 and its constituent parts stored in the server devices 820, 850. The web browser 702 may also be used to access cloud-based applications and services, such as online fantasy applications, services and tools.

The client device 810 may communicate with the server devices 820, 850 to access different aspects of the fantasy open platform apparatus 100. For instance, the web browser 702 of the client device 810 may generate a send a resource document request 110 to the server device 820. The fantasy open platform apparatus 100 of the server device 820 may receive the resource document request 110 from the client device 810, and return a dynamic resource document 130. The web browser 702 of the client device 810 may render and present the dynamic resource document 130 on an output device for the client device 810, such as a display.

Figure 10:
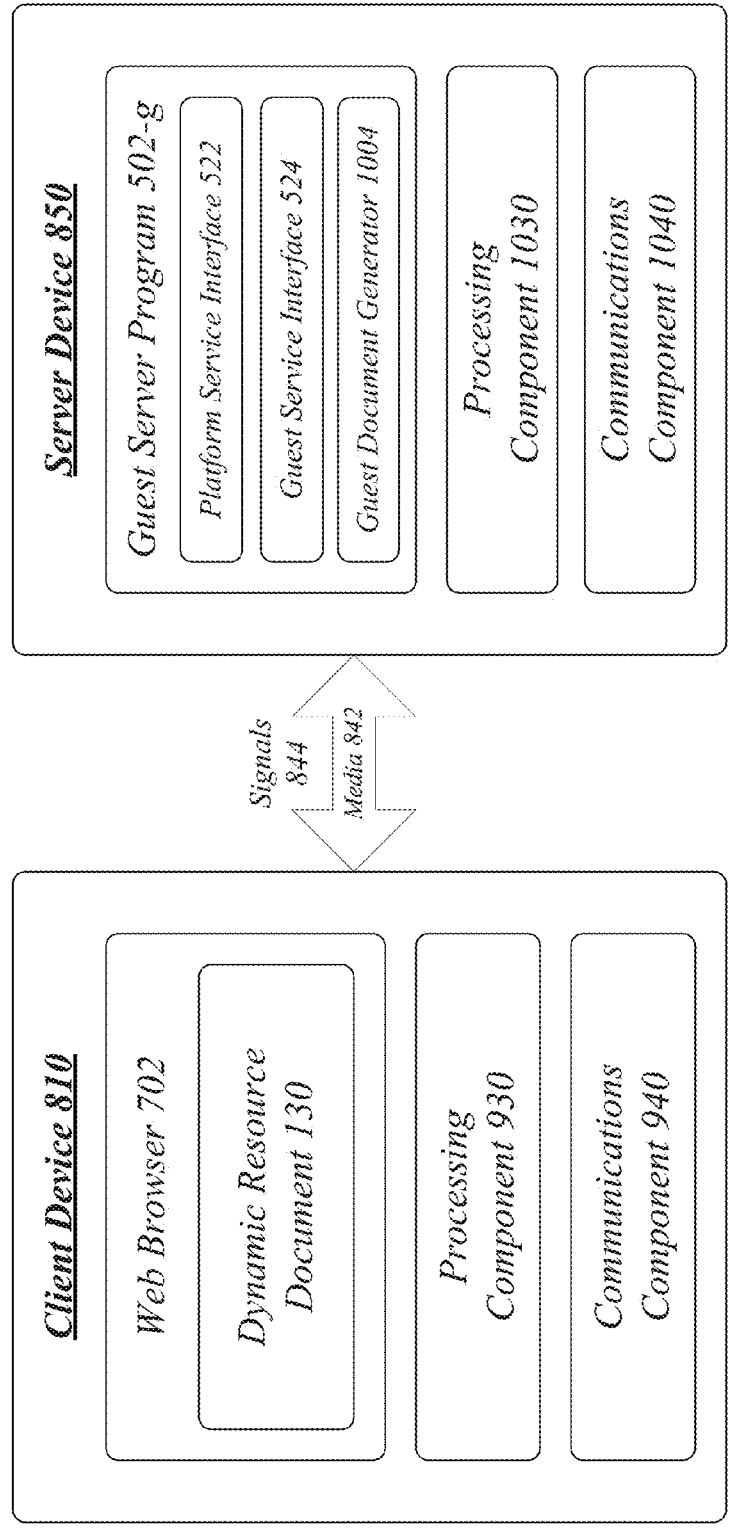
FIG. 10 illustrates an embodiment of a third fantasy system.

FIG. 10 illustrates a more detailed block diagram of the fantasy system 800. More particularly, the client device 810 and the server device 850 may interoperate to allow the client device 810 to access a guest server program 502-g implemented by the server device 850. As with the client device 810 and the server device 820, the client device 810 and the server device 850 may be implemented as a distributed system as previously described with reference to FIG. 9.

As shown in FIG. 10, the fantasy system 800 may comprise the client device 810 and the server device 850. In general, the server device 850 may be the same or similar to the server device 820 as described with reference to FIG. 8. For instance, the server device 850 may comprise a processing component 1030 and a communications component 1040 which are the same or similar to the processing component 830 and the communications component 840, respectively, as described with reference to FIG. 8. The client device 810 and the server device 850 may communicate over the communications media 842 using communications signals 844 via the communications components 940, 1040, respectively.

As shown in FIG. 10, the server device 850 may implement a guest server program 502-g. The guest server program 502-g may include, among other components, a platform service interface 522 and a guest service interface 524 matching those implemented by the guest manager component 122-4 as described with reference to FIG. 5. In addition, the guest server program 502-g may include a guest document generator 1004. The guest document generator 1004 may generate guest resource documents, such as the guest resource documents 504-h, 506-j.

Continuing with our previous example, during rendering operations, the web browser 702 of the client device 810 may request one or more guest resource documents 504-h (or 506-j) from one or more guest server programs 502-g implemented by the server device 850. The guest server program 502-g of the server device 850 may request fantasy content 142 from the fantasy content database 140 through the server device 820. The server device 820 may check policies and permissions for the guest server program 502-g, and return the fantasy content 142 to the server device 820. The guest document generator 1004 of the guest server program 502-g may generate a guest resource document 504-h (or 506-j) with the fantasy content 142, and send the guest resource document 504-h to the client device 810. A similar process may be performed when a user desires to modify the fantasy content 142, where the web browser 702 of the client device 810 sends a request to modify fantasy content 142 to the guest server program 502-g, and the guest server program 502-g in turn sends a request to the fantasy open platform apparatus 100 of the server device 820 to write the modifications to the fantasy content database 140.

Figure 11:
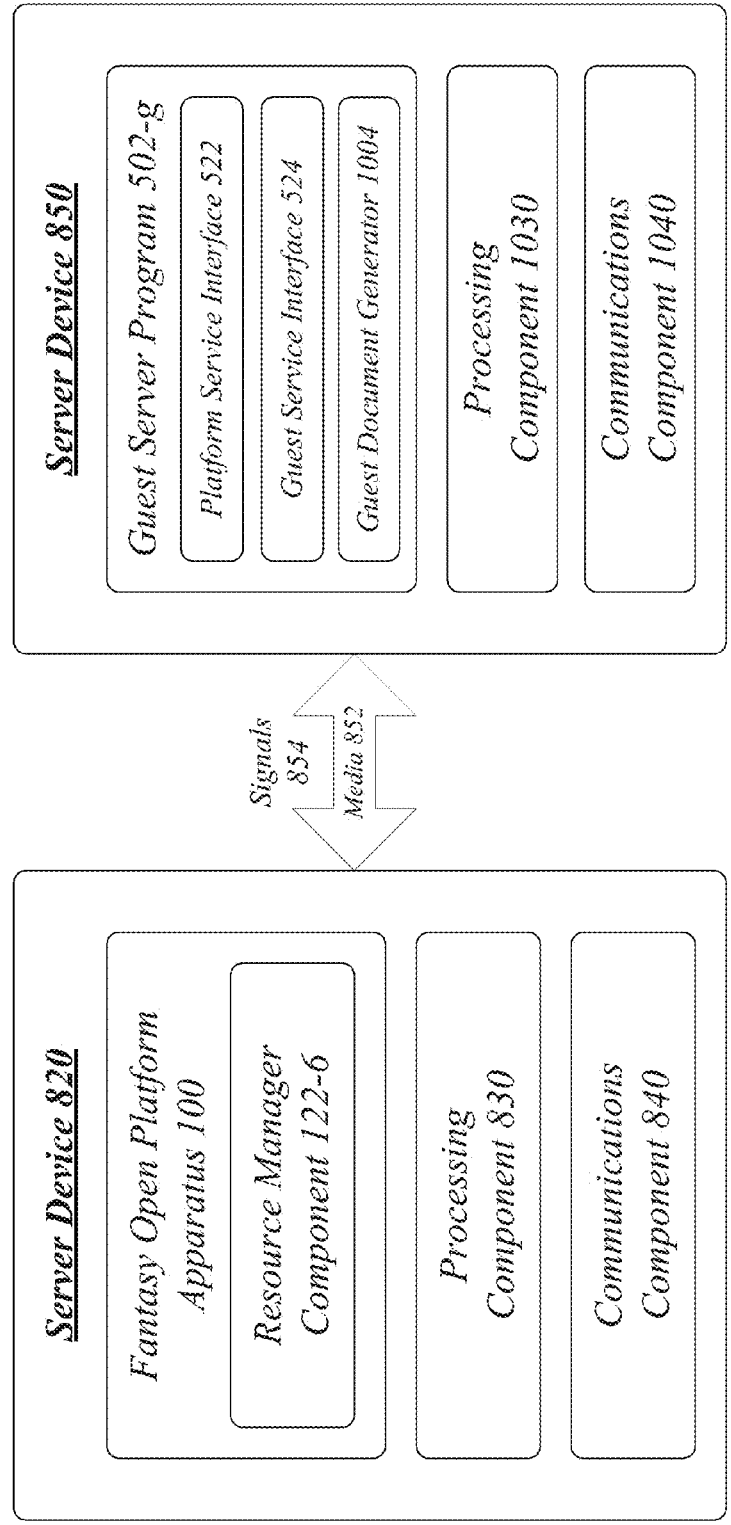
FIG. 11 illustrates an embodiment of a fourth fantasy system.

FIG. 11 illustrates a more detailed block diagram of the fantasy system 800. More particularly, the server devices 820, 850 may interoperate to allow the server device 820 to access a guest server program 502-g implemented by the server device 850, and the server program 850 to access the fantasy open platform apparatus 100 implemented by the server device 820, particularly the fantasy content 142 of the fantasy database 140. As with the client device 810 and the server device 820, the server device 820 and the server device 850 may be implemented as a distributed system as previously described with reference to FIG. 9.

As shown in FIG. 11, the fantasy system 800 may comprise the server device 820 and the server device 850. The server devices 820, 850 may communicate with each other over the communications media 852 using communications signals 854 via the communications components 840, 1040, respectively.

The server device 820 may implement the fantasy open platform apparatus 100, including the fantasy server application 120. In addition to the various components of the fantasy server application 120 as previously described, the fantasy server application 120 may implement a resource manager component 122-6. The resource manager component 122-6 may be arranged to manage access to fantasy content 142 of the fantasy content database 140 in response to a message request from the guest server program 502-g of the server device 850, such as a message request to read fantasy content 142 from the fantasy content database 140, write fantasy content 142 to the fantasy content database 140, or a combination of both. The resource manager component 122-6 may be described in more detail with reference to FIG. 14.

Figure 12:
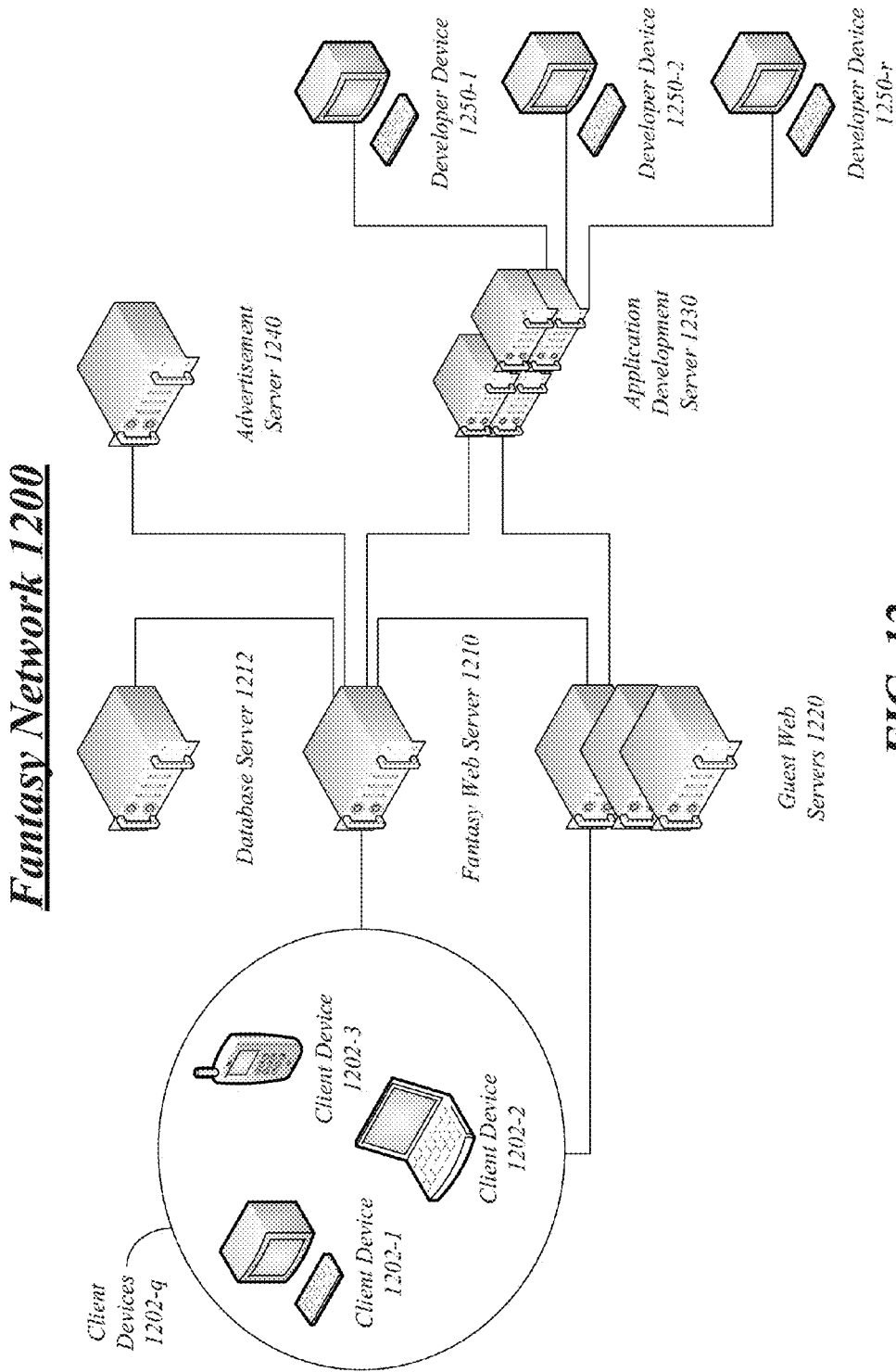
FIG. 12 illustrates an embodiment of a first fantasy network.

FIG. 12 illustrates a block diagram of a fantasy network 1200. The fantasy network 1200 expands and builds on the fantasy system 800, which in turn expands and builds on the fantasy open platform apparatus 100.

In the illustrated embodiment shown in FIG. 12, a set of client devices 1202-q may comprise client devices 1202-1, 1202-2 and 1202-3. The client devices 1202-q may comprise representative examples of the client device 810. As shown in FIG. 12, each client device 1202-q may representing a different electronic device a user can utilize to access a web services and web applications provided by a fantasy web server 1210. For instance, the client device 1202-1 may comprise a desktop computer, the client device 1202-2 may comprise a notebook computer, and the client device 1202-3 may comprise a smart phone. It may be appreciated that these are merely a few examples of client devices 1202-q, and any of the electronic devices as described with reference to FIG. 8 may be implemented as a client device 1202-q. The embodiments are not limited in this context.

A user may utilize a client device 1202-q to access various web services and web applications provided by the fantasy web server 1210. The fantasy web server 1210 may be a representative example of the server device 820. More particularly, the fantasy web server 1210 may comprise the server device 820 implemented as a web server using various web technologies. The fantasy web server 1210 may comprise a stand-alone server or an array of servers in a modular server architecture or server farm.

The fantasy web server 1210 may comprise hardware and software designed to deliver content that can be accessed through a network, such as a network implementing one or more communications protocols from a suite of Internet protocols as defined by the Internet Engineering Task Force IETF, commonly referred to as the Internet. The fantasy web server 1210 may host various web sites, which are collections of web pages. The fantasy web server 1210 may deliver web pages on requests from the client devices 1202-q made through a web browser, such as the web browser 702. For example, the fantasy web server 1210 may deliver static or dynamic web pages generated by the fantasy open platform apparatus 100.

To generate a web page, the fantasy web server 1210 may retrieve fantasy content 142 from the fantasy content database 140 implemented by the database server 1212. The database server 1212 may implement various database technologies arranged to store, update, retrieve and/or manage various types of fantasy content 142 from the fantasy content database 140, such as a database management system (DBMS) comprising database management software and network storage units. For instance, the fantasy content database 140 may be implemented as multiple network storage units operating as a storage area network (SAN).

A user may also utilize a client device 1202-q to access various web services and web applications provided by the guest web server 1220. The guest web server 1220 may be a representative example of the server device 850. More particularly, the guest web server 1220 may comprise the server device 850 implemented as a web server using various web technologies. The guest web server 1220 may comprise a stand-alone server or an array of servers in a modular server architecture or server farm.

Similar to the fantasy web server 1210, the guest web server 1220 may comprise hardware and software designed to deliver content that can be accessed through a network, such as a network implementing one or more communications protocols from a suite of Internet protocols as defined by the Internet Engineering Task Force IETF, commonly referred to as the Internet. The guest web server 1220 may host various web sites, which are collections of web pages. The guest web server 1220 may deliver web pages on requests from the client devices 1202-$q$ made through a web browser, such as the web browser 702. For example, the guest web server 1220 may deliver static or dynamic web pages generated by the guest server programs 502-$g$.

The fantasy web server 1210 may also communicate with one or more advertisement servers 1240. The advertisement servers 1240 may be arranged for serving advertisements on behalf of one or more advertisers. An advertiser may be any entity that generates advertising material to advertise product or services to be sold by a vendor. The advertisement servers 1240 may be owned by a vendor, such as an internal marketing department for a business or enterprise.

The fantasy web server 1210 may further communicate with one or more application development servers 1230. The application development servers 1230 may be used for application development of one or more guest server programs 502-$g$ as implemented by the guest web server 1220. Application developers, such as computer programmers or software engineers, may utilize various developer devices 1250-$r$ to access the application development server 1230 to access application development software providing an application development framework or architecture suitable for design a given type of guest server application 502-$g$, such as a web application, for example. In one embodiment, for example, the application development server 1230 may provide access to a software developer kit (SDK) for the fantasy open platform apparatus 100.

A SDK is typically a set of software development tools that allows for the creation of applications for a certain software package, software framework, hardware platform, computer system, operating system, or similar platform. The SDK may comprise an application programming interface (API) in the form of some files to interface to a particular programming language or include sophisticated hardware to communicate with a certain embedded system. Common tools include debugging aids and other utilities often presented in an integrated development environment (IDE). SDKs also frequently include sample code and supporting technical notes or other supporting documentation to help clarify points from the primary reference material.

The fantasy network 1200 is an exemplary implementation of a unified fantasy framework that provides a complete fantasy eco-system for integrating native fantasy applications, third-party fantasy applications, fantasy advertisements, and tools for fantasy development.

A fantasy gamer may use the fantasy network 1200 to access and use multiple types of fantasy applications, developed or provided by different software vendors, within a single user interface view presented by the web browser 702. As such, a fantasy gamer does not have to leave a fantasy gaming context in order to access services and features offered by different software vendors, or engage in the separate access requirements typically associate with different software products. Further, the different types of fantasy applications may operate on a shared set of fantasy data, or different sets of fantasy data, stored by a single fantasy database 140 managed by the fantasy network 1200. In this manner, a fantasy gamer may view, and in some cases change, a same set of fantasy data surfaced by different fantasy applications even when some fantasy applications are hosted by third-party servers, such as the guest web server 1220. In this manner, a fantasy gamer may access heterogeneous fantasy applications and content from different sources through a single user interface view without having to switch between different viewing contexts. As a result a fantasy gamer will be more competitive, entertained, and have a richer gaming experience.

A fantasy application developer may use the application development server 1230 and the developer devices 1250-$r$ of the fantasy network 1200 to develop and market fantasy applications to a wider range of fantasy gamers. Rather than attempting to market and monetize a specialized fantasy application through its own e-commerce web servers to a smaller market, fantasy application developers may advertise and target fantasy gamers attracted by the robustness and convenience of the fantasy network 1200, particularly the fantasy web server 1210. Furthermore, rather than offering stand-alone applications that need to be purchased, installed and executed by a user as native applications, fantasy application developers may focus on developing web applications sold and access through the fantasy network 1200, thereby enhancing subscription services, advertising revenue, software updates, and distribution mechanisms. In addition, a fantasy application developer may potentially participate in advertisement revenue sharing splits negotiated between a provider of the fantasy network 1200 and various advertisers operating the advertisement server 1240.

A fantasy advertiser may use the fantasy network 1200 for targeted advertising campaigns to a wide range of fantasy gamers attracted by the robustness and convenience of the fantasy network 1200 and also the multiplicity of specialized fantasy applications accessible via the fantasy web server 120 and the guest web server 1220. Further, the fantasy advertiser may have more information as to browsing and purchasing patterns of fantasy gamers across a wide array of fantasy applications and fantasy content. This information may be used to provide more finely targeted advertisements to select segments of fantasy gamers by inserting targeted advertisements from the advertisement server 1240 into a dynamic resource document 130.

Figure 13:
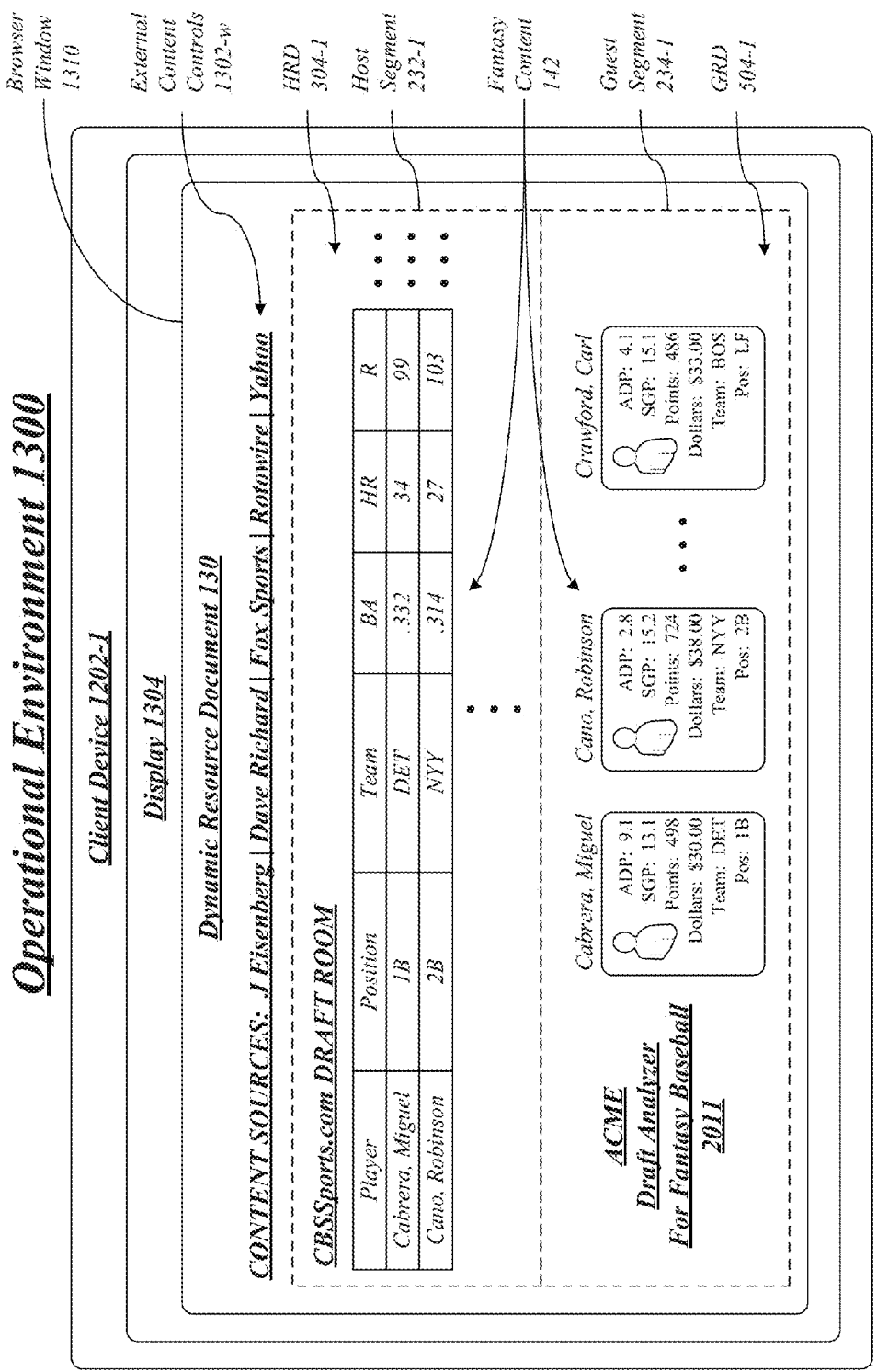
FIG. 13 illustrates an embodiment of a dynamic resource document.

FIG. 13 illustrates an embodiment of an operational environment 1300 for the fantasy network 1200 in general, and the fantasy open platform apparatus 100 in particular. The operational environment 1300 illustrates an example of a dynamic resource document 130 as rendered and presented on a display 1304 of a client device 1202-1.

As shown in FIG. 13, the dynamic resource document 130 comprises a host segment 232-1 and a guest segment 234-1. The host segment 232-1 may comprise a frame containing a host resource document 304-1. The guest segment 234-1 may comprise a frame containing a guest resource document 504-1. The host resource document 304-1 and the guest resource document 504-1 may both contain fantasy content 142 from the fantasy content database 140. In some cases, the fantasy content 142 may be homogeneous fantasy content, such as the same text "Cano, Robinson." In other cases, the fantasy content 142 may be heterogeneous fantasy content, such as "Crawford, Carl" as presented in the guest resource document 504-1 and not the host resource document 304-1. In either case, the fantasy content 142 is presented by two separate and distinct fantasy server programs, one comprising the host server program 302-1 and the other comprising the guest server program 502-1, which is made possible through the fantasy unified fantasy framework.

It is worthy to note that the host resource document 304-1 and the guest resource document 504-1 are presented within a single browser window 1310 in a seamless manner. This allows a user to view both documents simultaneously without having to switch between fantasy program contexts, such as different browser windows or user interface windows, as with conventional fantasy programs. Further, the user may manipulate the fantasy content 142 in either document from either document using separate user controls implemented for each frame, including retrieving new fantasy content 142 or modifying existing fantasy content 142 from either document, and reading/writing the fantasy content 142 to the same fantasy content database 140. This allows the user to have full access and control to the native features and services offered by the host server program 302-1 and the guest server program 304-1 using native set of user interface controls and user interface elements offered by each of the host server program 302-1 and the guest server program 304-1.

The dynamic resource document 130 may further present a set of external content controls 1302-w. The external content controls 1302-w may be used to access and manipulate heterogeneous fantasy content through the fantasy server application 120. The heterogeneous fantasy content may have been previously retrieved from various heterogeneous fantasy content providers, and hosted within the fantasy unified fantasy framework for central access by fantasy users from within the browser window 1310. The external content controls 1302-w may be presented as part of the host segment 232-1, a separate host segment 232-2 (not shown), or another segment type provided for the platform resource document 230 and/or the dynamic resource document 130.

Figure 14:
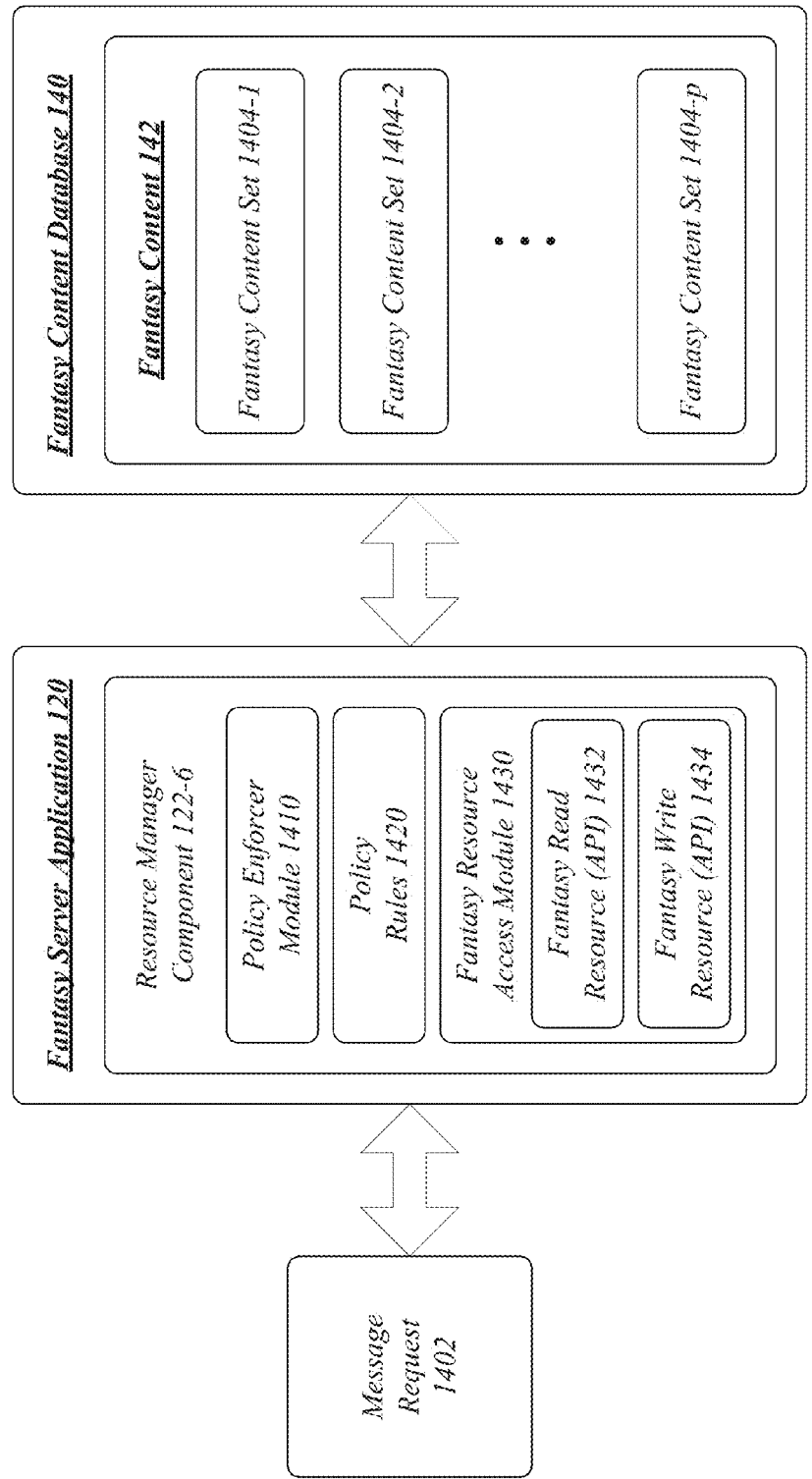
FIG. 14 illustrates an embodiment of a sixth operational environment.

FIG. 14 illustrates an embodiment of an operational environment 1400 for the fantasy network 1200 in general, and the fantasy open platform apparatus 100 in particular. The operational environment 1400 illustrates an example of the fantasy server application 120 receiving a message request 1402 to access fantasy content 142 of the fantasy content database 140 implemented by the database server 1212.

As shown in FIG. 14, the resource manager component 122-6 may comprise a policy enforcer module 1410, a set of policy rules 1420, and a fantasy resource access module 1430. The resource manager component 122-6 may receive a message request 1402 from a host server program 302-d or a guest server program 502-g, and manage access to fantasy content 142 of the fantasy content database 140 in response to the message request 1402 utilizing the policy enforcer module 1410, the set of policy rules 1420, and the fantasy resource access module 1430. Using the resource manager component 122-6 to manage access to the fantasy content database 140 for both host server programs 302-d and guest server programs 502-g reduces access management overhead and ensures uniform access policies for heterogeneous fantasy applications.

A host server program 302-d and/or a guest server program 502-g may send a message request 1402 using any number of known communications protocols and techniques. For example, the message request 1402 may be sent utilizing the communications components 840, 1040 operating in accordance with the Internet protocol suite, such as HTTP, TCP/IP and UDP, among other known protocols.

In one embodiment, for example, the fantasy network 1200 may utilize a representational state transfer (REST) architecture. REST is a software architecture style for distributed hypermedia systems such as the WWW. In a REST architecture, clients initiate requests to servers, and servers process and return appropriate responses. Requests and responses are built around a transfer of representations of resources. A resource is a primitive in a web architecture, and is used in the definition of its fundamental elements. Client-server communications may include REST information identifying a current or intended state of a resource. Since a REST architecture is a stateless architecture, no client context is stored in a server between requests. Rather, each request from any client contains all of the information necessary to service the request, and any session state is held in the client. The server, however, can be stateful, as long as a server-side state is addressable by a URL as a resource.

When the fantasy network 1200 is implemented with a REST architecture, the client devices 1202-q and the various server devices may communicate messages with REST information. For instance, a client device 1202-1 may send a message request 1402 requesting access to fantasy content 142 of the fantasy content database 140. The message request 1402 may REST information conveying a current state or an intended state for the client device 1202-1.

A message request 1402 may contain REST information communicated using an application layer protocol and a transport layer of an Internet protocol suite, such as defined by one or more IETF standards. In one embodiment, for example, a message request 1402 may contain REST information communicated using HTTP and TCP. In one embodiment, for example, a message request 1402 may contain REST information communicated using HTTP and UDP.

The resource manager component 122-6 may comprise a policy enforcer module 1410. The policy enforcer module 1410 may control access to fantasy content 142 of the fantasy content database 140. Since multiple fantasy applications are accessing the fantasy content 142 of the fantasy content database 140, there is always a security threat that rouge applications will attempt to improperly access fantasy content 142. Even in those cases where legitimate applications are attempting to access fantasy content 142, these applications may need to be limited to isolated sets of fantasy content for privacy reasons. Further, legitimate applications may intentionally or unintentionally attempt to access fantasy content 142 in a manner that is inconsistent with rules of a particular fantasy game, such as trying to acquire a player already committed to another team. This problem is exacerbated by the open architecture provided by the fantasy unified fantasy framework.

To further illustrate this problem, a host server program 302-d, such as a host server program 302-1, is typically developed by a same entity that developed the fantasy server application 120. In the past, the developer would tightly integrate the host server program 302-1 and the fantasy server application 120 to ensure the host server program 302-1 operates consistently with the fantasy server application 120. For instance, the host server program 302-1 can be developed to conform to any security policies, privacy policies or fantasy game rule policies implemented by the fantasy server application 120.

This tight integration between programs, however, comes with several disadvantages. For example, changes in policy need to be made in both the host server program 302-1 and the fantasy server application 120. In another example, a new host server program 302-2 needs to be developed in a very similar, or identical, manner as the host server program 302-1, such as using a same set of APIs used by the host server program 302-1. However, the programming techniques used for the host server program 302-1 may not be suitable or desirable for the host server program 302-2. In yet another example, this tight integration creates a closed system, which may be hostile to third-party software, such as a guest server program 502-1, for example. Essentially, a developer for the fantasy server application 120 and a developer of the guest server program 502-1 would need to collaborate and replicate a custom set of APIs similar to those used by the host server program 302-1 to obtain the same high level of integration between the guest server program 502-1 and the fantasy server application 120 as with the host server program 302-1 and the fantasy server application 120.

To solve these and other problems, the host server programs 302-d and guest server programs 502-g may utilize a standardized set of APIs to control interaction with the fantasy server application 120. A couple of examples for standardized APIs include a fantasy read resource 1432 and a fantasy write resource 1434 shown with a fantasy resource access module 1430, among others as described below. The standardized APIs provide seamless and uniform integration between the host server programs 302-d and the fantasy server application 120, as well as the guest server programs 502-g and the fantasy server application 120. It basically creates an open system. As such, an additional layer of enforcement is needed to protect integrity of the fantasy content 142 stored by the fantasy content database 140.

The policy enforcer module 1410 is designed to prevent these and other attempts to improperly access fantasy content 142. The policy enforcer module 1410 may control access to fantasy content 142 of the fantasy content database 140 based on a set of policy rules 1420. The policy rules 1420 are a set of rules designed to control behavior of both host server programs 302-d and guest server programs 502-g in a uniform manner.

In one embodiment, the policy rules 1420 may represent a set of security policies. A security policy defines a set of constraints to control whether an entity may interact with a resource, such as the fantasy content database 140. For instance, a security policy may define security credentials (e.g., security certificates), authentication procedures, authorization procedures, encryption schemes, and so forth.

In one embodiment, the policy rules 1420 may represent a set of privacy policies. A privacy policy defines a set of constraints to control which specific resources within the fantasy content database 140 an entity may access. For instance, a privacy policy may define levels of permissions to certain files stored by the fantasy content database 140, read authority for protected files (e.g., user data), dissemination of information in protected files, protections need for dissemination of information in protected files (e.g., encryption), and so forth.

In one embodiment, the policy rules 1420 may represent a set of fantasy game policies. A fantasy game typically has set of fantasy game rules. For instance, fantasy football has different rules controlling different aspects of gameplay of fantasy football, such as fantasy football league rules, fantasy football team rules, fantasy player rules, fantasy manager rules, fantasy team owner rules, fantasy league owner rules, player selection rules, player trade rules, player roster rules, starting lineup rules, substitution rules, point system rules, scoring system rules, and so forth. Often the fantasy game rules are complex and detailed to ensure a high level of fair competition. Furthermore, fantasy game rules typically change, sometimes significantly, between different fantasy games. For instance, fantasy football rules are completely different from fantasy baseball rules.

The policy enforcer module 1410 may control access to fantasy content 142 of the fantasy content database 140 by a host server program 302-d and/or a guest server program 502-g using the different security policies, privacy policies and fantasy game policies defined for the unified fantasy framework. By way of example, assume a user is viewing different aspects of a starting lineup for players in a fantasy baseball league presented by a host resource document 304-1 and a guest resource document 504-1 generated by the host server program 302-1 and the guest server program 502-1, respectively. Further assume a viewer attempts to add a fourth outfielder to her starting lineup by manipulating the guest resource document 504-1 (e.g., selecting a GUI button). A client device 1202-1 may send a message request 1402 to the fantasy web server 1210. The resource manager component 122-6 of the fantasy server application 120 implemented by the fantasy web server 1210 may route the message request 1402 to the policy enforcer module 1410. The policy enforcer module 1410 may retrieve the selection information from the message request 1402, including a fantasy baseball game identifier and a fantasy baseball league identifier. The policy enforcer module 1410 may retrieve a set of fantasy baseball game rules and a set of fantasy baseball league rules based on the respective identifiers. Some fantasy baseball league rules allow three outfielders, while other fantasy baseball league rules allow four outfielders. Assume the fantasy baseball league identifier indicates a league rule that only allows three outfielders. In this case, the policy enforcer module 1410 may send an error message to the web browser 702 of the client device 1202-1, which surfaces a GUI message indicating the error.

The resource manager component 122-6 may comprise a fantasy resource access module 1430. The fantasy resource access module 1430 may provide access to the fantasy content 142 of the fantasy content database 140. Once the policy enforcer module 1410 checks information in a message request 1402 to ensure that the requested access to the fantasy content 142 of the fantasy content database 140 is valid, the policy enforcer module 1410 may pass the information to the fantasy resource access module 1430 to actually access the fantasy content 142.

The fantasy resource access module 1430 may access fantasy content 142 of the fantasy content database 140 in response to a message request 1402 from a host server program 302-d or a guest server program 502-g. The fantasy resource access module 1430 may contain a set of standardized APIs controlling access to the fantasy content 142 of the fantasy content database 140, such as read and write operations for the fantasy content 142. For instance, the fantasy resource access module 1430 may retrieve REST information from a message request 1402, and access fantasy content 142 of the fantasy content database 140 using the REST information.

The fantasy resource access module 1430 may comprise a fantasy read resource 1432 arranged to read one or more fantasy content sets 1404-p of the fantasy content 142 from the fantasy content database 140. In one embodiment, for example, the fantasy read resource 1432 may be implemented as an API suitable for use with HTTP, among other protocols. The fantasy read resource 1432 may be an atomic API by itself, or may be implemented as part of another API directed to a specific task that includes reading fantasy content 142 from the fantasy content database 140.

A sample URL for a fantasy read resource 1432 designed to read a resource comprising a draft order for a league using an HTTP GET method may be shown as follows:

http://api.cbssports.com/fantasy/league/draft/order where the API accepts a parameter response_format to specify a format in which the resource should be returned, such as in an XML format or a JavaScript Object Notation (JSON) format. A sample XML response is shown as follows:

```xml
<?xml version="1.0"?>
<result uriAlias="/league/draft/order" uri="/league/draft/order" statusCode="200"
statusMessage="OK">
    <body>
        <draft_order>
            <picks>
                <pick>
                    <number>1</number>
                    <team id="22">
                        <logo>Team Logo URL</logo>
                        <long_abbr>Team Long Abbreviation</long_abbr>
                        <abbr>Team Abbreviation</abbr>
                        <short_name>Team Short Name</short_name>
                        <name>Team Name</name>
                    </team>
                </pick>
                <pick>
                    <number>2</number>
                    <team id="11">
                        <logo>Team Logo URL</logo>
                        <long_abbr>Team Long Abbreviation</long_abbr>
                        <abbr>Team Abbreviation</abbr>
                        <short_name>Team Short Name</short_name>
                        <name>Team Name</name>
                    </team>
                </pick>
            </picks>
        </draft_order>
    </body>
</result>
```

An example of a JSON response is as follows:

```
{
  "body" : {
    "draft_order" : {
      "picks" : [
        {
          "number" : 1,
          "team" : {
            "logo" : "Team Logo URL",
            "long_abbr" : "Team Long Abbreviation",
            "abbr" : "Team Abbreviation",
            "short_name" : "Team Short Name",
            "name" : "Team Name",
            "id" : "15"
          }
        },
        {
          "number" : 2,
          "team" : {
            "logo" : "/ownerlogo?size=36x36 &teamid=1",
            "long_abbr" : "Pudge",
            "abbr" : "LP",
            "short_name" : "Little",
            "name" : "Little Pudge",
            "id" : "1"
          }
        },
      ]
    }
  },
  "uriAlias" : "/league/draft/order",
  "statusMessage" : "OK",
  "uri" : "/league/draft/order",
  "statusCode" : 200
}
```

The fantasy resource access module 1430 may comprise a fantasy write resource 1434 arranged to write (change) one or more fantasy content sets 1404-*p* of the fantasy content 142 to the fantasy content database 140. In one embodiment, for example, the fantasy write resource 1434 may be implemented as an API suitable for use with HTTP, among other protocols. The fantasy write resource 1434 may be an atomic API by itself, or may be implemented as part of another API directed to a specific task that includes writing fantasy content 142 to the fantasy content database 140.

A sample URL for a fantasy write resource 1434 designed to write a resource comprising changes to a lineup for a fantasy team using an HTTP PUT method is shown as follows:

http://api.cbssports.com/fantasy/league/transactions/lineup where the API accepts a parameter response_format to specify a format in which the resource should be returned, such as in an XML format or a JavaScript Object Notation (JSON) format, and where the default is XML. More particularly, the resource may make lineup changes such as: (1) players specified under "active" will be activated in the lineup permitting league's lineup rules; (2) players specified under "reserve" will be benched in the lineup permitting league's lineup rules; (3) players specified under "injured" will be put on the injured slots permitting league's lineup rules; and (4) players specified under "minors" will be put on the minor slots permitting league's lineup rules. An example of PUT data sent as a JSON payload is a follows:

```
payload={"team":"<team_id>","minors":{"<player_id>":{"pos":"<position>"},"<player_id>":
{"pos": <position>"}}, "injured":{"<player_id>":{"pos":"<position>"},"<player_id>"
:{"pos":"<position>"}},"active":{"<player_id>":{"pos":"<position>",>"},"<player_id>"
:{"pos":"<position>"}},"reserve":{"<player_id>":{"pos":"<position>"},"<position>":{"pos":"<
position>"}},"point":"<point>"}
``` where <team_id>=an identifier (ID) of the fantasy team whose lineup is being set, <player_id>=Player ID, <position>=a position at which a given player is being activated or benched, and <point>=a point from which the lineup moves will be effective minors, injured, active, reserve keys are all optional.

Continuing with a specific example for the sample URL for the fantasy write resource 1434 designed to write a resource comprising changes to a lineup for a fantasy team using an HTTP PUT method, assume a user desires to activate or bench certain players. In this case, a sample does the following: (1) activate player with player ID 584808 and put him at third base (3B) in the lineup; (2) activate player with player ID 22234 and put him at catcher (C) in the lineup; (3) bench player with player ID 390828 and remove him from 3B in the lineup; (4) bench player with player ID 293103 and remove him from C in the lineup; and (5) make moves effective 20110418. Sample PUT data to perform these lineup changes is shown as follows:

```
payload={"team":"15","active":{"584808":{"pos":"3B"},"22234":{"pos":"C"}},"reserve":{"390828":{"pos":"3B"},"293103":{"pos":"C"}},"point":"20110418"}
```

A response may be returned to the user in response to the PUT data, such as a HTTP Status code 400 if invalid lineup move with the body containing the error message or a HTTP Status code 204 if valid lineup move with no body, among other types of information.

It may be appreciated that the fantasy read resource 1432 and the fantasy write resource 1434 are not limited to the previous examples. The fantasy read resource 1432 and the fantasy write resource 1434 may be implemented using other APIs as desired for a given implementation. The embodiments are not limited in this context.

It may also be appreciated that the fantasy read resource 1432 or the fantasy write resource 1434 can read from or write to a same fantasy content set 1404-1 in response to requests from the host server program 302-1, the guest server program 502-1, or both the host server program 302-1 and the guest server program 502-1. For instance, this may occur when the host resource document 304-1 and the guest resource document 504-1 both present the fantasy content set 1404-1 in the browser window 1310 at a same time. Alternatively, the fantasy read resource 1432 or the fantasy write resource 1434 can read from or write to different fantasy content sets 1404-1, 1404-2 in response to requests from the host server program 302-1, the guest server program 502-1, or both the host server program 302-1 and the guest server program 502-1. For instance, this may occur when the host resource document 304-1 and the guest resource document 504-1 each present the fantasy content set 1404-1, 1404-2, respectively, in the browser window 1310 at a same time. The embodiments are not limited in this context.

In order to access and use the standardized APIs offered by the fantasy resource access module 1430, a message request 1402 needs to communicate two items. The first is an access token. The second is at least one or more identifiers designed to identify a fantasy game, a fantasy league, and a fantasy user, or a combination of all three.

For instance, when a web browser 702 of a client device 1202-1 receives a dynamic resource document 130 with guest reference 526-1 for a guest resource document 504-1 and/or a guest server program 502-1 via an iframe element, an access token is passed from the fantasy server application 120 (e.g., fantasy resource access module 1430) to the iframe URL of the guest resource document 504-1. The guest server program 502-1 may get the access token for a user through a request for JSON such as:

```
https://api.cbssports.com/general/oauth/test/access_token?user_id=<user_id>&league_id=<league_id>&sport=baseball&response_format=json
``` or a request for XML such as:

```
https://api.cbssports.com/general/oauth/test/access_token?user_id=<user_id>&league_id=<league_id>&sport=baseball&response_format=xml
``` where the parameter response_format indicates the JSON or XML response format. The fantasy server application 120 may return a sample JSON response as follows:

```
JSON
{"results":[{"body":{"access_token":
"a57078cec13b53eedcb74531b66e3002687277f9307bf9307bf9ceb5
022f4d4add0d52883736c2648b2d31be3a1926e50fbdfab091dfb319793416a6065e3c5863639cbda
1b7a828f4bbaa"},"uriAlias":"/oauth/test/access_token","statusMessage":"","uri":"/oauth/test/access_token","statusCode":200}]}
```

Alternatively, the fantasy server application 120 may return a sample XML response as follows:

```
XML

<result uriAlias="/oauth/test/access_token" statusMessage="" uri="/oauth/test/access_t
   oken" statusCode="200">
      <body access_token="a57078cec13b53eedcb74531b66e3002687277f9307bf9ce
      b5022f4d4add0d52883736c2648b2d31be3a1926e50fbdfad53ab143cfd5ca56902
      c55bfac6d564a5268b314619aa656"/>
   </result>

```

The guest server program 502-1 may parse the JSON or XML response to retrieve the access token, and make API calls on the fantasy access resource module 1430 using the access token passed as an access_token query parameter. Examples of JSON and XML calls are shown as follows:

```
JSON:
http://api.qa.cbssports.com/fantasy/league/teams?access_token=a57078cec13b53eedcb74531b66
e3002687277f9307bf9ceb5022f4d4add0d52883736c2648b2d31be3a1926e50fbdfab091dfb319793
416a6065e3c5863639cbda1b7a828f4bbaa&response_format=json
XML:
http://api.qa.cbssports.com/fantasy/league/teams?access_token=a57078cec13b53eedcb74531b66
e3002687277f9307bf9ceb5022f4d4add0d52883736c2648b2d31be3a1926e50fbdfab091dfb319793
416a6065e3c5863639cbda1b7a828f4bbaa&response_format=xml
```

API responses from the fantasy resource access module 1430 are available in JSON or XML using the response_format parameter.

Figure 15:
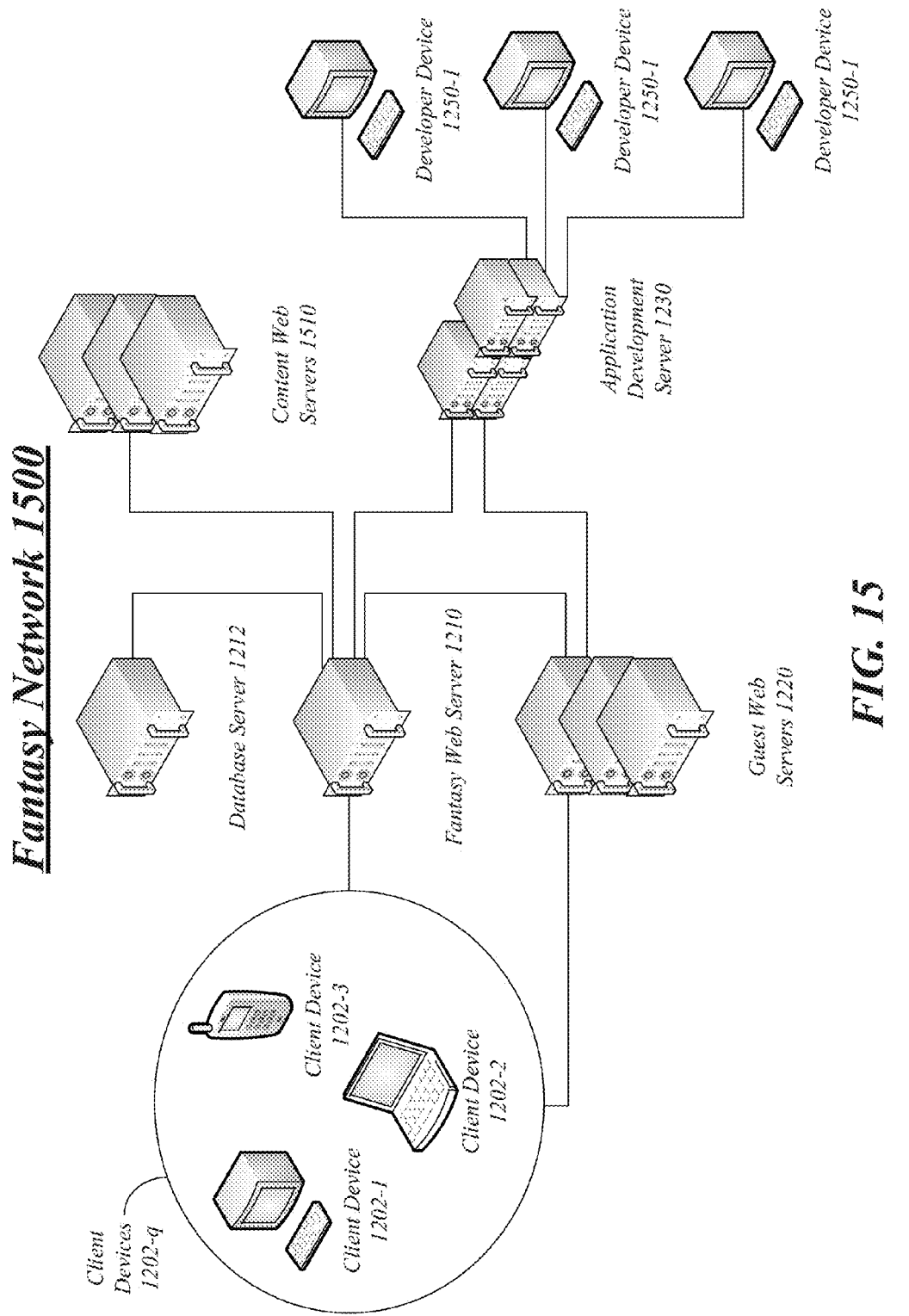
FIG. 15 illustrates an embodiment of a second fantasy network.

FIG. 15 illustrates a block diagram of a fantasy network 1500. The fantasy network 1500 is similar to the fantasy network 1200. In addition, the fantasy network 1500 illustrates a set of one or more content web servers 1510-*s* communicatively coupled to the fantasy web server 1210.

A content web server 1510-*s* is a web server that provides access to fantasy content associated with one or more fantasy games. A content provider provides different types of content related to fantasy games, such as news, commentary, statistics, rankings, fantasy player data, real player data, fantasy game updates, real game updates, and so forth. Some examples of content providers is shown in Table 1 as follows:

TABLE 1

| | |
|---|---|
| 4for4.com | HattyWaiverWireGuru.com |
| Accuscore | TheHazean.com |
| AsktheCommish.com | TheHuddle.com |
| BaseballHQ | InsiderBaseball.com |
| BrunoBoys.net | JunkyardJake.com |
| DraftSharks.com | KFFL.com |
| DynastyRankings.blogspot.com | LestersLegends.com |
| FantasyPros.com | NFLSoup.com |
| FantasyPros911.com | NickBakay.com |
| FantasyCafe.com | NoOffseason.com |
| FantasyFootballFools.com | Numberfire.com |
| FantasyFootballManiaxs.com | Pigskinaddiction.com |
| FantasyFootballNerd.com | ProFantasyGames.com |
| FantasyFootballSherpa. com | ProFootballFocus.com |
| FantasyFootballTrader.com | ProFootballWeekly |
| FantasyFootballXtreme.com | Pyromaniac.com |
| FantasyGuru.com | Razzball.com |
| FantasyInsights.com | RotoExperts |
| FantasySharks.com | RotoPilot.com |
| FFGeekBlog.com | RotoProfessor |
| FFLibrarian.com | Rotowire |
| FFSpin.com | RotoWorld.com, RotoTimes.com |
| FFToday | SportsGrumblings.com |

TABLE 1-continued

| | |
|---|---|
| FFToolbox.com | ScoresReport.com |
| FootballDiehards.com | SI.com/Turner Sports |

TABLE 1-continued

| | |
|---|---|
| FootballDocs.com | TheSportingNews.com Fantasy Source |
| Footballguys.com | TheMostCredible.com |
| FootballOutsiders.com | UltimateFFStrategy.com |
| FreeFantasyFootballPicks.com | USAToday.com |
| GameofInches.blogspot.com | VUFantasyFootball.com |

For instance, www.rotowire.com may provide fantasy content such as fantasy baseball news and fantasy baseball leagues, projections, cheat sheets, player rankings and draft guides. Other content providers may deliver fantasy content as well. The embodiments are not limited to these examples.

A fantasy player may utilize one or more client devices 1202-*q* to access fantasy content sourced by the different content web servers 1510. For instance, a fantasy player may use a client device 1202-1 to check on a latest set of player rankings for his team provided by a content web server 1510. However, as with third-party applications not part of the fantasy network 1500, the fantasy player would need to shift focus from a browser window 1310 and open a new browser window to access fantasy content from the web server 1510. Again, this shift in focus removes the fantasy player from a unified fantasy game context, thereby increasing complexity and reducing fantasy gameplay experience. The unified fantasy framework solves these and other problems by having the fantasy web server 1210 host content from the content web servers 1510, and provides a user access to the hosted content through the browser window 1310 via a dynamic resource document 130, thereby allowing the user to remain within the fantasy gameplay context provided by the unified fantasy framework.

Figure 16:
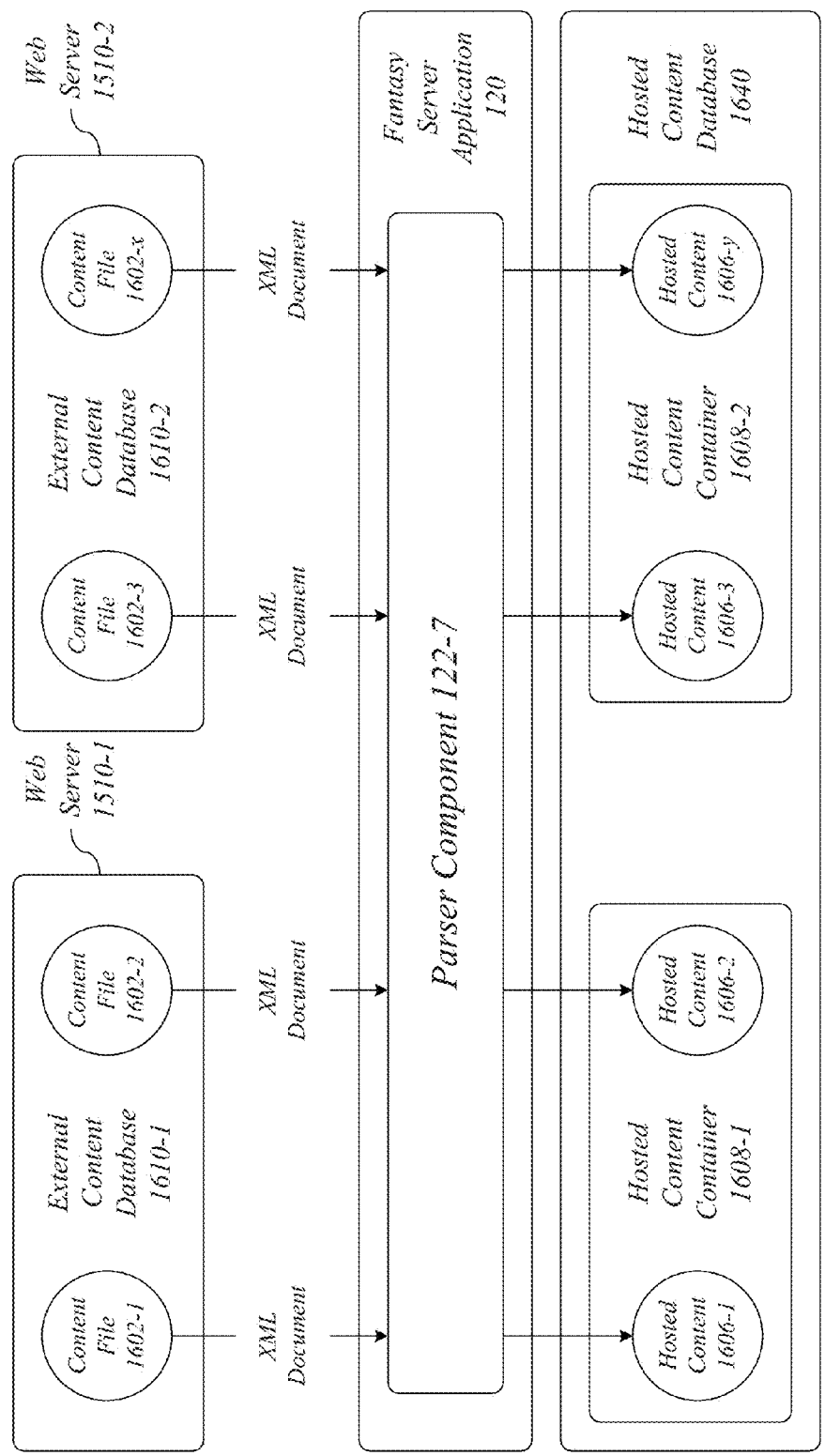
FIG. 16 illustrates an embodiment of a seventh operational environment.

FIG. 16 illustrates an embodiment of an operational environment 1600 for the fantasy network 1500 in general, and the fantasy open platform apparatus 100 in particular. The operational environment 1600 illustrates an example of the fantasy server application 120 retrieving and hosting content from an content web servers 1510-*s* as described with reference to FIG. 15.

As shown in FIG. 16, content web servers 1510-1, 1510-2 may comprise external content databases 1610-1, 1610-2, respectively, each managing various content files 1602-x. The fantasy server application 120 may receive or retrieve the content files 1602-x from the content web servers 1510-1, 1510-2 using a push model or a pull model, respectively. The push model or pull model may push or pull on a periodic, aperiodic, continuous, or on-demand basis. The content files 1602-x may be stored and/or delivered in a defined data schema (or data format) compatible to a parser component 122-7 of the fantasy server application 120, such as a comma separated values (CSV) document or XML document, for example.

The parser component 122-7 may be arranged to receive content files 1602-x, and parse the files for conversion into a data schema (or data format) suitable for storage by the database server 1212. A data format suitable for the database server 1212 may be a data format for a given database management system (DBMS) used by the database server 1212, such as a relational data model used by a relational database management system (RDBMS), in which data is stored in tables and the relationships among the data are also stored in tables. The data can be accessed or reassembled in many different ways without having to change table forms. Converting the content files 1602-x from a data schema such as XML into a relational data model facilitates access, search and retrieval of the underlying content stored in the content files 1602-x.

The content files 1602-x can be delivered to the fantasy web server 1210 using either a web interface or programmatically using HTTP. The former technique is more suitable for smaller amounts of content, while the latter technique is more suitable for larger amounts of content. To deliver content files 1602-x using a web interface, the content web server 1510 may use an application to submit content files 1602-x using a content delivery application appropriate for a given content type sourced by the content web server 1510. To deliver content files 1602-x using a HTTP interface, the content web server 1510 may use an application to submit content files 1602-x using the HTTP POST method. The POST method is supported by most programming and scripting languages, either natively or through a library.

A content file 1602-x may have a different data format depending on a type of content stored by the content file 1602-x. For instance, a content file 1602-1 with projections could have a CSV format, while a content file 1602-2 with rankings, outlooks or updates could have a XML format. Other data formats may be used as well. The embodiments are not limited in this context.

Along with a content file 1602-x, the content web server 1510 should deliver such information as a player identifier, a sport identifier, a position identifier, and statistical categories enumerated using standard codes provided by the fantasy server application 120. A given set of standard codes can be accessed using an access token and standardized API as previously described.

In one embodiment, for example, a sample content file 1602-1 with projections may have the following fields for each projection record as shown in Table 2, as follows:

TABLE 2

| Field Name | Field Description |
| --- | --- |
| player_id | A player ID. |
| Sport | A sport name. |

TABLE 2-continued

| Field Name | Field Description |
| --- | --- |
| Timestamp | The timestamp of the update record in UNIX timestamp format. If the timestamp field is omitted, the upload date and time will be used as the timestamp. |
| timerange | The size of the period to which the projection applies. The start or range of the period is specified by the period field. The timerange could be stated as one of the following values: year, month, week, daily, next7, next14, nextmonth, restofseason. |
| period | The start date or range of the period covered by the projections. The format of the period value depends on the value of the time range field:<br>year-the period year as YYYY<br>month-the period month as a number between 1 and 12<br>week-the period as the number of a week in the season. A week starts on Sunday.<br>daily-the date of the day period, in the form YYYYMMDD.<br>next7-the date of the first day of the seven day period, in the form YYYYMMDD.<br>next14-the date of the first day of the 14 day period, in the form YYYYMMDD.<br>restofseason-the date of the first day of the rest of the current season period, in the form YYYYMMDD. |
| (stats categories) | One field for each statistical category for which a projection is provided. The name of each field is the statistical category code. The value of each field is the value of that statistic in the appropriate format for that statistic. A projection does not need to be specified for every statistics category.<br>Note that when an updated projection record is submitted, the new record replaces the existing record in its entirety. An existing record should not be updated by submitting just the changed fields. Any new submission for a given player and period will replace the old submission completely. |

When a sample content file 1602-1 using the fields as shown in Table 2 is submitted using an HTTP interface, the sample content file 1602-1 may be formatted using a CSV format. An sample CSV file is shown as follows:

player_id,sport,datetime,timerange,period,1B,2B,3B,HR,H,AB,BA,RBI
589256,baseball,1321046902,year,2012,107,33,5,29,174,565,. . .308,97
393458,baseball,1321046902,year,2012,111,38,3,25,177,570,. . .311,102
589256,baseball,1321046902,week,5,2,0,1,8,24,. . .333,4
589256,baseball,1321046902,daily,20110708,1,1,0,0,2,4,. . .500,1
589256,baseball,1321046902,next14,20110708,1,1,0,0,2,4,. . .500,1

In one embodiment, for example, a sample content file 1602-2 with rankings may have the following fields for each ranking record as shown in Table 3, as follows:

TABLE 3

| Field Name | Field Description |
| --- | --- |
| sport | A sports code for the sport. |
| timestamp | The timestamp of the rankings record in UNIX timestamp format. If omitted, the upload date and time will be used as the timestamp. |
| group type | Player rankings should be organized into groups. The group type specifies the type of group you are using. Possible values are position, top100, top200, and top300. |
| group abbr | If the group type is position, the group abbreviation specifies the position to which each group applies. It should be expressed as a position code. If the group type is top100, top200, or top300, the abbr field should have the same value as the group field. |

TABLE 3-continued

| Field Name | Field Description |
|---|---|
| player id | A player ID for the player being ranked. |
| player rank | A player rank within the group, as an integer. |

When a sample content file 1602-2 using the fields as shown in Table 3 is submitted using an HTTP interface, the sample content file 1602-2 may be formatted using a XML format. A sample XML file is shown as follows:

```
<?xml version="1.0" encoding="utf-8"?>
<rankings sport="baseball" timestamp="1321046902">
    <group type="position" abbr="SS">
        <player id="589256" name="Troy Tulowitzki" rank="1" />
        <player id="393458" name="Hanley Ramirez" rank="2" />
        . . .
    </group>
    <group type="position" abbr="1B">
        <player id="223571" name="Albert Pujols" rank="1" />
        . . .
    </group>
    . . .
    <group type="top200" abbr="top200">
        <player id="223571" name="Albert Pujols" rank="1" />
        <player id="589256" name="Troy Tulowitzki" rank="2" />
        <player id="393458" name="Hanley Ramirez" rank="3" />
    </group>
</rankings>
```

Once the parser component 122-7 parses received content files 1602-x, the parser component 122-7 may store the parsed content files 1602-x as hosted content 1606-y in a hosted content database 1640 managed by the database server 1212. To separate different content files 1602-x from other hosted content, the hosted content 1606-y may be stored in different hosted content containers 1608-i. For instance, the hosted content 1606-1, 1606-2 from external content database 1610-1 may be stored in a hosted content container 1608-1, while hosted content 1606-3 from external content database 1610-2 may be stored in a hosted content container 1608-2. Different permissions and access rights may be assigned to each of the hosted content containers 1608-i to implement a given level of separation and security. Once content files 1602-x are stored as hosted content 1606-y, a user may access the hosted content 1606-y from within the unified fantasy framework, such as via a dynamic resource document 130 served by the fantasy server application 120 as implemented by the fantasy web server 1510.

Figure 17:
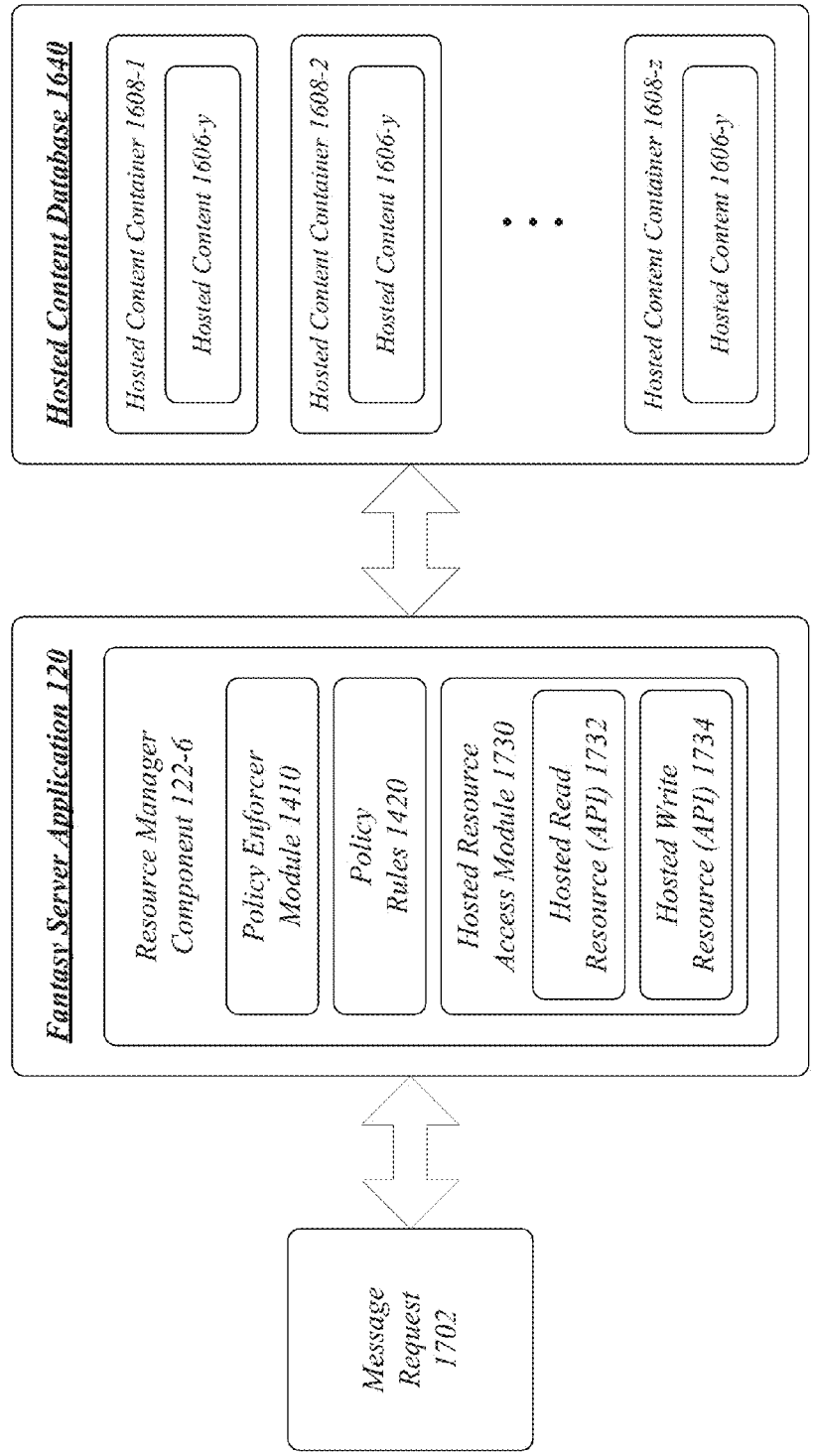
FIG. 17 illustrates an embodiment of an eighth operational environment.

FIG. 17 illustrates an embodiment of an operational environment 1700 for the fantasy network 1500 in general, and the fantasy open platform apparatus 100 in particular. The operational environment 1700 illustrates an example of the fantasy server application 120 retrieving hosted content for a client device 1202-q previously retrieved by the resource manager component 122-6 from one or more content web servers 1510-s as described with reference to FIG. 15.

As shown in FIG. 17, the resource manager component 122-6 may receive a message request 1702 from a web browser 702 of a user device 1202-q to access hosted content 1606-y of the hosted content database 1640 implemented by the database server 1212. The policy enforcer module 1410 may receive the message request 1702, retrieve information (e.g., an access token, subscription information, etc.) from the message request 1702, and determine whether a user of the web browser 702 has access to the requested hosted content 1212. If the user is denied access, the policy enforcer module 1410 may send a message response with an error message to the web browser 702. If the user is granted access, the policy enforcer module 1410 may pass the message request 1702 to a hosted resource access module 1730.

The resource manager component 122-6 may comprise a hosted resource access module 1730 arranged to access hosted content 1606-y from a hosted content database 1640. The hosted resource access module 1730 may comprise one or more standardized APIs to access the hosted content database 1640, such as a hosted read resource 1732 and a hosted write resource 1734. The hosted resource access module 1730, the hosted read resource 1732 and the hosted write resource 1734 may operate similar to the fantasy resource access module 1430, the fantasy read resource 1432 and the fantasy write resource, respectively, as described with reference to FIG. 14. In some cases, the hosted write resource 1734 may be enabled or disabled for certain hosted content 1606-y based on write privileges granted or denied, respectively, by a web content server 1510-s.

The resource manager component 122-6 may comprise a hosted resource access module 1730 arranged to access hosted content 1606-y from a hosted content database 1640 from a hosted content container 1608-z. The hosted resource access module 1730 may retrieve information from a message request 1702 identifying a hosted content 1606-y and/or a hosted content container 1608-z.

The web browser 702 may generate a message request 1702 in response to activation of one or more external content controls provided by a dynamic resource document 130, such as the external content controls 1302-w. In some cases, the external content controls 1302-w may be in a special segment type of the dynamic resource document 130. In such cases, when a user activates an external content control 1302-w, a message request 1702 is generated and sent directly to the fantasy web server 1210.

In some cases, the external content controls 1302-w may be provided in a host resource document 304-e or a guest resource document 504-h. When a user activates an external content control 1302-w, a message request 1702 is generated and sent indirectly to the fantasy web server 1210 through a host server program 302-d or a guest server program 502-g. In such cases, the hosted resource access module 1730 may access hosted content 1606-y from a hosted content database 1640 from a hosted content container 1608-z in response to a message request 1702 from a host server program 302-d or a guest server program 502-g.

As with the fantasy resource access module 1430, the hosted resource access module 1730 may retrieve REST information from a message request 1702. The REST information may comprise information needed by the policy enforcer module 1410 and/or the hosted resource access module 1730 in a REST format (e.g., stateless format). The hosted resource access module 1730 may comprise a hosted read resource 1732. The host read resource 1732 may read hosted content 1606-y from the hosted content database 1640 using the REST information. The hosted resource access module 1730 may comprise a hosted write resource 1734. The hosted write resource 1734 may write hosted content 1606-y to the hosted content database 1640 using the REST information.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 18 illustrates one embodiment of a logic flow 1800. The logic flow 1800 may be representative of some or all of the operations executed by one or more embodiments described herein.

In the illustrated embodiment shown in FIG. 18, the logic flow 1800 may receive a resource document request from a client device at block 1802. For example, the fantasy server application 120 may receive a resource document request 110 from a client device 1202-q.

The logic flow 1800 may generate a platform resource document with a host segment arranged to present a host resource document from a host server program and a guest segment arranged to present a guest resource document from a guest server program at block 1804. For example, the platform generator component 122-2 of the fantasy server application 120 may generate a platform resource document 130 with a host segment 232-1 arranged to present a host resource document 304-1 from a host server program 302-1 and a guest segment 234-1 arranged to present a guest resource document 506-1 from a guest server program 502-1.

The logic flow 1800 may retrieve the host resource document from the host server program, the host resource document having fantasy content from a fantasy content database at block 1806. For example, the host manager component 122-3 of the fantasy server application 120 may retrieve the host resource document 304-1 from the host server program 302-1, the host resource document 304-1 having fantasy content 142 from the fantasy content database 140.

The logic flow 1800 may generate a guest reference to the guest server program arranged to generate the guest resource document with fantasy content from the fantasy content database at block 1808. For example, the guest manager component 122-4 of the fantasy server application 120 may generate a guest reference 526-1 to the guest server program 502-1 arranged to generate the guest resource document 506-1 with fantasy content 142 from the fantasy content database 140.

The logic flow 1800 may add the host resource document to the host segment and the guest reference to the guest segment to form a dynamic resource document at block 1810. For example, the guest manager component 122-4 may add the host resource document 304-1 to the host segment 232-1 and the guest reference 526-1 to the guest segment 234-1 to form a dynamic resource document 130.

The logic flow 1800 may send a resource document response to the client device, the resource document response including the dynamic resource document at block 1812. For example, the fantasy server application 120 may send a resource document response to the client device 1202-q, the resource document response including the dynamic resource document 130.

FIG. 19 illustrates an embodiment of a message flow 1900 between various devices of the fantasy networks 1200, 1500. More particularly, the message flow 1900 illustrates an exemplary message flow of a client device 1202-1 retrieving a dynamic resource document 130 from the fantasy web server 1210.

As shown in FIG. 19, a client device 1202-1 may initiate retrieve resource operations 1950 by sending a resource document request 110 via a resource document request (RDQ) message 1902 to the fantasy web server 1210. The fantasy web server 1210 may initiate retrieve fantasy content operations 1954 by sending a database request (DBQ) message 1904 requesting fantasy content 142 to the database server 1212, and receiving a database response (DBS) message 1906 with the fantasy content 142. The fantasy web server 1210 may generate a dynamic resource document 130 using the fantasy content 142, and send the dynamic resource document 130 via a RDQ message 1908 to the client device 1202-1.

The web browser 702 of the client device 1202-1 may initiate rendering resource operations 1956 to render the dynamic resource document 130, and send a RDQ message 1910 requesting a guest resource document 504-1 from the guest web server 1220. The guest web server 1220 may initiate retrieve fantasy content operations 1958 by sending a DBQ message 1912 requesting fantasy content 142 to the fantasy web server 1210, which performs policy checks, and forwards the request by sending a DBQ message 1914 to the database server 1212. The database server 1212 initiates retrieve fantasy content operations 1962 to retrieve the fantasy content 142, and returns the fantasy content 142 via a DBS message 1916 to the fantasy web server 1210. The fantasy web server 1210 forwards the fantasy content from the database server 1212 to the guest web server 1220 via a DBS message 1918.

The guest web server 1220 initiates generate guest resource document operations 1964 and utilizes the fantasy content 142 to generate the guest resource document 504-1. The guest web server 220 then sends the guest resource document 504-1 to the client device 1202-1 in a RDS message 1920 to complete the rendering resource operations 1956. The web browser 702 then renders the dynamic resource document with a host segment 232-1 arranged to present a host resource document 304-1 from a host server program 302-1 implemented by the fantasy web server 1210, and a guest segment 234-1 arranged to present the guest resource document 506-1 from the guest server program 502-1 implemented by the guest web server 1220.

Figure 20:
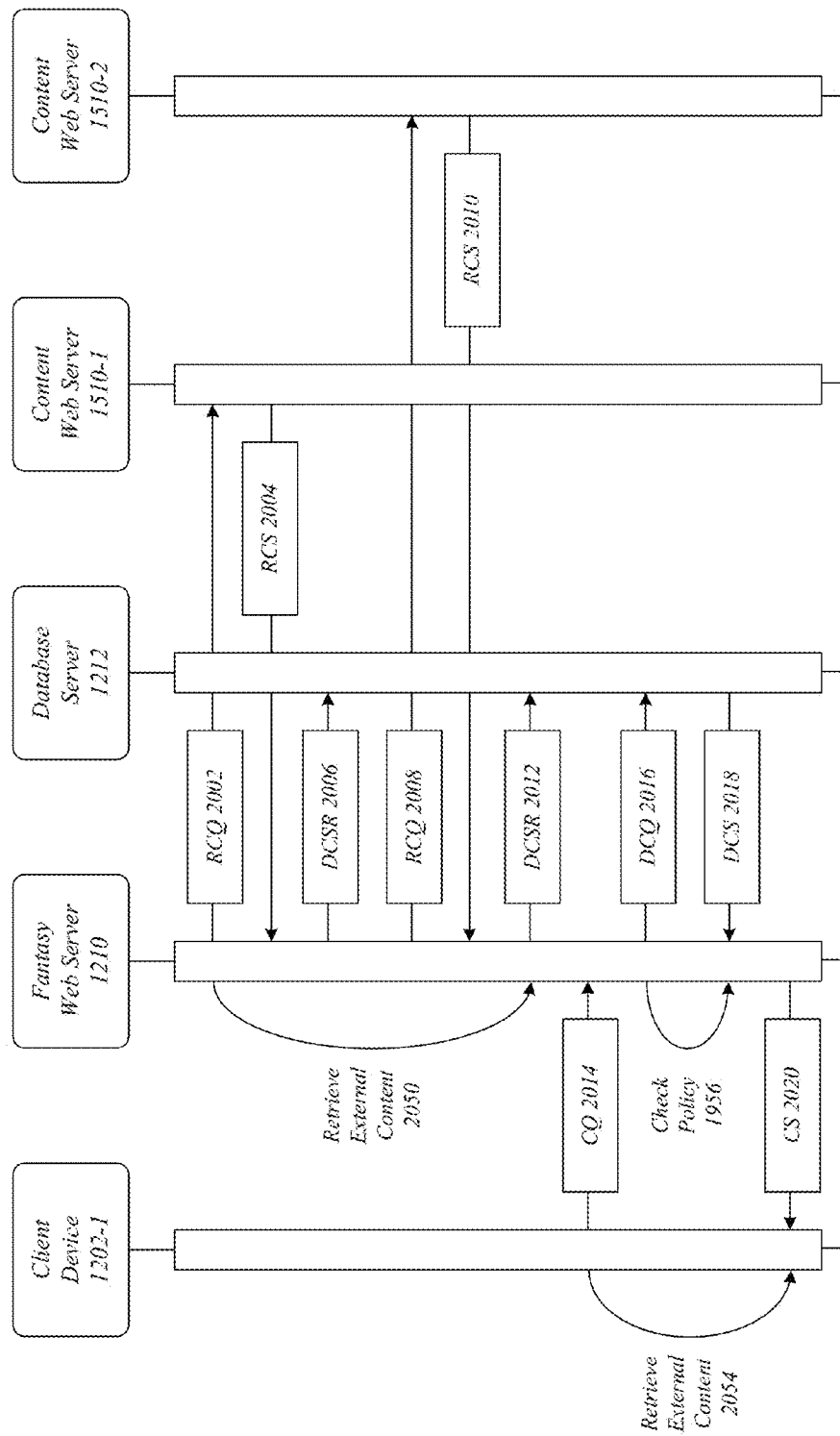
FIG. 20 illustrates an embodiment of a second message flow for the apparatus of FIG. 1.

FIG. 20 illustrates an embodiment of a message flow 2000 between various devices of the fantasy networks 1200, 1500. More particularly, the message flow 2000 illustrates an exemplary message flow of a client device 1202-1 retrieving hosted content from the fantasy web server 1210.

As shown in FIG. 20, the fantasy web server 1210 may initiate retrieve external content operations 2050 by sending a resource content request (RCQ) message 2002 to a content web server 1510-1 to retrieve a content file 1602-1 from the external content database 1610-1, and receiving a resource content response (RCS) message 2004 with the content file 1602-1. The fantasy web server 1210 may convert the content file 1602-1 to hosted content 1606-1, and send the hosted content 1606-1 to the database server 1212 using a database content store request (DCSR) message 2006, where it is persisted in the hosted content database 1640. Similarly, the fantasy web server 1210 may send a RCQ message 2008 to a content web server 1510-2 to retrieve a content file 1602-2 from the external content database 1610-2, and receive a RCS message 2010 with the content file 1602-2. The fantasy web server 1210 may convert the content file 1602-2 to hosted content 1606-2, and send the hosted content 1606-2 to the database server 1212 using a DCSR message 2012, where it is persisted in the hosted content database 1640.

The client device 1202-1 may initiate retrieve external content operations 2054 by sending a content request (CQ) message 2008 to the fantasy web server 1210 requesting hosted content 1606-1. The fantasy web server 1210 may perform check policy operations 1956, and if passed, send a database content request (DCQ) message 2016 to the database server 1212 requesting the hosted content 1606-1. The database server 1212 may retrieve the hosted content 1606-1, and send a database content response (DCS) message 2018 with the hosted content 1606-1 to the fantasy web server 1210. The fantasy web server 1210 may return the hosted content 1606-1 in a content response (CS) message 2020. The web browser 702 of the client device 1202-1 may render the hosted content 1606-1 in a special segment type, such as a new frame, of the dynamic resource document 130.

One embodiment described herein may present techniques to integrate client side applications into a fantasy open platform environment. A client side application may be referred to as an application that runs on a browser of a user client machine to create a dynamic experience for the user. Client side applications are applications written by third parties (e.g., developers) that may change how the fantasy open platform environment may render the pages or elements within the pages. These techniques may provide several advantages for the fantasy open platform environment. For example, there may be benefits to external content suppliers, external application developers, advertisers, end users and supply chain providers.

One idea of an integrated fantasy open platform environment is to build fantasy products such that independent third-party developers can build and market client side applications that interface with native products to create a better overall experience. These third-party client side applications may leverage the fantasy audience and data to create these better experiences. A common situation right now is that fantasy players must visit a variety of sites to get all the information they need. In an ideal world, these users would be able to access all this information from the comfort of their own fantasy league site within the fantasy open platform environment.

Figure 21:
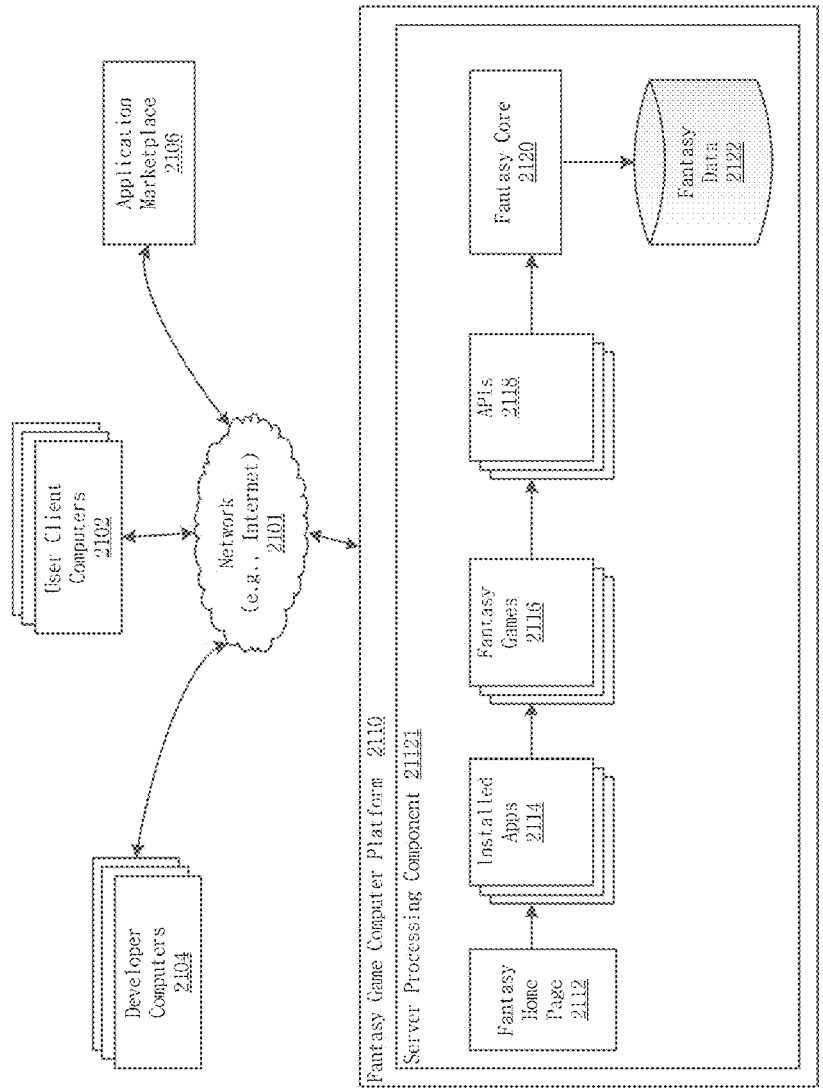
FIG. 21 illustrates an embodiment of a fantasy open platform environment architecture.

FIG. 21 illustrates an embodiment of a web-based fantasy open platform environment architecture 2100. The fantasy open platform environment architecture 2100 may include a fantasy open platform environment 2110 executing on one or more server processing components 2111 operative on one or more processor circuits that host and run: a fantasy home page 2112, installed applications 2114, fantasy games 2116, application programming interfaces (APIs) 2118, a fantasy core 2120, and a fantasy data store 2122. In addition, the fantasy open platform environment architecture 2100 may also permit user client computers 2102 to interact with the fantasy open platform environment 2110 over a network 2101 such as, for instance, the Internet. An application marketplace 2106 may allow users to shop for and obtain independent 3$^{rd}$ party client side applications that may be used in conjunction with the fantasy open platform environment 2110. The 3$^{rd}$ party client side applications may be developed on developer computers 2104 and uploaded to the application marketplace 2106 over network 2101. User client computers 2102 may than integrate client side 3$^{rd}$ party applications into the fantasy open platform environment 2110 according to embodiments presented herein.

The fantasy core 2120 may be a component of the fantasy open platform environment 2110 responsible for implementing the basic or core fantasy functionality. The fantasy core may comprise a set of processes, routines, tools and other source code that implements the basics for the fantasy open platform environment. The fantasy core 2120 may implement the concepts that are universal to all fantasy leagues. These concepts may be represented by objects that have specific properties and may be stored in the fantasy data store 2122. The fantasy core 2120 provides the access to the fantasy data store 2122. A partial list of these objects may include league, team, owner, game, standings, schedule, roster, transaction, categories, positions, pro statistics, and fantasy statistics. The league object organizes a collection of teams that play under one set of rules. The team object represents a team which is a member of the league. Leagues must have at least two teams. Teams play in leagues to determine a winner. The owner object represents a human individual controlling a team. A team may include one or more owners. The game object represents a matchup of two teams. The standings object may be an ordered list of teams in a league, following the rules and based on the results of the games played. The schedule object may be a list of games already played or to be played. The roster object may be a collection of players on a team. The transaction object may be a roster move that can be a player being added or dropped from a team, or traded between teams. The categories object may be a list of scoring statistics to be tracked in a particular league (e.g. touchdowns, receptions, home runs, free throw percentage, etc.). The positions object may be a list of player positions eligible to participate in the game (e.g. quarterbacks, short stops, power forwards, etc.). The pro statistics object may be indicative of statistics accumulated by a player in the real world. The fantasy statistics object may be indicative of real world statistics accumulated by the players converted to the fantasy team according to the league rules.

The fantasy core 2120 may manage objects for the fantasy league that are static or unchangeable. For example, a user can set up a league where a touchdown scored is worth six points or he can choose to assign five points for a touchdown. That logic may not be part of the fantasy core 2120 because it is changeable. However, the fantasy core 2120 does not support a system that is not based on leagues and teams or a system in which teams play two opponents at once. These may be characterized as static or unchangeable objects.

Fantasy games 2116 may be comprised of fantasy game code. The fantasy game code may be the code that supports the existing fantasy products. The fantasy game code augments the fantasy core 2120 by providing any customization required by each product. The fantasy game code may introduce differences among fantasy products. Some differences among fantasy products are data driven and handled at the fantasy core 2120 level. For example, the difference between baseball and football is in the set of real life objects used. Baseball depends on MLB teams, players, games, stats, categories, positions, etc. While football depends on NFL teams, players, games, stats, categories, positions, etc. These differences can be, for the most part, handled exclusively via the data made available to the fantasy core 2120.

However, other differences are handled by the fantasy game 2116 component. For example, baseball, hockey and basketball support periods of any length (although the large majority of all leagues use a Monday to Sunday week period), while football has periods fixed at one week that last from Wednesday to Tuesday. In baseball/basketball/hockey example, the pro teams play several times per period, and the stats collected during all those games are summed up (or averaged) and that comprises the fantasy stats for the player. In football on the other hand, teams play once per period and that accounts for the totality of the stats accumulated for a given period. Other differences handled at fantasy game 2116 level may include things like games that use a salary cap (and thus allows the same player to be a on multiple teams) versus those that use a draft or auction to ensure that a player only appears on one team at a time.

To interact with the fantasy core 2120, the fantasy game 2116 code, as well as the installed applications 2114 (both native and third party applications) that use the fantasy API 2118 layer. The fantasy API 2118 layer provides the mechanism permitting applications to use the fantasy core 2120 logic and have access to the fantasy data 2122.

Neither the fantasy games 2116 nor the installed applications 2114 may have direct access to the fantasy data 2122. The fantasy games 2116 and installed applications 2114 may have to access the fantasy data 2122 through the fantasy core 2120 which enforces the basic rules. This is a key aspect of the system that may prevent rogue applications from being able to cheat the system. If an application 2114 could interact directly with the fantasy data 2122, it could bypass the rules and do whatever it wanted, breaking the integrity of the game.

An API 2118 may be comprised of a large number of function calls that return different data or perform specific actions. In particular, all fantasy core 2120 objects should have access methods to retrieve and update them. The fantasy open platform environment 2110 may expose a number of these to the third-party developers but not necessarily all.

The Fantasy APIs 2118 may be built using REST (Representational State Transfer), a common protocol used throughout the World Wide Web because of its simplicity. Moreover, the APIs 2118 may incorporate security and authentication via Open Authentication (OAuth), an open standard for validating access between servers and clients.

JavaScript may be used as the language for developers to use to mitigate the security this risk as much as possible. JavaScript may be used for two major reasons. First and most importantly, JavaScript has some limitations in its ability to access system resources. JavaScript may only access whatever data that may be converted to a JavaScript-readable format. Second, JavaScript is a fairly common language as it is heavily used to manipulate web page content.

One of the core tenants in the fantasy open platform environment is that the fantasy core 2120 objects are available via APIs 2118 in a format that is relatively easily accessible by Perl, JavaScript and XML. Accessing fantasy core 2120 objects without using an API 2118 should be discouraged or prevented and all updates should be done via the API 2118. Modifying object fields or saving such objects to disk should go through an API 2118. In addition, APIs 2118 should be accessible as native (internal) Perl calls, AJAX calls (from JavaScript) or RESTful interface (server to server).

Another principal of the fantasy open platform environment 2110 may be that styles used within the fantasy product application area (e.g., below the league navigation portion of the web page) should be maintained separate from the rest in its own cascading style sheets (CSS) file, to allow developers to override those, but yet not affect the overall fantasy open platform environment 2110 look and feel. Moreover, all functionality handled via JavaScript call should be able to be overridden by an external developer in JavaScript.

FIG. 22 illustrates a seven layer fantasy open platform environment architecture 2200. The seven layers include a sports layer 2210, a fantasy core layer 2220, a product layer 2230, a configuration layer 2240, a component layer 2250, an interface layer 2260, and an application layer 2270.

The sports layer 2210 is the lowest layer (i.e., layer 0) and is tasked with defining objects that exist outside of the fantasy context, the 'real life' objects. Examples of these objects may include sports, leagues, conferences, divisions, teams, players, and statistics. The contents of the sports layer 2210 may be considered to be the facts. This is content that does not change and does not need to be overridden in any way.

The fantasy core layer 2220 is the second lowest layer (i.e. layer 1) of the fantasy open platform environment architecture 2200. The fantasy core layer 2220 may contain a set of fantasy core objects and operations that serve as a foundation for most fantasy products. These objects may be characterized as the atomic structures that are usually required by all fantasy products.

Figure 23:
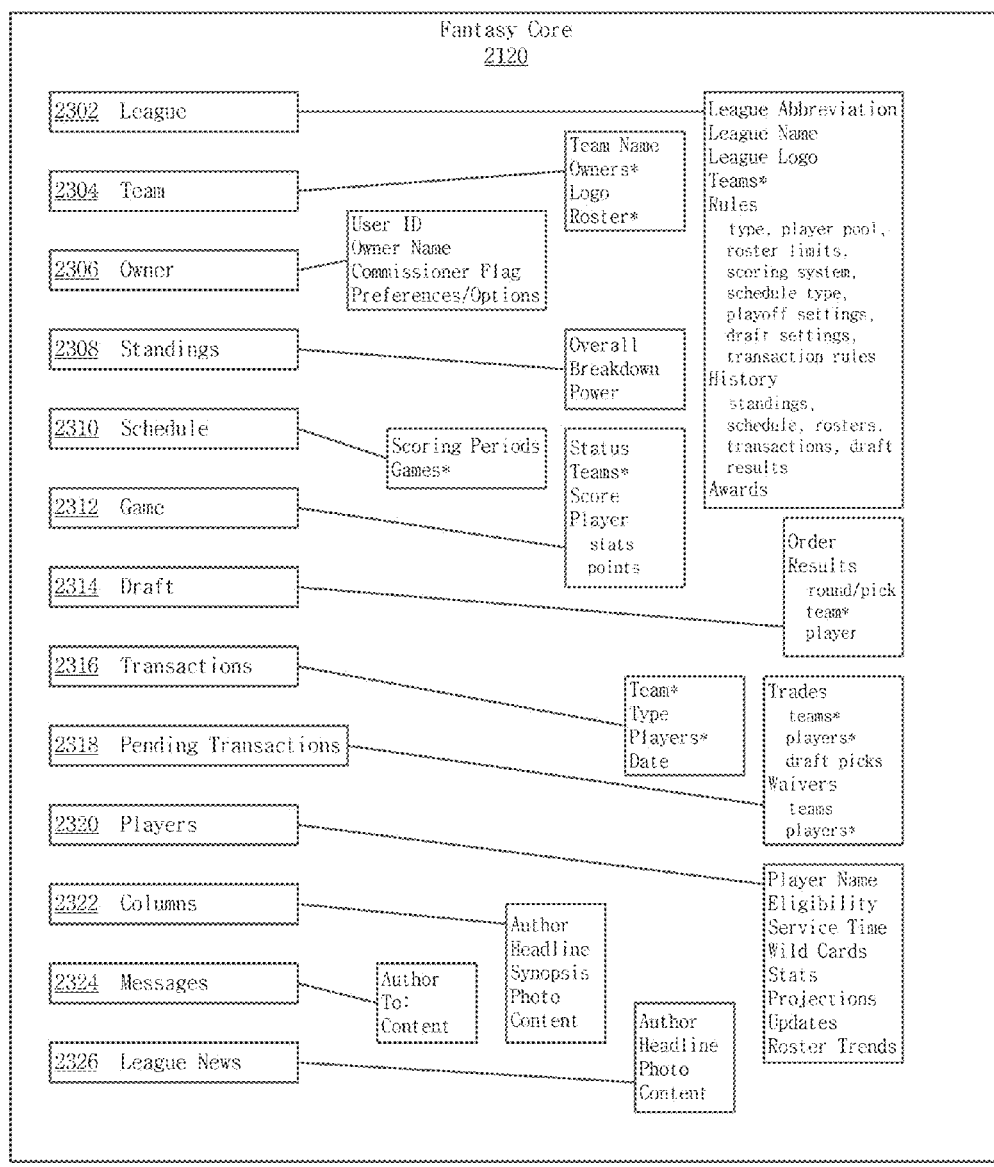
FIG. 23 illustrates a fantasy core object hierarchy.

FIG. 23 illustrates a hierarchical illustration of fantasy core objects. The primary fantasy core objects may include, but is not necessarily limited to, a league object 2302, a team object 2304, an owner object 2306, a standings object 2308, a schedule object 2310, a game object 2312, a draft object 2314, a transactions object 2316, a pending transactions object 2318, a players object 2320, a columns object 2322, a messages object 2324, and a league news object 2326.

The league object 2302 may include fields such as a league abbreviation field, a league name field, a league logo field, a teams field, a rules field, a history field, and an awards field. The teams field may be a pointer to the team object 2304 data structure. The rules field may include sub-fields for type, player pool, roster limits, scoring system, schedule type, playoff settings, draft settings, and transaction rules. The history field may include sub-fields for standings, schedule, rosters, transactions, and draft results.

The team object 2304 may include fields such as a team name field, an owners field, a logo field, and a rosters field. The owners field may be a pointer to the owners object 2306 data structure. The roster field may be a pointer to a rosters object data structure.

The owners object 2306 may include fields such as a user ID field, an owner name field, a commissioner flag field, and a preferences/options field. The standings object 2308 may include fields such as an overall field, a breakdown field, and a power field. The schedule object 2310 may include fields such as a scoring periods field and a games field. The games field may be a pointer to the game object 2312 data structure.

The game object 2312 may include fields such as a status field, a teams field, a score field, and a players field. The teams field may be a pointer to the team object 2304 data structure. The player field may include sub-fields for statistics and points.

The draft object 2314 may include fields such as an order field and a results field. The results field may include sub-fields for round/pick, team, and player. The team sub-field may be a pointer to the team object 2304 data structure.

The transactions object 2316 may include fields such as a team field, a type field, a players field, and a date field. The team field may be a pointer to the team object 2304 data structure. The player field may be a pointer to the players object 2320 data structure.

The pending transactions object 2318 may include fields such as a trades field and a waivers field. The trades field may include sub-fields for teams, players, and draft picks. The waivers field may include sub-fields for teams and players. The teams sub-field may be a pointer to the team object 2304 data structure. The player sub-field may be a pointer to the players object 2320 data structure.

The players object 2320 may include fields such as player name, an eligibility field, a service time field, a wild cards field, a statistics field, a projections field, an updates field and a roster trends field. The columns object 2322 may include fields such as an author field, a headline field, a synopsis field, a photo field, and a content field. The messages object 2324 may include fields such as an author field, a "To:" field, and a content field. The league news object 2326 may include fields such as an author field, a headline field, a photo field, and a content field.

Figure 24:
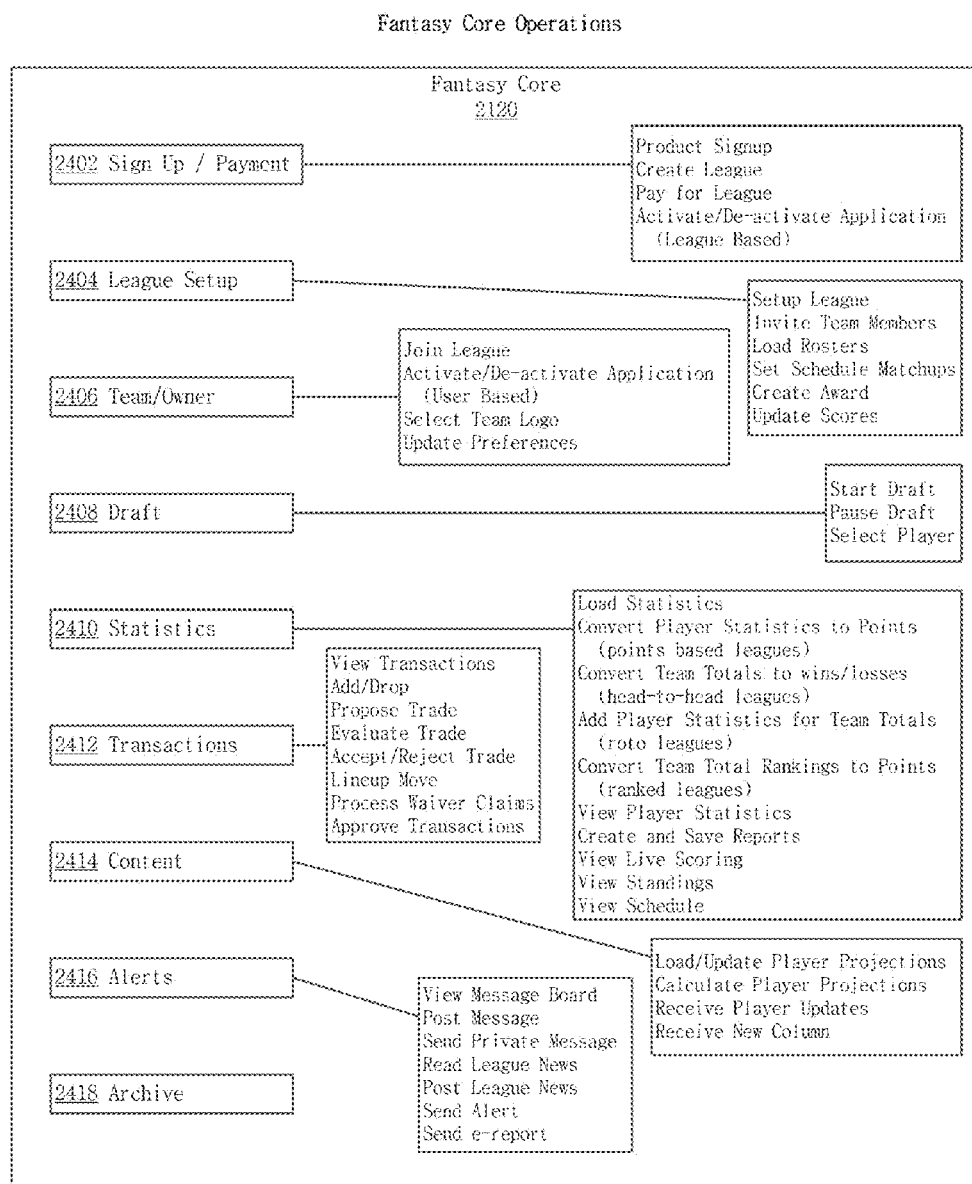
FIG. 24 illustrates a fantasy core operations hierarchy.

FIG. 24 illustrates a hierarchical illustration of fantasy core operations. Fantasy core operations may be characterized as the activities needed to set up and execute a fantasy game on a fantasy open platform environment 2110. The primary operations may include a signup/payment operation 2402, a league setup operation 2404, a team/owner operation 2406, a draft operation 2408, a statistics operation 2410, a transactions operation 2412, a content operation 2414, an alerts operation 2416, and an archive operation 2418.

The signup/payment operation 2402 may include functions such as a product signup function, a create league function, a pay for league function, and an activate/deactivate application function. The activate/deactivate application function for the signup/payment operation 2402 may be league based.

The league setup operation 2404 may include functions such as a setup league function, an invite team members function, a load rosters function, a set schedule matchups function, a create award function, and an update scores function.

The team/owner operation 2406 may include functions such as a join league function, a create league function, an activate/deactivate application function, a select team function, and an update preferences function. The activate/deactivate application function for the team/owner operation 2406 may be user based.

The draft operation 2408 may include functions such as a start draft function, a pause draft function, and a select player function.

The statistics operation 2410 may include functions such as a load statistics function, a convert player statistics to points function, a convert team totals to win/loss function, an add player statistics to team totals function, a convert team total rankings to points function, a view player statistics function, a create and save reports function, a view live scoring function, a view standings function, and a view schedule function. The convert player statistics to points function may be applied to points based leagues. The convert team totals to win/loss function may be applied to head-to-head leagues. The add player statistics to team totals function may be applied to roto leagues. The convert team total rankings to points function may be applied to ranked leagues.

The transactions operation 2412 may include functions such as a view transactions function, an add/drop function, a propose trade function, an evaluate trade function, an accept/reject/counter trade function, a lineup move function, a process waiver claims function, and an approve transactions function.

The content operation 2414 may include functions such as a load/update player projections function, a calculate player projections function, a receive player updates function, and a receive new column function.

The alerts operation 2416 may include functions such as a view message board function, a post message function, a send private message function, a read league news function, a post league news function, a send alert function, and a send e-report function.

Referring back to FIG. 22, the product layer 2230 is layer 2 of the fantasy open platform environment architecture 2200 and defines the objects and operations that are specific to each fantasy product. This may include pointers to sport specific elements files (e.g., football.pm, baseball.pm, etc.) and product specific elements files (e.g., singleleague.pm, challengeleague.pm, etc.). For example, the product layer 2230 may contain the logic necessary to handle a commissioner league differently than a single league and a baseball league differently than a football league.

The configuration layer 2240 is layer 3 of the fantasy open platform environment architecture 2200 and defines the functionality that is specific to a given user or league.

The component layer 2250 is layer 4 of the fantasy open platform environment architecture 2200. The component layer 2250 may include a set of objects created for the sake of convenience and to facilitate operations at the application layer. These components may provide an additional level of abstraction over the fantasy core 22120 objects, in some cases combining them into more complex objects or creating specific views of those objects or data. The purpose of component layer 2250 objects may be to facilitate the application code to reuse common objects in familiar ways without having to duplicate the same code and provide language independence.

The component layer 2250 objects may be generally characterized as data objects, and convenience objects. Data objects may offer a view into a data set. The views may be represented in various forms, separate from the content itself. Such data objects may be represented in XML, JavaScript Object Notation (JSON) or some TBL variant, depending on the situation. Some examples include, but are not limited to, standings, schedules, player statistics, and team roster. JSON is a text-based open standard designed for human-readable data interchange. It is derived from the JavaScript scripting language for representing simple data structures and associative arrays, called objects. Despite its relationship to JavaScript, it is language-independent, with parsers available for many languages.

Read-only objects may refer to commonly used fantasy core objects such as league, team, or players. Such objects are already well-defined Perl objects easily accessible from anywhere in the Perl code base and are stored as such (using Storable). However, making them available to application code could be problematic. For example, we don't want application code modifying individual fields in the league object (see requirement on enforcing commissioner access and so forth). A complex object may create a copy of these objects so that the application code can play with them and have ease of access to the various fields, but are essentially read-only. If application code needs to change a field, it would have to call an appropriate function to do so. The objects may be synced after an update.

Convenience objects may be characterized as objects that are likely to be created for convenience of use on specific cases. Convenience objects may not be as usable across a wide number of applications as the data and read-only objects, but it may still make sense to create them in specific circumstances. The point is to assist the application developer. There may not be a precise rule to what is and what is not a convenience object as they will be created when a need arises. Some examples are presented.

In a first example, the fantasy core 2120 (level 1) data set includes separate objects for league news and columns (called fantasy news within the products). This is because these objects, while sharing some common elements (like headline, content, author, etc.) also have significant differences. For instance, the column object includes an author field and the league news object also includes an author field at a different level. For use at the application layer 2270 it is sometimes useful to combine these two into a single object. A convenience object can then be created as the union of these two objects.

In another example, the data required to build a player profile blurb that appears at the top of each player page (profile, game log, situational stats, latest news, eligibility, service time, etc.) is a combination of level 0 player data and level 1 roster and statistics data. This data may be pulled from multiple places. A convenience object may be created that collects all the data and makes it available to the application code in a neat little package.

In yet another example, a list of valid period options to display to the user on a given report may be created. For instance, many reports in the fantasy products allow the user to look at the report for a previous week by selecting a particular week from a list that appears across the top of the report. Creating these lists is a common process that may be abstracted as a convenience object.

The interface layer 2260 is layer 5 of the fantasy open platform environment architecture 2200. The interface layer 2260 may include contain the processes that are responsible for the user interface. Currently the user interface is handled by a combination of code spread among library pm files, application pm files and client technologies such as the hyper-text markup language (HTML), JavaScript and CSS. The interface layer 2260 may include four parallel types of elements: a functional interface objects element, a dynamic interface element, a style/look and feel element, and a markup element.

The functional interface objects element may be comprised of objects and components to be included in a page. When looking at a page, it should be possible to deconstruct the page and break it into individual components (e.g., functional interface objects). For example, a standings page could be said to have the following functional interface elements:

site header (may include global navigation, banner/pushdown ad unit and border ads)
league header
league navigation (both levels)
application navigation
period/year selection bar
standings report
skyscraper ad
league footer
global footer (about links, copyright and navigation)

Functional interface elements may use component layer objects from lower layers to build pages of the desired complexity.

The dynamic interface element may refer to JavaScript code used to display objects on the fly or to create interactive experiences by acquiring data via JSON (or other methods) and displaying them in place. A current example may be how data flows into the live scoring product. The intent of the dynamic interface is to make this layer very powerful to facilitate the types of pages that can be created with just client code accessing component objects. This utilizes a powerful JavaScript library to handle the user interface as well as handling the multiple screen sizes and device independence of the client's machine browser.

The style/look and feel element may refer to what defines how objects look (e.g., fonts, colors, sizes, etc.). Essentially this refers to what can be controlled with CSS.

The markup element where HTML code lies and allows an application to embed HTML code to handle specific problems. It is analogous to the insertion of HTML code in template files.

The application layer 2270 is layer 6 of the fantasy open platform environment architecture 2200. The application layer 2270 may refer to application code for specific operations to carry out a particular fantasy operation (or page). The application layer 2270 may contain code that is specific for a particular purpose and is code that does not exist in any of the previous layers. It is not code that needs to be reused because if it were, it would be moved down to a lower layer.

In one embodiment, client side applications are integrated into the fantasy open platform environment architecture 2100. In general, a client side application is an application that runs on the user's client machine browser to create a dynamic experience for the user. Client side applications may be written in JavaScript. The main advantage that JavaScript provides is its limited access to a user client computer 2102. Browsers are generally good at preventing JavaScript code from disrupting operations. JavaScript, however, provides no defense against a program using up too many computer resources. Some modern browsers recognize when this is happening and offer the user an opportunity to kill the offending process. Fortunately, a misbehaved client side application may be limited in its effects to one user at a time since it is running on that user's browser.

Figure 25:
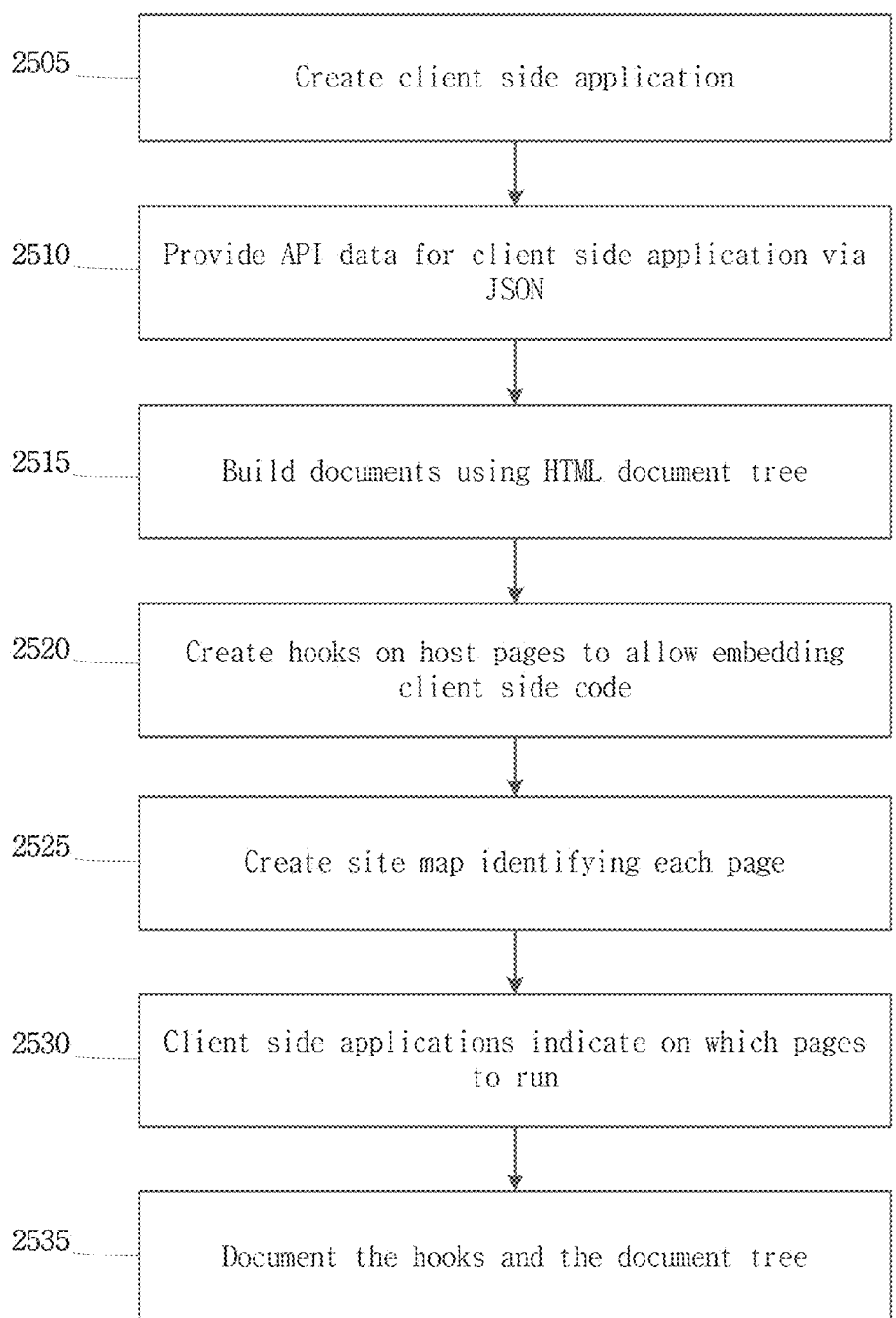
FIG. 25 illustrates a logic flow diagram.

FIG. 25 illustrates one embodiment of a logic flow 2500. The logic flow 2500 may be representative of some or all of the operations executed by one or more embodiments described herein to allow developers to create and implement client side applications into the fantasy open platform environment architecture 2100.

In the illustrated embodiment shown in FIG. 25, the logic flow 2500 may create a client side application at block 2505. For example, a developer may create an application using JavaScript that supplements the user experience of fantasy product(s) executing on the fantasy open platform environment 2110. The application may then be made available to users via the application marketplace 2106 upon its approval. Approval may include verification that the client side application meets the guidelines and requirements of the fantasy open platform environment 2110 to ensure compatibility and mitigate any risk of disruption to the fantasy open platform environment 2110. The embodiments are not limited to these examples.

In the illustrated embodiment shown in FIG. 25, the logic flow 2500 may provide API data for a client side application via JSON at block 2510. For example, to obtain approval for the client side application to run within the fantasy open platform environment 2110, the developer may need to adhere to certain requirements. One requirement may be that the client side application provide API data via JSON since the client side application may need access to data and/or resources of the fantasy open platform environment 2110. JSON access may be used because it is a text-based open standard designed for human-readable data interchange. The API data may be needed to allow a client side application to interact with the fantasy open platform environment 2110 when necessary via the user's browser. The embodiments are not limited to these examples.

In the illustrated embodiment shown in FIG. 25, the logic flow 2500 may build documents using an HTML document tree at block 2515. For example, client side application code may build web pages having a very well designed HTML document tree where all the elements are properly identified. HTML is the main markup language for displaying web pages and other information that can be displayed in a web browser. HTML is written in the form of HTML elements comprised of tags enclosed in brackets (like <html>), within the web page content. An HTML element is an individual component of an HTML document. HTML documents are composed of a tree of HTML elements and other nodes, such as text nodes. Each element can have attributes specified. Elements can also have content, including other elements and text. HTML elements represent semantics, or meaning. For example, the title element represents the title of the document. HTML tags most commonly come in pairs like <h1> and </h1>, although some tags, known as empty elements, are unpaired, for example <img>. The first tag in a pair is the start tag, the second tag is the end tag (they are also called opening tags and closing tags). In between these tags web designers can add text, tags, comments and other types of text-based content. The purpose of a web browser is to read HTML documents and translate them into visible or audible web pages. The browser does not display the HTML tags, but uses the tags to interpret the content of the page. HTML elements form the building blocks of all websites. HTML allows images and objects to be embedded and can be used to create interactive forms. It provides a means to create structured documents by denoting structural semantics for text such as headings, paragraphs, lists, links, quotes and other items. It can embed scripts in languages such as JavaScript which affect the behavior of HTML webpages. Web browsers can also refer to cascading style sheets (CSS) to define the appearance and layout of text and other material. Such a document tree would allow client side application code to clearly locate the place on a web page where particular content should be placed and replace it (or add to it). This may be done using <div> tags and clear element identifiers. The embodiments are not limited to these examples.

In the illustrated embodiment shown in FIG. 25, the logic flow 2500 may create hooks on host pages to allow embedding of client side application code at block 2520. For example, hooks may be created on the fantasy open platform environment 2110 web pages to allow embedding of developer client side application code depending on the application requirements. This may include predetermining which hooks to create to balance performance and security issues with the degree of openness available to client side applications. Links to sports and fantasy objects on a page should have hooks. This may include team names, player names and owner names. In addition, main user interface elements on a page should have hooks. This may include tables, dialogs, charts, team logos, alerts, content boxes, etc. Common page actions on a page should have hooks. This may be a reaction to hitting a submit button, but may also apply to changing tabs. The embodiments are not limited to these examples.

In the illustrated embodiment shown in FIG. 25, the logic flow 2500 may create a site map identifying each page at block 2525. For example, a clear site map where each page is clearly identified to allow client side application developers to specify on which pages to run. This may also include creating a system of wild cards or other flags that developers can use to select actions such as "any page where a player name may appear". The embodiments are not limited to these examples.

In the illustrated embodiment shown in FIG. 25, the logic flow 2500 may indicate on which pages a client side application will run at block 2530. For example, when a user web browser includes a client side application, it should include an indication on which pages the application code on the needs to run with respect to the fantasy open platform environment 2110. The client side application code may use the hooks to attach itself to certain events (e.g., run when a user hits the submit button, when some content on the page updates or simply when page loading is complete). The embodiments are not limited to these examples.

In the illustrated embodiment shown in FIG. 25, the logic flow 2500 may document the hooks and the document tree at block 2535. For example, documenting the hooks and the document tree may provide a mechanism for tracing and/or understanding client side application behavior and capabilities. The embodiments are not limited to these examples.

Client side applications may be constructed such that they can automatically do what a user may do manually. For example, this may include automatically starting players with the best point totals for an upcoming game rather than having the user manually set or change a previous or default lineup. Consider a football fantasy game. The user may have acquired an "optimal lineup" client side application from the application marketplace 2106. The purpose of the optimal lineup client side application is to review the current roster of players of the user's fantasy football team and determine which players have accumulated the most points to date for a season. The optimal lineup client side application may then insert players with the most points into starting positions for the week of upcoming games. This lineup may be used as the default lineup but still be manually edited by the user should the user wish to play a hunch and substitute a player with a lesser point total in a particular starting position.

The sophistication of the optimal lineup client side application may be even more complex in that it may access and process data of players against the teams they will be facing that week to obtain historical performance or weight the strength of the defense a player will face when determining which player to start. Consider a fantasy team that includes the running back that has tallied the most points of all running backs to date this season. The fantasy team may also include a running back with the $5^{th}$ highest total season-to-date. The obvious choice may be to start the running back with the most points. However, suppose the best running back is playing against the team with the best run defense while the $5^{th}$ best running back is playing against the team with the worst run defense. The player projections for the upcoming week may actually indicate that the $5^{th}$ best running back is projected to total more points this particular week. In such a case, the optimal lineup client side application may start the $5^{th}$ best running back over the best running back by using player projections as its key indicator rather than season point totals-to-date. Moreover, the same application or another application may have a different formula for calculating player projections. Thus, client side applications may be directed to providing the most accurate player projections. Player projection applications in combination with starting lineup application may work in concert to provide the optimal starting lineup for a fantasy team on a week-to-week basis.

Figure 26:
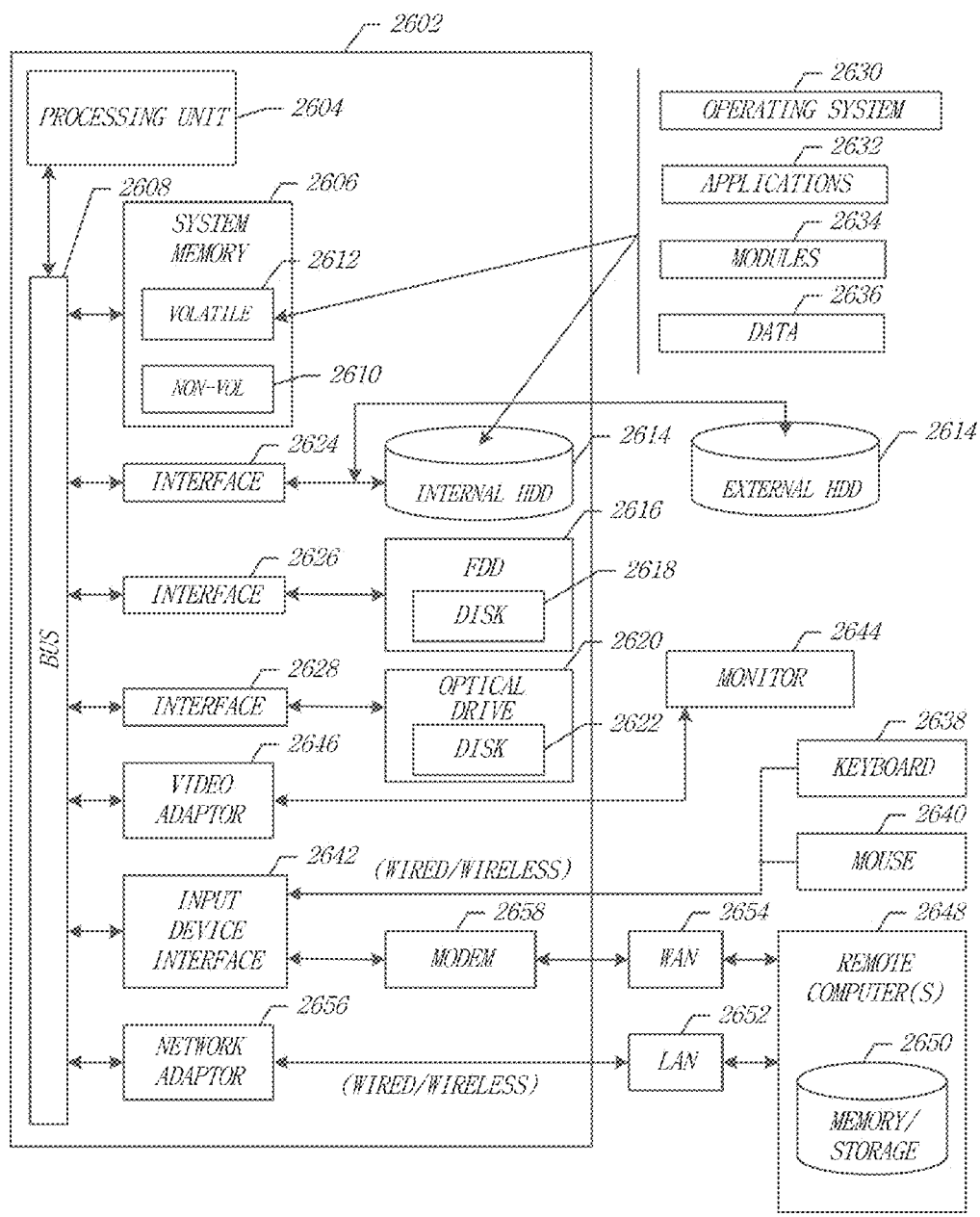
FIG. 26 illustrates an embodiment of a computing architecture.

FIG. 26 illustrates an embodiment of an exemplary computing architecture 2600 suitable for implementing various embodiments as previously described with reference to FIGS. 1-25. In one embodiment, the computing architecture 2600 may comprise or be implemented as part of an electronic device. Examples of an electronic device may include those described with reference to FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 2600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 2600 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 2600.

As shown in FIG. 26, the computing architecture 2600 comprises a processing unit 2604, a system memory 2606 and a system bus 2608. The processing unit 2604 may comprise any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Core (2) Quad®, Core i3®, Core i5®, Core i7®, Atom®, Itanium®, Pentium®, Xeon®, and XScale® processors; and similar processors. Dual microprocessors, multi-core processors, and other multi-processor architectures may also be employed as the processing unit 2604.

The system bus 2608 provides an interface for system components including, but not limited to, the system memory 2606 to the processing unit 2604. The system bus 2608 can be any of several types of bus structure that may further interconnect to a memory bus (with or without a memory controller), a peripheral bus, and a local bus using any of a variety of commercially available bus architectures. Interface adapters may connect to the system bus 2608 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 2600 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 2606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 26, the system memory 2606 can include non-volatile memory 2610 and/or volatile memory 2612. A basic input/output system (BIOS) can be stored in the non-volatile memory 2610.

The computer 2602 may include various types of computer-readable storage media in the form of one or more lower speed memory units, including an internal (or external) hard disk drive (HDD) 2614, a magnetic floppy disk drive (FDD) 2616 to read from or write to a removable magnetic disk 2618, and an optical disk drive 2620 to read from or write to a removable optical disk 2622 (e.g., a CD-ROM or DVD). The HDD 2614, FDD 2616 and optical disk drive 2620 can be connected to the system bus 2608 by a HDD interface 2624, an FDD interface 2626 and an optical drive interface 2628, respectively. The HDD interface 2624 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 2610, 2612, including an operating system 2630, one or more application programs 2632, other program modules 2634, and program data 2636. In one embodiment, the one or more application programs 2632, other program modules 2634, and program data 2636 can include, for example, the various applications and/or components of the fantasy open platform apparatus 100.

A user can enter commands and information into the computer 2602 through one or more wire/wireless input devices, for example, a keyboard 2638 and a pointing device, such as a mouse 2640. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 2604 through an input device interface 2642 that is coupled to the system bus 2608, but can be connected by other interfaces such as a parallel port, IEEE 1394 serial port, a game port, a USB port, an IR interface, and so forth.

A monitor 2644 or other type of display device is also connected to the system bus 2608 via an interface, such as a video adaptor 2646. The monitor 2644 may be internal or external to the computer 2602. In addition to the monitor 2644, a computer typically includes other peripheral output devices, such as speakers, printers, and so forth.

The computer 2602 may operate in a networked environment using logical connections via wire and/or wireless communications to one or more remote computers, such as a remote computer 2648. The remote computer 2648 can be a workstation, a server computer, a router, a personal computer, portable computer, microprocessor-based entertainment appliance, a peer device or other common network node, and typically includes many or all of the elements described relative to the computer 2602, although, for purposes of brevity, only a memory/storage device 2650 is illustrated. The logical connections depicted include wire/wireless connectivity to a local area network (LAN) 2652 and/or larger networks, for example, a wide area network (WAN) 2654. Such LAN and WAN networking environments are commonplace in offices and companies, and facilitate enterprise-wide computer networks, such as intranets, all of which may connect to a global communications network, for example, the Internet.

When used in a LAN networking environment, the computer 2602 is connected to the LAN 2652 through a wire and/or wireless communication network interface or adaptor 2656. The adaptor 2656 can facilitate wire and/or wireless communications to the LAN 2652, which may also include a wireless access point disposed thereon for communicating with the wireless functionality of the adaptor 2656.

When used in a WAN networking environment, the computer 2602 can include a modem 2658, or is connected to a communications server on the WAN 2654, or has other means for establishing communications over the WAN 2654, such as by way of the Internet. The modem 2658, which can be internal or external and a wire and/or wireless device, connects to the system bus 2608 via the input device interface 2642. In a networked environment, program modules depicted relative to the computer 2602, or portions thereof, can be stored in the remote memory/storage device 2650. It will be appreciated that the network connections shown are exemplary and other means of establishing a communications link between the computers can be used.

The computer 2602 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 27:
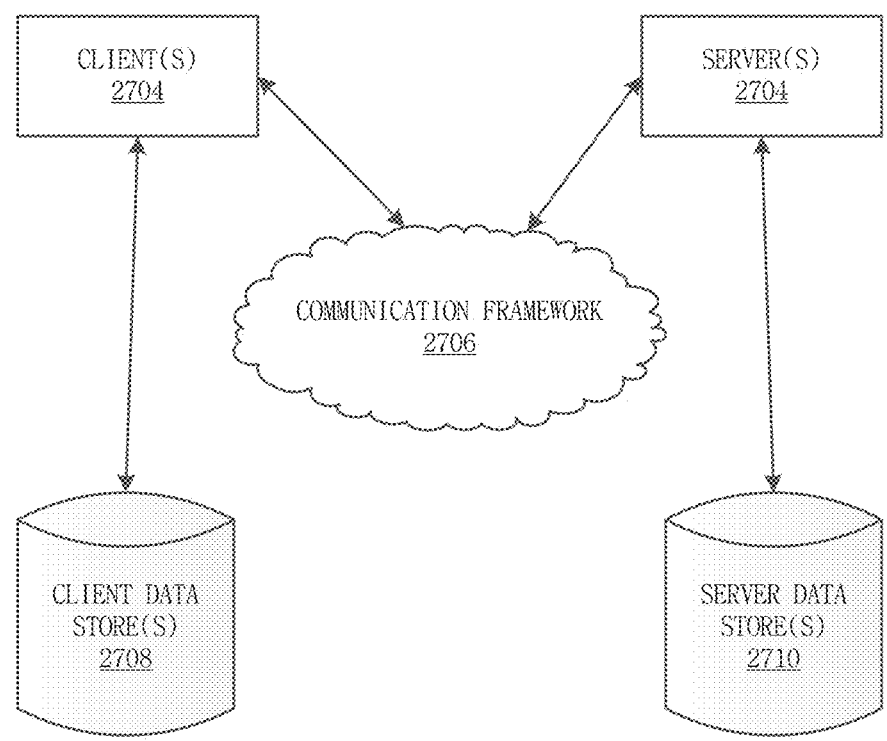
FIG. 27 illustrates an embodiment of a communications architecture.

FIG. 27 illustrates a block diagram of an exemplary communications architecture 2700 suitable for implementing various embodiments as previously described with reference to FIGS. 1-26. The communications architecture 2700 includes various common communications elements, such as a transmitter, receiver, transceiver, radio, network interface, baseband processor, antenna, amplifiers, filters, power supplies, and so forth. The embodiments, however, are not limited to implementation by the communications architecture 2700.

As shown in FIG. 27, the communications architecture 2700 comprises includes one or more clients 2702 and servers 2704. The clients 2702 may implement the client device 910. The servers 2704 may implement the server device 950. The clients 2702 and the servers 2704 are operatively connected to one or more respective client data stores 2708 and server data stores 2710 that can be employed to store information local to the respective clients 2702 and servers 2704, such as cookies and/or associated contextual information.

The clients 2702 and the servers 2704 may communicate information between each other using a communication framework 2706. The communications framework 2706 may implement any well-known communications techniques and protocols. The communications framework 2706 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 2706 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 2702 and the servers 2704. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus, comprising:
  a processor circuit and a server processor component operative on the processor circuit to:
    receive application programming interface (API) data of client side application code at a fantasy open platform environment having one or more web pages, the client side application operative to run on the fantasy open platform environment and being third party to the fantasy open platform environment;
    create hooks on the one or more web pages to allow embedding of the client side application code on the fantasy open platform environment web pages;
    receive an identification from the client side application code specifying on which of the fantasy open platform environment web pages the client side application code runs; and
    allow a client side application executing on a client browser to access resources of the fantasy open platform environment over a network connection.

2. The apparatus of claim 1, the resources including fantasy core objects and fantasy core data.

3. The apparatus of claim 2, the fantasy core objects including one or more of league objects, team objects, owner objects, standings objects, schedule objects, game objects, draft objects, transactions objects, pending transaction objects, player objects, columns objects messages objects, and league news objects.

4. The apparatus of claim 3, wherein the hooks are predetermined.

5. The apparatus of claim 4, wherein the hooks include links to fantasy core objects.

6. The apparatus of claim 4, wherein the hooks include links to fantasy core data via a fantasy core component.

7. The apparatus of claim 4, wherein the hooks include links to user interface elements on the fantasy open platform environment web pages.

8. The apparatus of claim 1, the processor circuit and the server processor component operative to create a site map to identify on which of the fantasy open platform environment web pages the client side application code runs.

9. The apparatus of claim 1, the processor circuit and the server processor component operative to create a document tree to allow client side application code to clearly locate a place on a web page where particular content should be placed.

10. The apparatus of claim 1, the client side application operative to augment a fantasy core operation.

11. A computer-implemented method for incorporating client side application code within a web-based fantasy open platform environment, comprising:
  receiving application programming interface (API) data of the client side application code at the fantasy open platform environment having one or more web pages, the client side application operative to run on the fantasy open platform environment and being third party to the fantasy open platform environment;
  creating hooks on the one or more web pages to allow embedding of the client side application code on the fantasy open platform environment web pages;
  receiving an identification from the client side application code specifying on which of the fantasy open platform environment web pages the client side application code runs; and
  allowing a client side application executing on a client browser to access resources of the fantasy open platform environment over a network connection.

12. The computer-implemented method of claim 11, the resources including fantasy core objects and fantasy core data.

13. The computer-implemented method of claim 12, the fantasy core objects including one or more of league objects, team objects, owner objects, standings objects, schedule objects, game objects, draft objects, transactions objects, pending transaction objects, player objects, columns objects messages objects, and league news objects.

14. The computer-implemented method of claim 13, wherein the hooks are predetermined.

15. The computer-implemented method of claim 14, wherein the hooks include links to fantasy core objects.

16. The computer-implemented method of claim 14, wherein the hooks include links to fantasy core data via a fantasy core component.

17. The computer-implemented method of claim 14, wherein the hooks include links to user interface elements on the fantasy open platform environment web pages.

18. The computer-implemented method of claim 11, further comprising creating a site map to identify on which of the fantasy open platform environment web pages the client side application code runs.

19. The computer-implemented method of claim 11, further comprising creating a document tree to allow client side application code to clearly locate a place on a web page where particular content should be placed.

20. The computer-implemented method of claim 11, the client side application operative to augment a fantasy core operation.

21. A non-transitory computer-readable storage medium comprising instructions that, when executed, cause a system to:
   receive application programming interface (API) data of client side application code at a fantasy open platform environment having one or more web pages, the client side application operative to run on the fantasy open platform environment and being third party to the fantasy open platform environment;
   create hooks on the one or more web pages to allow embedding of the client side application code on the fantasy open platform environment web pages;
   receive an identification from the client side application code specifying on which of the fantasy open platform environment web pages the client side application code runs; and
   allow a client side application executing on a client browser to access resources of the fantasy open platform environment over a network connection.

22. The computer-readable storage medium of claim 21, the resources including fantasy core objects and fantasy core data.

23. The computer-readable storage medium of claim 22, the fantasy core objects including one or more of league objects, team objects, owner objects, standings objects, schedule objects, game objects, draft objects, transactions objects, pending transaction objects, player objects, columns objects messages objects, and league news objects.

24. The computer-readable storage medium of claim 23, wherein the hooks are predetermined.

25. The computer-readable storage medium of claim 24, wherein the hooks include links to fantasy core objects.

26. The computer-readable storage medium of claim 24, wherein the hooks include links to fantasy core data via a fantasy core component.

27. The computer-readable storage medium of claim 24, wherein the hooks include links to user interface elements on the fantasy open platform environment web pages.

28. The computer-readable storage medium of claim 21, comprising instructions that when executed cause the system to create a site map to identify on which of the fantasy open platform environment web pages the client side application code runs.

29. The computer-readable storage medium of claim 21, comprising instructions that when executed cause the system to create a document tree to allow client side application code to clearly locate a place on a web page where particular content should be placed.

30. The computer-readable storage medium of claim 21, the client side application operative to augment a fantasy core operation.

* * * * *

UNITED STATES PATENT AND TRADEMARK OFFICE
CERTIFICATE OF CORRECTION

PATENT NO. : 9,495,226 B2
APPLICATION NO. : 13/691042
DATED : November 15, 2016
INVENTOR(S) : Antonio L. Fernandez It is certified that error appears in the above-identified patent and that said Letters Patent is hereby corrected as shown below:

In the Specification

Column 9, Line 36, replace "3061" with -- 306-f --

Column 11, Line 24, replace "FantasySports1nsurance.com" with -- FantasySportsInsurance.com --

Signed and Sealed this
Tenth Day of January, 2017

Michelle K. Lee
*Director of the United States Patent and Trademark Office*